United States Patent
Minari et al.

(10) Patent No.: US 12,066,701 B2
(45) Date of Patent: Aug. 20, 2024

(54) DISPLAY DEVICE

(71) Applicant: Sharp Display Technology Corporation, Kameyama (JP)

(72) Inventors: Chiaki Minari, Kameyama (JP); Naru Usukura, Kameyama (JP); Ryuzo Yuki, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/228,018

(22) Filed: Jul. 31, 2023

(65) Prior Publication Data
US 2024/0061284 A1 Feb. 22, 2024

(30) Foreign Application Priority Data
Aug. 4, 2022 (JP) .................. 2022-124838

(51) Int. Cl.
*G02F 1/133* (2006.01)
*G02F 1/1334* (2006.01)
*G02F 1/137* (2006.01)

(52) U.S. Cl.
CPC ...... *G02F 1/13312* (2021.01); *G02F 1/13345* (2021.01); *G02F 1/137* (2013.01); *G02F 2202/04* (2013.01); *G02F 2203/02* (2013.01)

(58) Field of Classification Search
CPC .................................................. G02F 1/13312
See application file for complete search history.

(56) References Cited

U.S. PATENT DOCUMENTS

| | | | |
|---|---|---|---|
| 2015/0192807 A1 | 7/2015 | Satoh | |
| 2018/0224678 A1* | 8/2018 | Jung | G02F 1/1347 |
| 2019/0025692 A1* | 1/2019 | Yamashita | G02F 1/13306 |
| 2020/0017029 A1* | 1/2020 | Taguchi | G02F 1/13471 |

FOREIGN PATENT DOCUMENTS

| | | | |
|---|---|---|---|
| CN | 108132495 A | * | 6/2018 |
| JP | 2015-165251 A | | 9/2015 |

* cited by examiner

*Primary Examiner* — Edmond C Lau
(74) *Attorney, Agent, or Firm* — ScienBiziP, P.C.

(57) ABSTRACT

A display device includes a display panel and a control unit. The display panel includes a first substrate, a light modulation layer configured to switch between transmissive display and non-transmissive display, and a second substrate in this order, and further includes an optical sensor configured to detect a luminance of light incident from a first space located on one main surface side of the display panel and from a second space located on the other main surface side of the display panel. The control unit calculates, based on the luminance, a relationship between brightness of the first space and brightness of the second space as a numerical value and switches display of the light modulation layer based on the numerical value.

11 Claims, 60 Drawing Sheets

DISPLAY DEVICE

CROSS-REFERENCE TO RELATED APPLICATIONS

This application claims the benefit of priority to Japanese Patent Application Number 2022-124838 filed on Aug. 4, 2022. The entire contents of the above-identified application are hereby incorporated by reference.

BACKGROUND

Technical Field

The disclosure described below relates to a display device.

In recent years, technologies of a display device represented by an organic electroluminescence display device and a liquid crystal display device are used in a wide range of fields. For example, a transparent display using these technologies of the display device is used as a partition.

For example, JP 2015-165251 A discloses a display panel including a first substrate and a second substrate disposed opposite to each other and a light modulation layer that is disposed between the first substrate and the second substrate, that is including a plurality of shape anisotropic members, and that controls transmittance of incident light. Each of the shape anisotropic members includes a core serving as a conductor and a covering layer serving as a dielectric covering the entire periphery of the core. A projected area of the shape anisotropic members onto the first substrate and the second substrate is changed by changing a magnitude or a frequency of a voltage applied to the light modulation layer.

SUMMARY

There has not been a digital partition that is invisible from one side and visible from the other side across the partition. In the above-described JP 2015-165251 A, such a digital partition is not discussed.

The disclosure has been made in view of the current situation, and an object of the disclosure is to provide a display device in which, when the display device is disposed at a boundary between two spaces, one space is visible from the other space and the other space is invisible from the one space.

(1) A display device according to an embodiment of the disclosure includes a display panel and a control unit. The display panel includes a first substrate, a light modulation layer configured to switch between transmissive display and non-transmissive display, and a second substrate in this order, and further includes an optical sensor configured to detect a luminance of light incident from a first space located on one main surface side of the display panel and from a second space located on the other main surface side of the display panel. The control unit calculates, based on the luminance, a relationship between brightness of the first space and brightness of the second space as a numerical value and switches display of the light modulation layer based on the numerical value.

(2) In the display device according to an embodiment of the disclosure, in addition to the configuration of (1), the luminance includes a first luminance and a second luminance, the first luminance is a luminance detected in a non-transmissive display state of the display panel, and the second luminance is a luminance detected in a transmissive display state of the display panel.

(3) In the display device according to an embodiment of the disclosure, in addition to the configuration of (1) or (2), the detection of the luminance, the calculation of the numerical value based on the luminance, and the switching of the display of the light modulation layer based on the numerical value are repeated every time a certain period of time elapses.

(4) In the display device according to an embodiment of the disclosure, in addition to the configuration of (1), (2), or (3), the non-transmissive display is scattering display, and the light modulation layer includes a polymer network and a liquid crystal component.

(5) In the display device according to an embodiment of the disclosure, in addition to the configuration of (1), (2), or (3), the non-transmissive display is reflective display, the light modulation layer includes a plurality of shape anisotropic members, and each of the plurality of shape anisotropic members includes a core serving as a conductor and a covering layer serving as a dielectric covering a periphery of the core.

(6) In the display device according to an embodiment of the disclosure, in addition to the configuration of (1), (2), or (3), the non-transmissive display is light blocking display, and the light modulation layer includes liquid crystal molecules and dye molecules.

(7) The display device according to an embodiment of the disclosure, in addition to the configuration of (6), further includes a reflective layer around the optical sensor in a plan view.

(8) In the display device according to an embodiment of the disclosure, in addition to the configuration of (1), (2), (3), (4), (5), (6), or (7), the display device includes a plurality of pixels, and the control unit causes a number of pixels corresponding to the numerical value among the plurality of pixels to be subjected to the transmissive display or the non-transmissive display.

(9) In the display device according to an embodiment of the disclosure, in addition to the configuration of (4), the control unit adjusts a voltage applied to the light modulation layer based on the numerical value and obliquely aligns the liquid crystal component with respect to the first substrate and the second substrate.

(10) In the display device according to an embodiment of the disclosure, in addition to the configuration of (5), the control unit adjusts a voltage applied to the light modulation layer based on the numerical value and obliquely aligns the plurality of shape anisotropic members with respect to the first substrate and the second substrate.

(11) In the display device according to an embodiment of the disclosure, in addition to the configuration of (6) or (7), the control unit adjusts a voltage applied to the light modulation layer based on the numerical value, and obliquely aligns the liquid crystal molecules and the dye molecules with respect to the first substrate and the second substrate.

According to the disclosure, a display device can be provided in which, when the display device is disposed at a boundary between two spaces, one space is visible from the other space and the other space is invisible from the one space.

BRIEF DESCRIPTION OF DRAWINGS

The disclosure will be described with reference to the accompanying drawings, wherein like numbers reference like elements.

DESCRIPTION OF EMBODIMENTS

The disclosure will be described in detail below through the presentation of embodiments with reference to the drawings, however, the disclosure is not limited only to these embodiments.

First Embodiment

Figure 1:
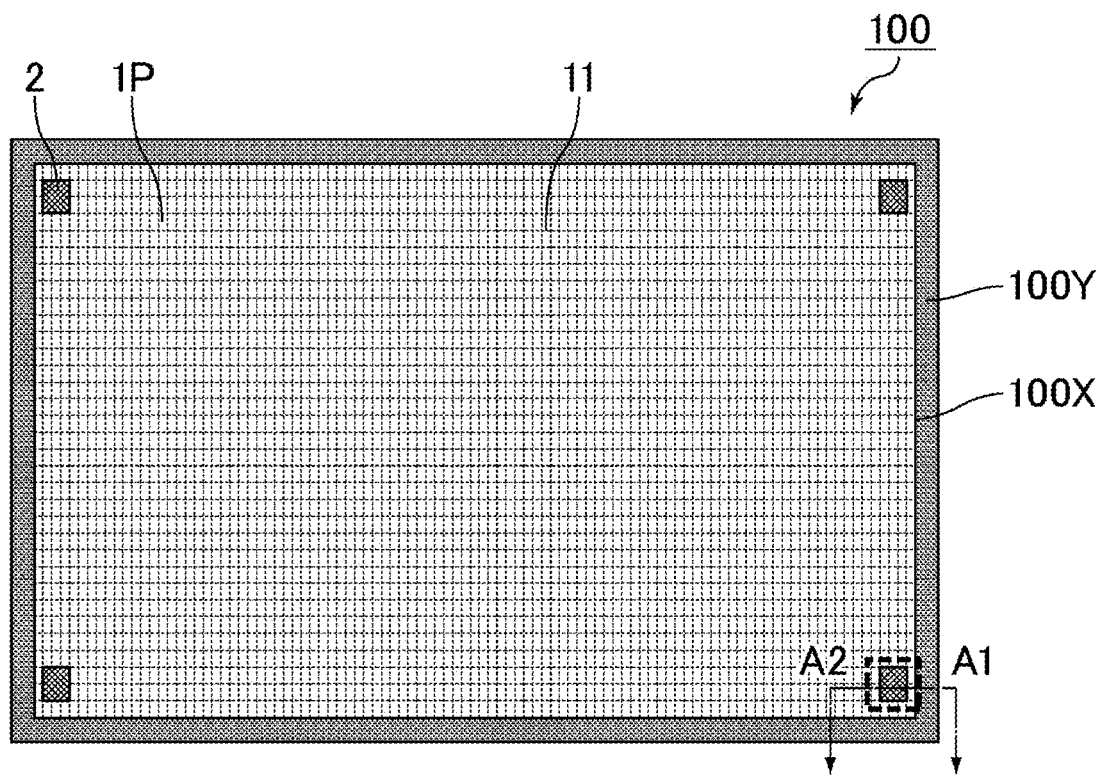
FIG. 1 is a schematic plan view of a display device according to a first embodiment.
Figure 2:
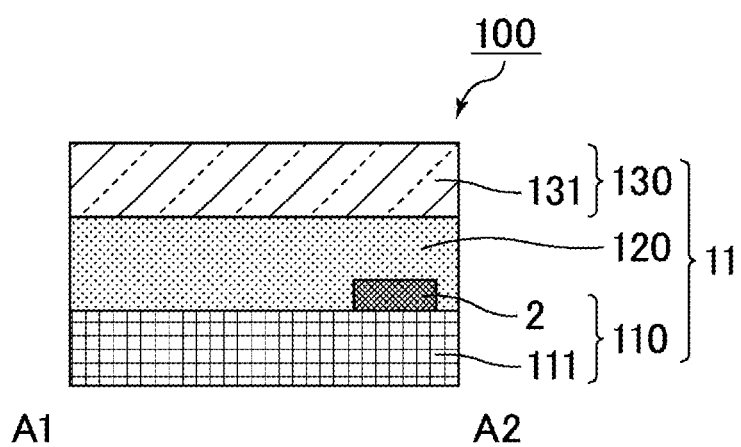
FIG. 2 is a schematic cross-sectional view of the display device according to the first embodiment taken along a line A1-A2 in FIG. 1.
Figure 3:
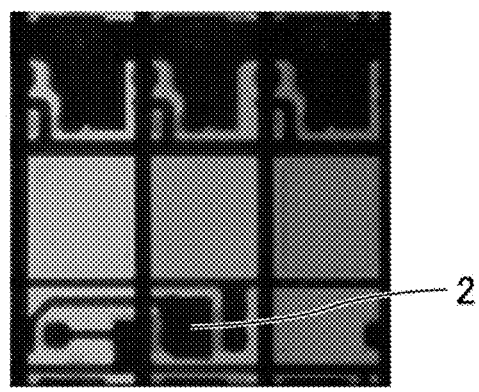
FIG. 3 is an enlarged schematic plan view of a region surrounded by a broken line in FIG. 1.

FIG. 1 is a schematic plan view of a display device according to a first embodiment. FIG. 2 is a schematic cross-sectional view of the display device according to the first embodiment taken along a line A1-A2 in FIG. 1. FIG. 3 is an enlarged schematic plan view of a region surrounded by a broken line in FIG. 1. As illustrated in FIGS. 1 to 3, a display device 100 according to the present embodiment includes a display panel 11 and a control unit. The display panel 11 includes a first substrate 110, a light modulation layer 120 that switches between transmissive display and non-transmissive display, and a second substrate 130 in this order, and further includes an optical sensor 2 that detects a luminance of light incident from a first space located on one main surface side of the display panel 11 and a second space located on the other main surface side of the display panel 11. The control unit calculates, based on the luminance, a relationship between brightness of the first space and brightness of the second space as a numerical value and switches display of the light modulation layer 120 based on the numerical value. With such an aspect, the amount of light transmitted through the display panel 11 can be controlled by switching display of the light modulation layer 120 based on the relationship between the brightness of the first space and the brightness of the second space, and a state can be realized in which one space of the first space and the second space is visible from the other space and the other space is invisible from the one space.

The first space is a space located on one main surface side of the display panel 11, and the second space is a space located on the other main surface side of the display panel 11. The brightness of the first space may change or need not change in time series. Similarly, the brightness of the second space may change or need not change in time series. The first space and the second space may be different or the same in brightness.

The non-transmissive display may be any display in which light does not transmit, and examples thereof include scattering display, reflective display, and light blocking display.

Calculating the relationship between the brightness of the first space and the brightness of the second space as a numerical value is, for example, calculating a brightness ratio of the first space and the second space. That is, the numerical value may be, for example, the brightness ratio.

The control unit may set transmittance or non-transmittance of the display panel 11 based on the numerical value (more specifically, the brightness ratio) and may switch the display of the light modulation layer 120 based on the transmittance or the non-transmittance. The transmittance of the display panel 11 is a ratio of light transmitted through the display panel 11 to light incident on the display panel 11. The non-transmittance of the display panel 11 is a ratio of light not transmitted through the display panel 11 to the light incident on the display panel 11. Examples of the non-transmittance of the display panel 11 include a half scattering degree which is a ratio of light scattered by the display panel 11 to the light incident on the display panel 11, a half mirror degree which is a ratio of light reflected by the display panel 11 to the light incident on the display panel 11, and a half light blocking degree which is a ratio of light blocked by the display panel 11 to the light incident on the display panel 11.

Hereinafter, a case where the non-transmissive display is the scattering display will be described as an example. Specifically, a case will be described in detail in which the display device 100 includes a plurality of pixels 1P and the light modulation layer 120 can switch between the transmissive display and the scattering display for each pixel 1P. A case will be described as an example in which the control unit sets the half scattering degree as the non-transmittance. Note that, in the present embodiment, the case where the non-transmittance is set is taken as an example, but the same effect can be obtained when the transmittance is set.

That is, the light modulation layer 120 of the present embodiment switches between the transmissive display and the scattering display. The control unit calculates the brightness ratio of the first space and the second space based on the luminance, sets the half scattering degree as the non-transmittance of the display panel 11 based on the brightness ratio, and switches the display of the light modulation layer 120 based on the half scattering degree.

The optical sensor 2 may detect the luminance of the light incident from the first space and the second space and passing through the light modulation layer 120. The light incident from the first space and the second space and passing through the light modulation layer 120 is light incident from the first space on the display panel 11 and passing through the light modulation layer 120 and light incident from the second space on the display panel 11 and passing through the light modulation layer 120. The light passing through the light modulation layer 120 includes light transmitted through the light modulation layer 120, light scattered by the light modulation layer 120, and light reflected by the light modulation layer 120.

The display device 100 according to the present embodiment can switch between three types of display modes of a full scattering mode, a transmissive mode, and a half scattering mode, based on the brightness ratio. Specifically, when the half scattering degree is set equal to 0% based on the brightness ratio, that is, when the ratio of the light scattered by the display panel 11 to the light incident on the display panel 11 is set equal to 0%, the mode is the transmissive mode in which all of the light incident on the display panel 11 is transmitted. When the half scattering degree is set equal to 100% based on the brightness ratio, that is, when the ratio of the light scattered by the display panel to the light incident on the display panel 11 is set equal to 100%, the mode is the full scattering mode in which all of the light incident on the display panel 11 is scattered. When the half scattering degree is set equal to more than 0% and less than 100% based on the brightness ratio, that is, when the ratio of the light scattered by the display panel to the light incident on the display panel 11 is set equal to more than 0% and less than 100%, the mode is the half scattering mode in which a part of the light incident on the display panel 11 is scattered.

Figure 4:
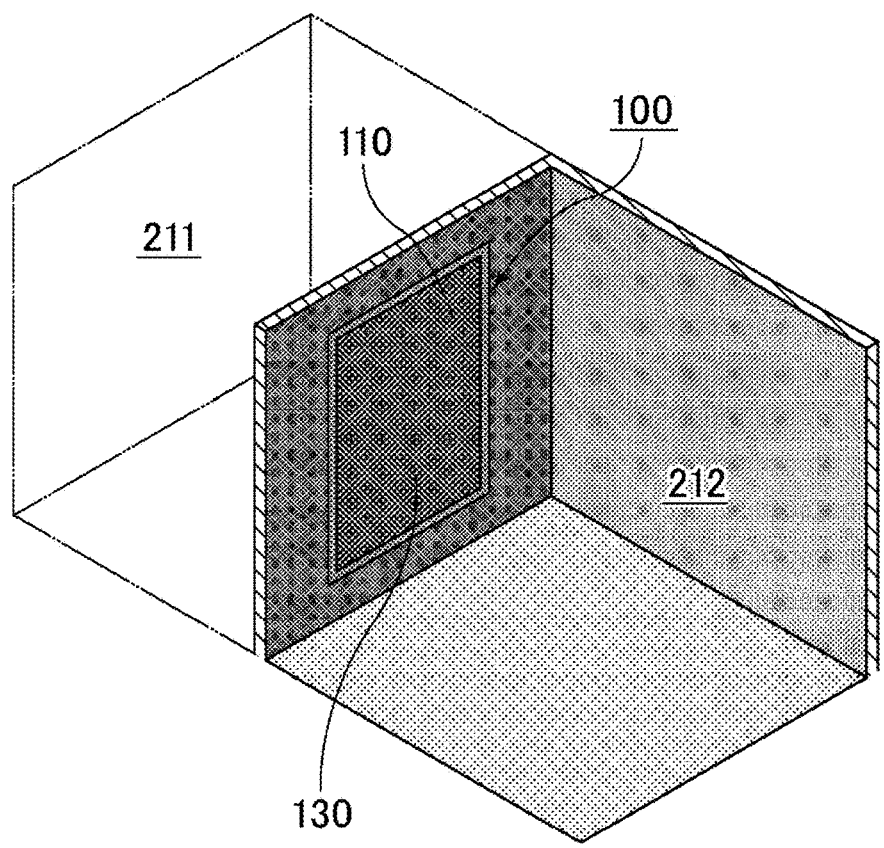
FIG. 4 is a schematic view for describing a case where the display device according to the first embodiment is in a full scattering mode.
Figure 5:
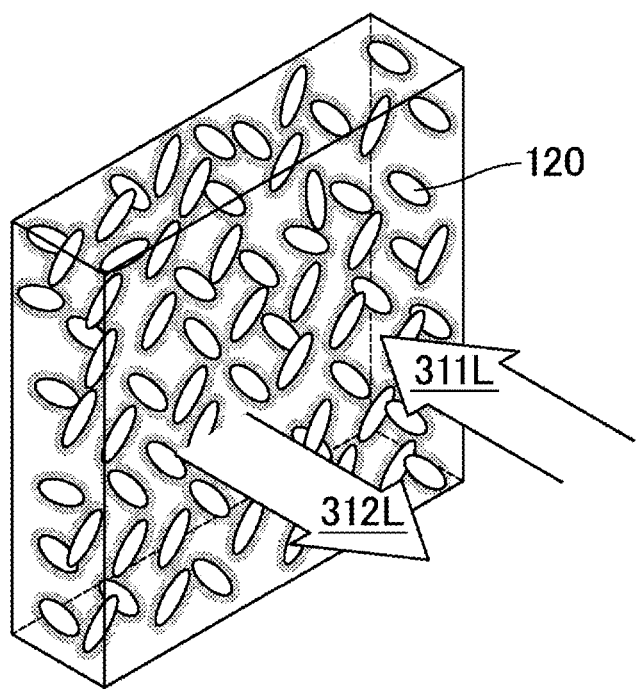
FIG. 5 is a schematic view illustrating a light modulation layer in the case where the display device according to the first embodiment is in the full scattering mode.
Figure 6:
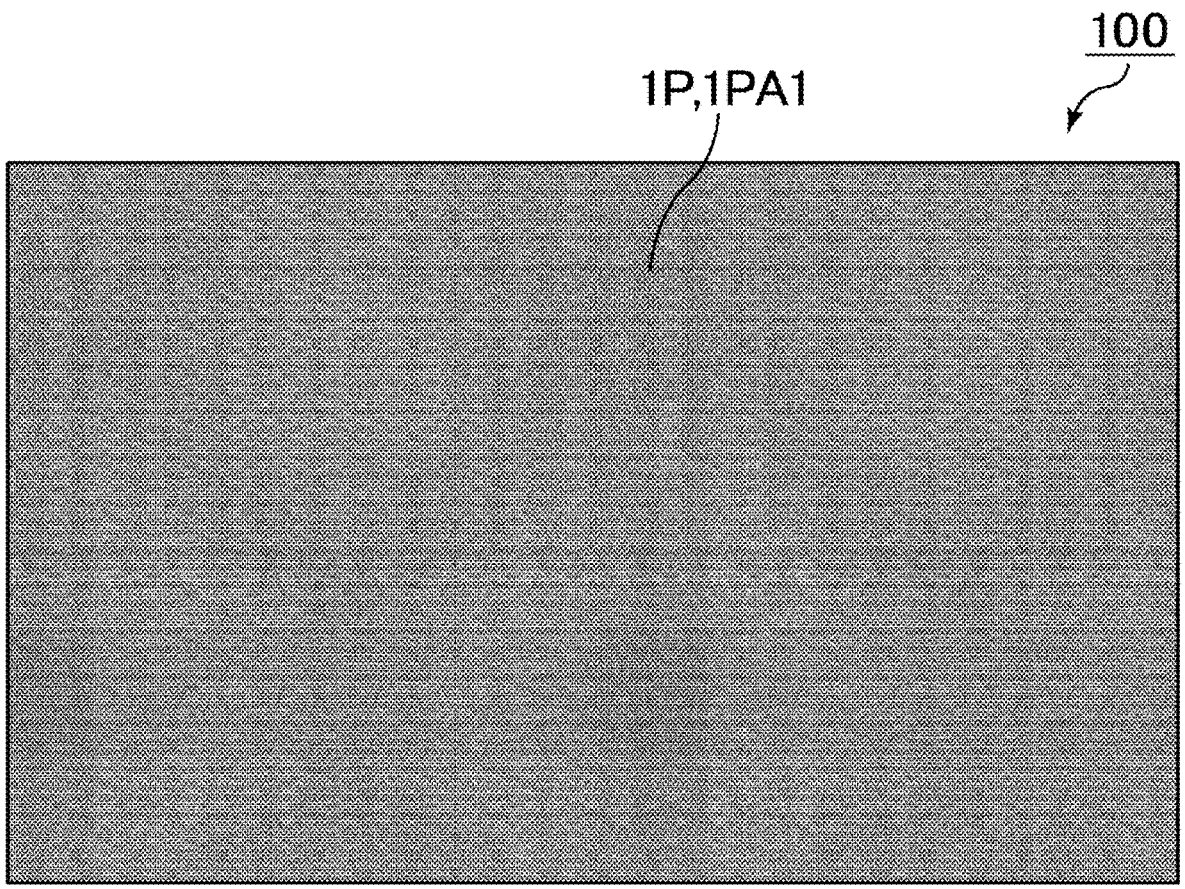
FIG. 6 is a schematic view illustrating the display device in the case where the display device according to the first embodiment is in the full scattering mode.

FIG. 4 is a schematic view for describing a case where the display device according to the first embodiment is in the full scattering mode. FIG. 5 is a schematic view illustrating the light modulation layer in the case where the display device according to the first embodiment is in the full scattering mode. FIG. 6 is a schematic view illustrating the display device in the case where the display device according to the first embodiment is in the full scattering mode. In the present embodiment, the first substrate 110 of the display device 100 is disposed on the first space 211 side, and the second substrate 130 of the display device 100 is disposed on the second space 212 side.

When the display device 100 of the present embodiment is in the full scattering mode (also simply referred to as a scattering mode), as illustrated in FIGS. 4 to 6, in the display device 100 of the present embodiment, all of the plurality of pixels 1P are scattering display 1PA1, that is, the entire surface of the display panel 11 is the scattering display 1PA1. With such an aspect, almost all of incident light 311L incident on the display device 100 from the first space 211 is scattered in the display device 100 to become scattered light 312L. Almost all of the light incident on the display device 100 from the second space 212 is scattered in the display device 100. As a result, the full scattering mode is realized in which the second space 212 is invisible from the first space 211 and the first space 211 is invisible from the second space 212.

For example, when the first space 211 is outdoors and the second space 212 is indoors darker than the first space 211, in the full scattering mode of the present embodiment, a state where light from outdoors is not taken into indoors as much as possible can be realized.

Figure 7:
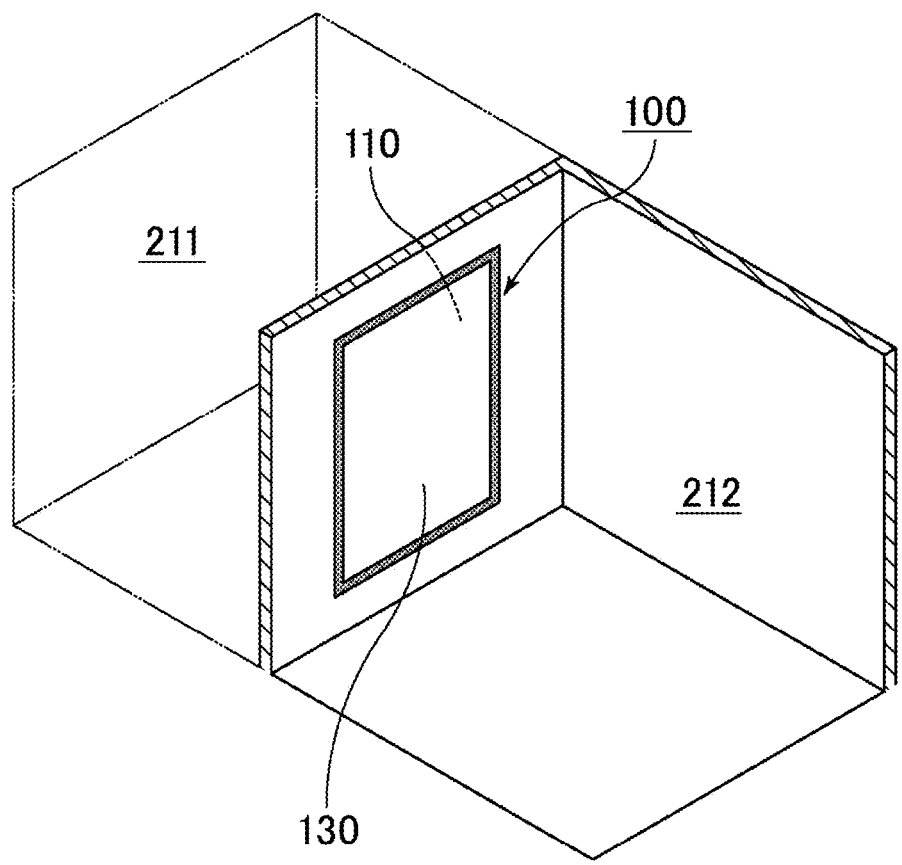
FIG. 7 is a schematic view for describing a case where the display device according to the first embodiment is in a transmissive mode.
Figure 8:
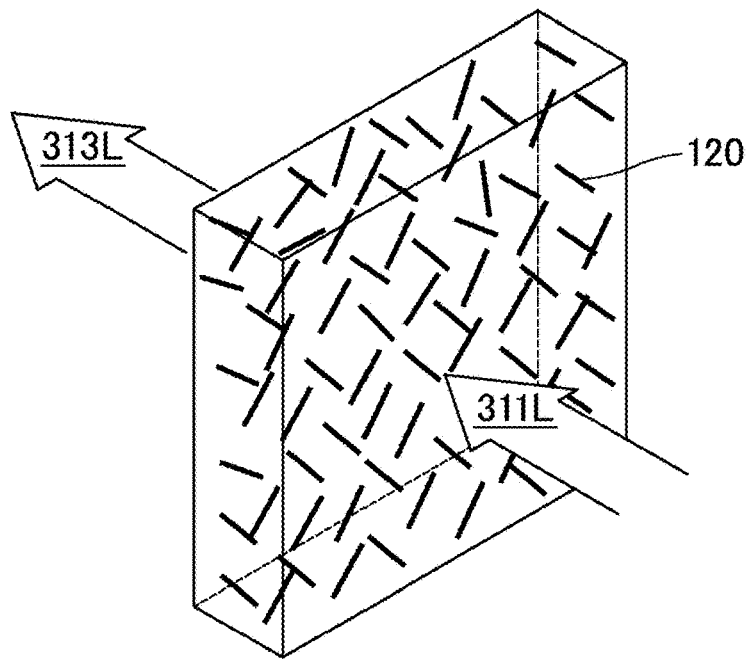
FIG. 8 is a schematic view illustrating the light modulation layer in the case where the display device according to the first embodiment is in the transmissive mode.
Figure 9:
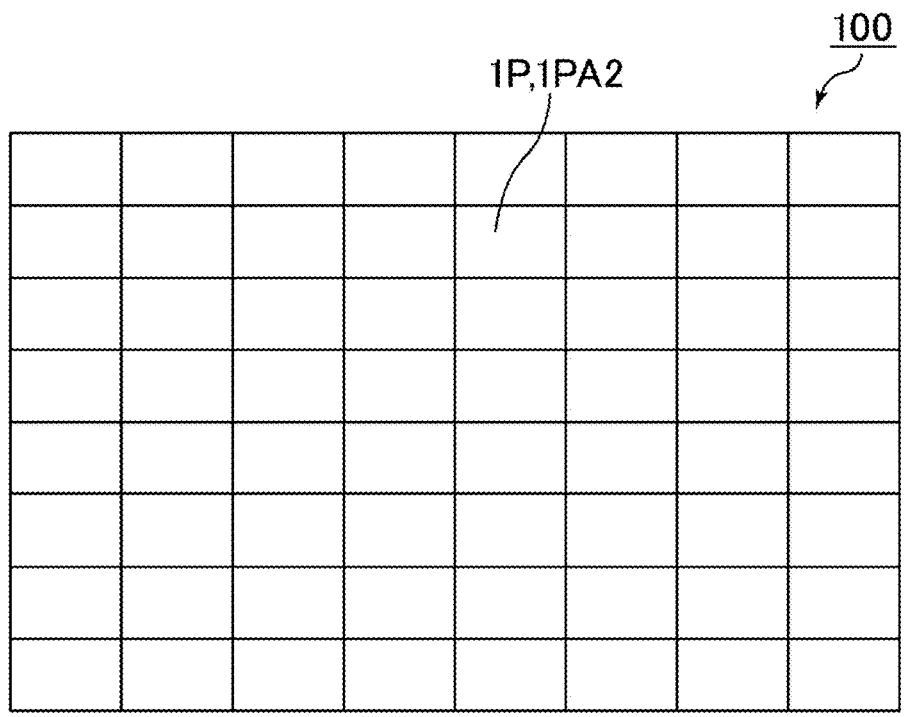
FIG. 9 is a schematic view illustrating the display device in the case where the display device according to the first embodiment is in the transmissive mode.

FIG. 7 is a schematic view for describing a case where the display device according to the first embodiment is in the transmissive mode. FIG. 8 is a schematic view illustrating the light modulation layer in the case where the display device according to the first embodiment is in the transmissive mode. FIG. 9 is a schematic view illustrating the display device in the case where the display device according to the first embodiment is in the transmissive mode.

When the display device 100 of the present embodiment is in the transmissive mode, as illustrated in FIGS. 7 to 9, in the display device 100 of the present embodiment, all of the plurality of pixels 1P are transmissive display 1PA2, that is, the entire surface of the display panel 11 is the transmissive display 1PA2. With such an aspect, almost all of the light incident on the display device 100 from the first space 211 is transmitted through the display device 100, and transmitted light 313L is incident on the second space 212. Almost all of the light incident on the display device 100 from the second space 212 is transmitted through the display device 100, and the transmitted light is incident on the first space 211. As a result, the transmissive mode is realized in which the second space 212 is visible from the first space 211 and the first space 211 is visible from the second space 212.

For example, when the first space 211 is outdoors and the second space 212 is indoors darker than the first space 211, in the transmissive mode of the present embodiment, a state where light from outdoors is taken into indoors as much as possible can be realized.

Figure 10:
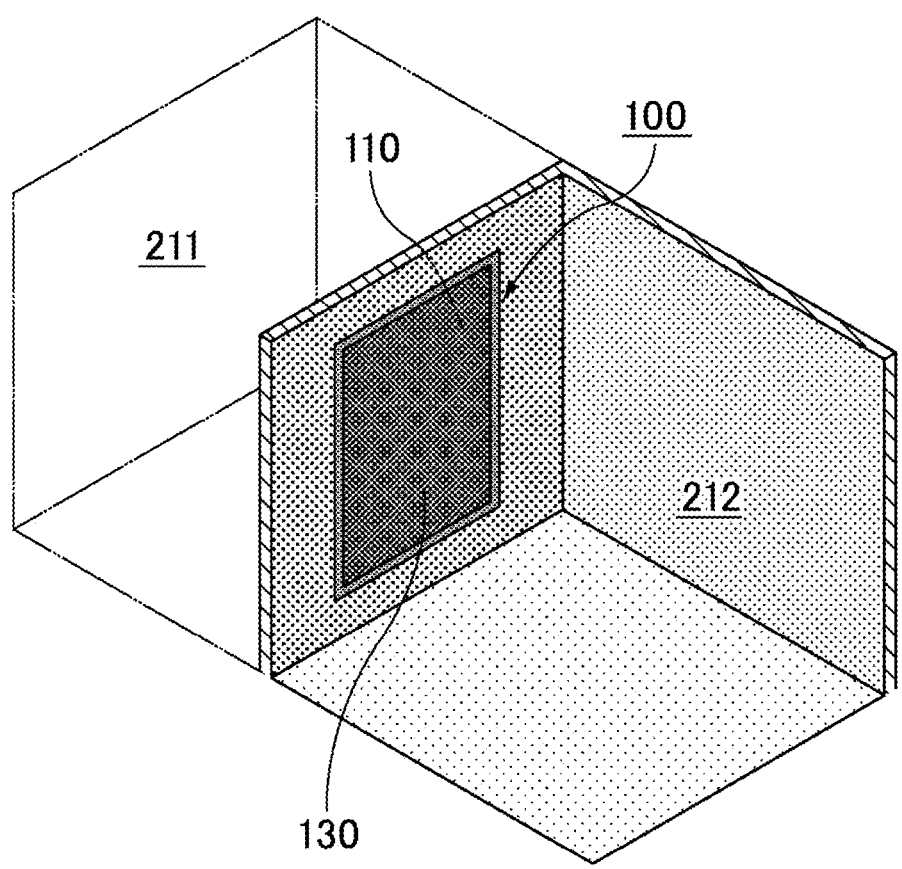
FIG. 10 is a schematic view for describing a case where the display device according to the first embodiment is in a half scattering mode.
Figure 11:
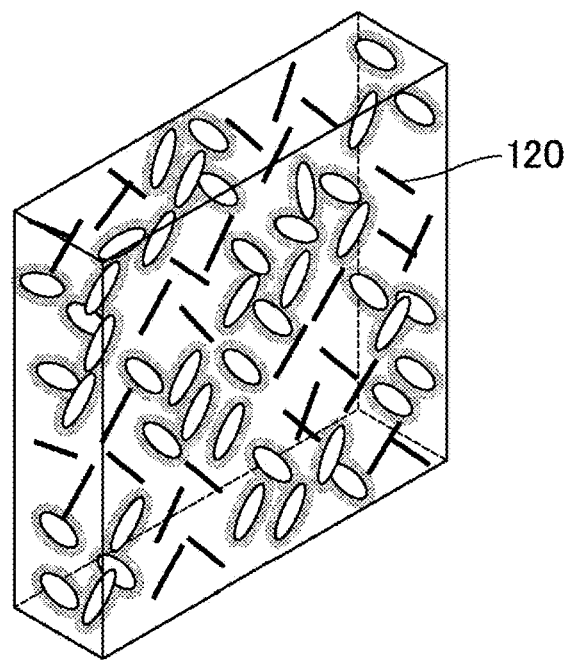
FIG. 11 is a schematic view illustrating the light modulation layer in the case where the display device according to the first embodiment is in the half scattering mode.
Figure 12:
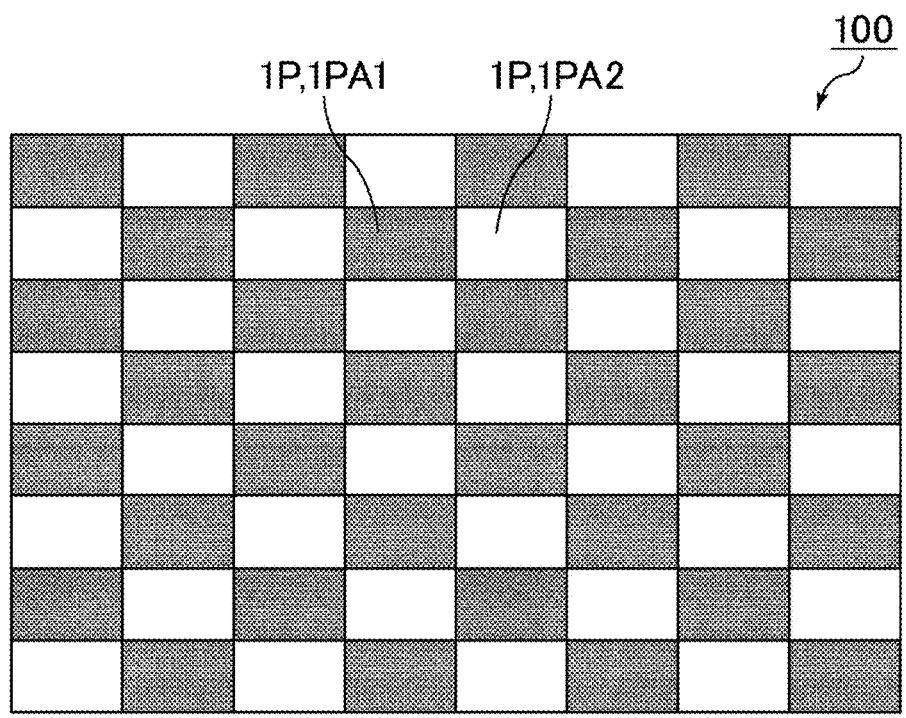
FIG. 12 is a schematic view illustrating the display device in the case where the display device according to the first embodiment is in the half scattering mode.

FIG. 10 is a schematic view for describing a case where the display device according to the first embodiment is in the half scattering mode. FIG. 11 is a schematic view illustrating the light modulation layer in the case where the display device according to the first embodiment is in the half scattering mode. FIG. 12 is a schematic view illustrating the display device in the case where the display device according to the first embodiment is in the half scattering mode.

When the display device 100 of the present embodiment is in the half scattering mode, as illustrated in FIGS. 10 to 12, in the display device 100 of the present embodiment, a part of the plurality of pixels 1P is the scattering display 1PA1 and the other pixels 1P are the transmissive display 1PA2, that is, a part of the display panel 11 is the scattering display 1PA1 and the other part is the transmissive display 1PA2. With such an aspect, a part of the light incident on the display device 100 from the first space 211 is scattered in the display device 100, and the other part is transmitted through the display device 100 and incident on the second space 212. A part of the light incident on the display device 100 from the second space 212 is scattered in the display device 100, and the other part is transmitted through the display device 100 and incident on the first space 211. Here, when the first space 211 is brighter than the second space 212, for example, when the first space 211 is outdoors and the second space 212 is indoors darker than the first space 211, light from the first space 211 is easily visible in the second space 212 and light from the second space 212 is hardly visible in the first space 211. As a result, the half scattering mode is realized in which the second space 212 is invisible from the first space 211 and the first space 211 is visible from the second space 212.

For example, when the first space 211 is outdoors and the second space 212 is indoors darker than the first space 211, in the half scattering mode of the present embodiment, a state where light from outdoors is suitably taken into indoors can be realized.

The display device 100 includes the plurality of pixels 1P, and it is preferable that the control unit causes a number of pixels 1P corresponding to the numerical value (specifically, the brightness ratio) among the plurality of pixels 1P to be subjected to the transmissive display or the non-transmissive display. With such an aspect, the amount of light transmitted through the display panel 11 can be effectively controlled, and thus the state can be effectively realized in which one space of the first space and the second space is visible from the other space and the other space is invisible from the one space.

More specifically, it is preferable that the control unit causes a number of pixels 1P corresponding to the transmittance among the plurality of pixels 1P to be subjected to the transmissive display or causes a number of pixels 1P corresponding to the non-transmittance to be subjected to the non-transmissive display. With such an aspect, the amount of light transmitted through the display panel 11 can be more effectively controlled, and thus the state can be more effectively realized in which one space of the first space and the second space is visible from the other space and the other space is invisible from the one space.

It is preferable that the control unit causes a number of pixels 1P corresponding to the half scattering degree among the plurality of pixels 1P to be subjected to the scattering display. With such an aspect, the half scattering mode can be effectively realized, and thus the state can be more effectively realized in which one space of the first space and the second space is visible from the other space and the other space is invisible from the one space. A method in which a part of the pixels 1P among the plurality of pixels 1P is subjected to the scattering display and the other part of the pixels 1P is subjected to the transmissive display is referred to as a pixel division method. The pixel division method will be described below.

The half scattering degree in the pixel division method is, specifically, a ratio of a scattering display area to the entire display area of the display panel 11. More specifically, in the case where the display panel 11 includes the plurality of pixels 1P, the half scattering degree in the pixel division method is a ratio of a total area of the pixels 1P subjected to the scattering display to a total area of the plurality of pixels 1P.

The half scattering degree 0% means that all of the plurality of pixels 1P (that is, the entire surface of the display panel 11) are the transmissive display 1PA2. The half scattering degree 100% means that all of the plurality of pixels 1P (that is, the entire surface of the display panel 11) are the scattering display 1PA1. In the half scattering mode, the half scattering degree is adjusted in a range of more than 0% and less than 100%. FIGS. 13 to 18 illustrate examples of the display device 100 having various half scattering degrees.

Figure 13:
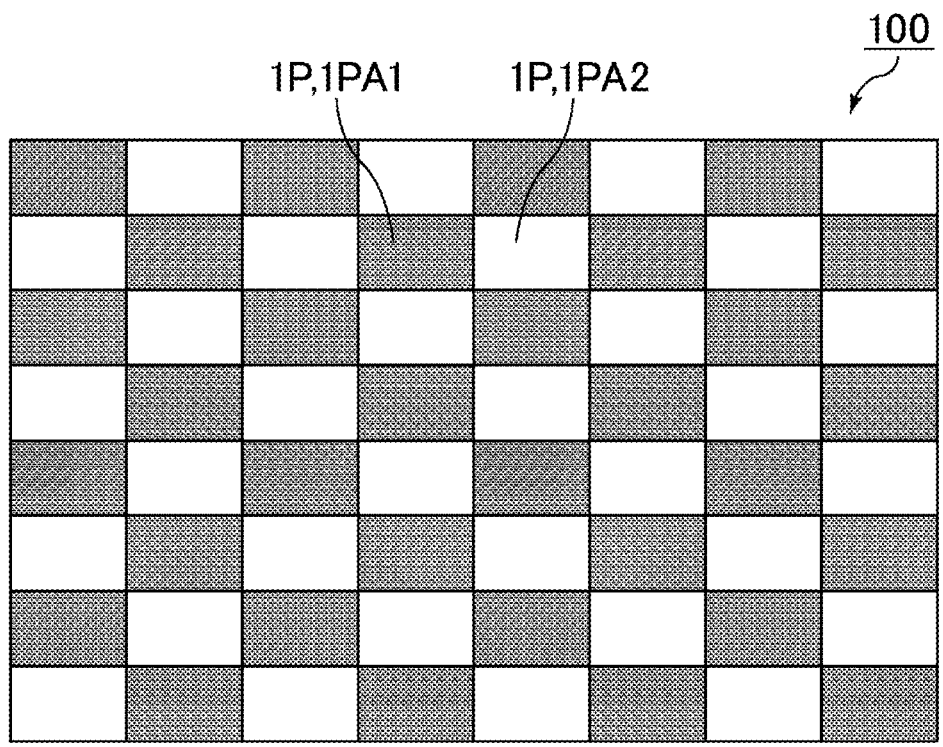
FIG. 13 is a schematic view of the display device according to the first embodiment in which a half scattering degree is 50%.
Figure 14:
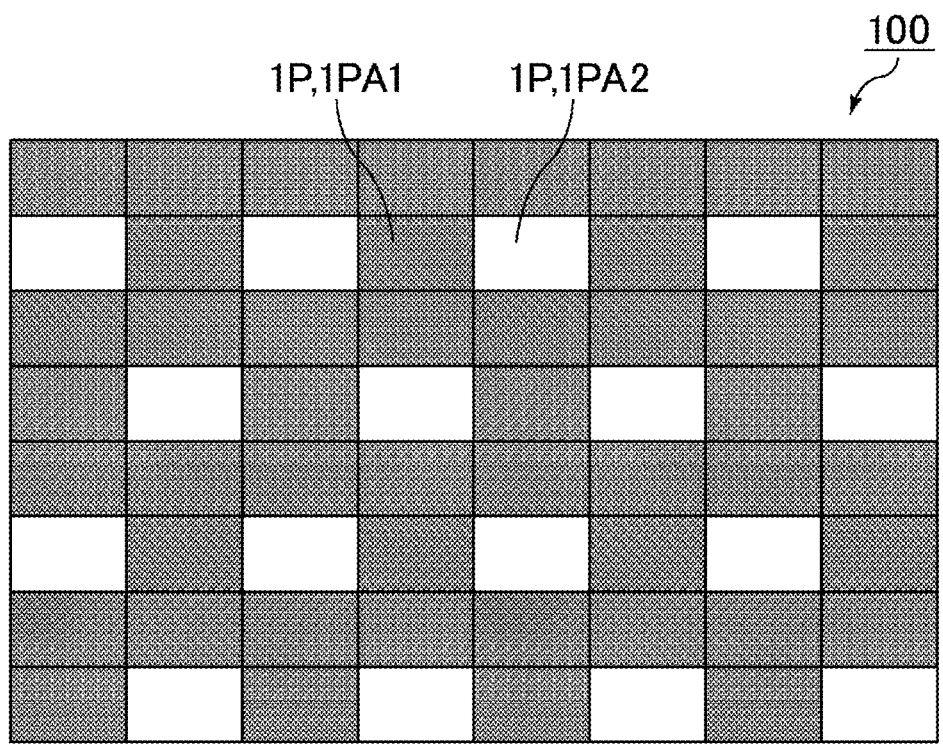
FIG. 14 is a schematic view of the display device according to the first embodiment in which the half scattering degree is 75%.
Figure 15:
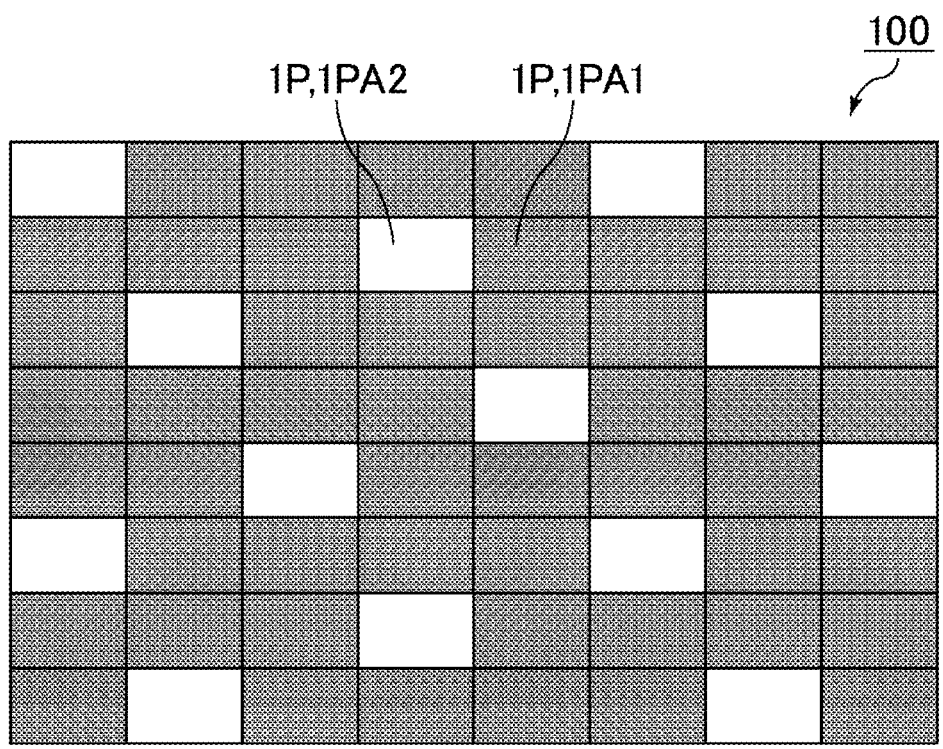
FIG. 15 is a schematic view of the display device according to the first embodiment in which the half scattering degree is 80%.
Figure 16:
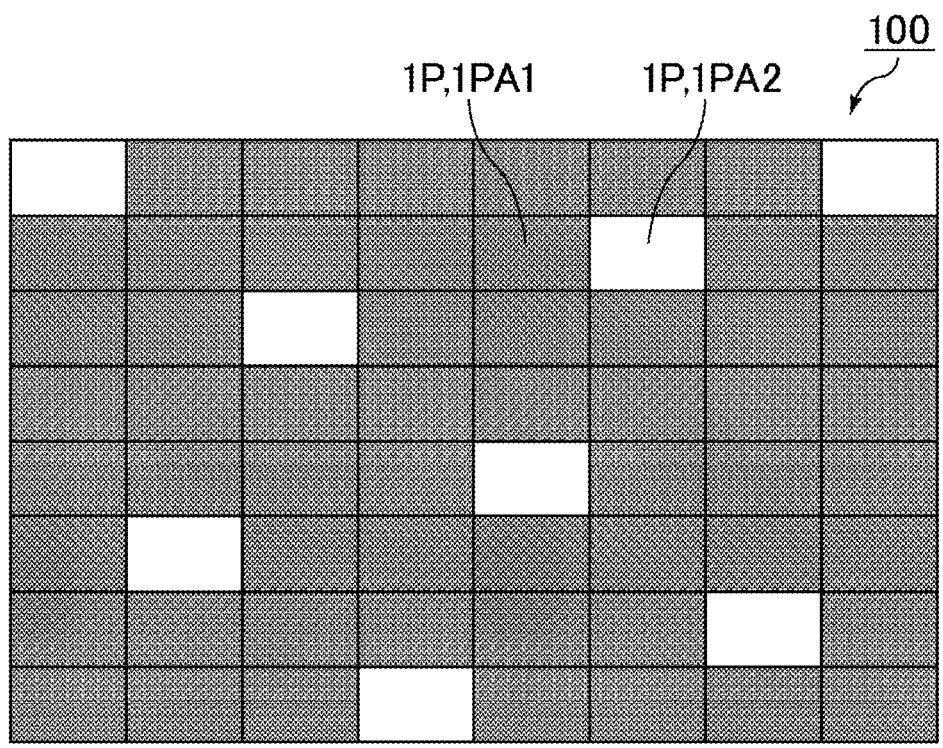
FIG. 16 is a schematic view of the display device according to the first embodiment in which the half scattering degree is 87.5%.
Figure 17:
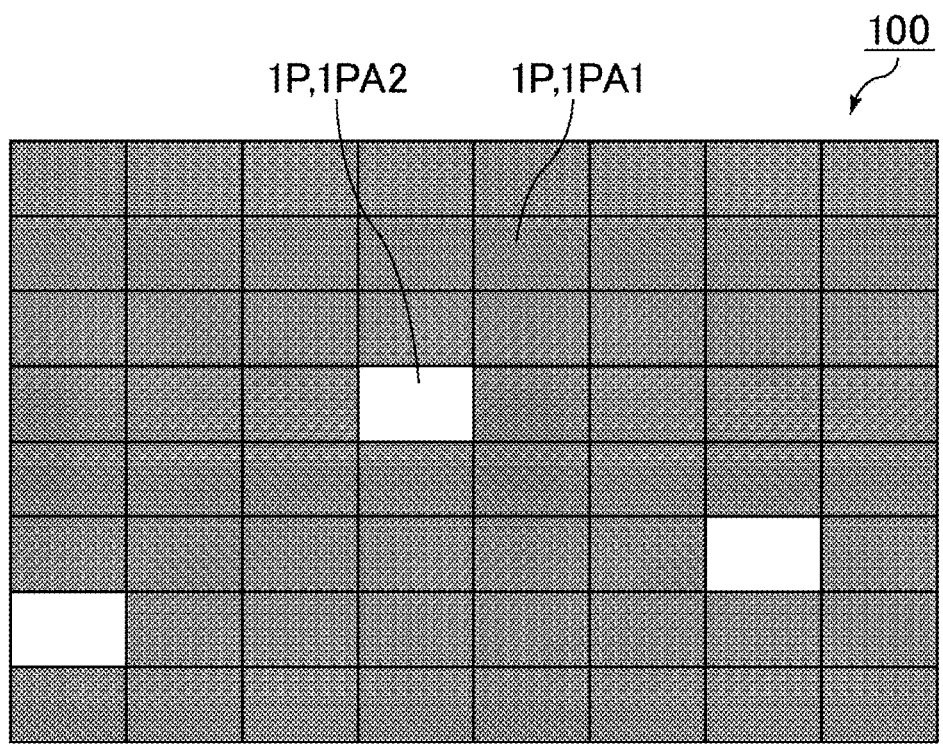
FIG. 17 is a schematic view of the display device according to the first embodiment in which the half scattering degree is 95%.
Figure 18:
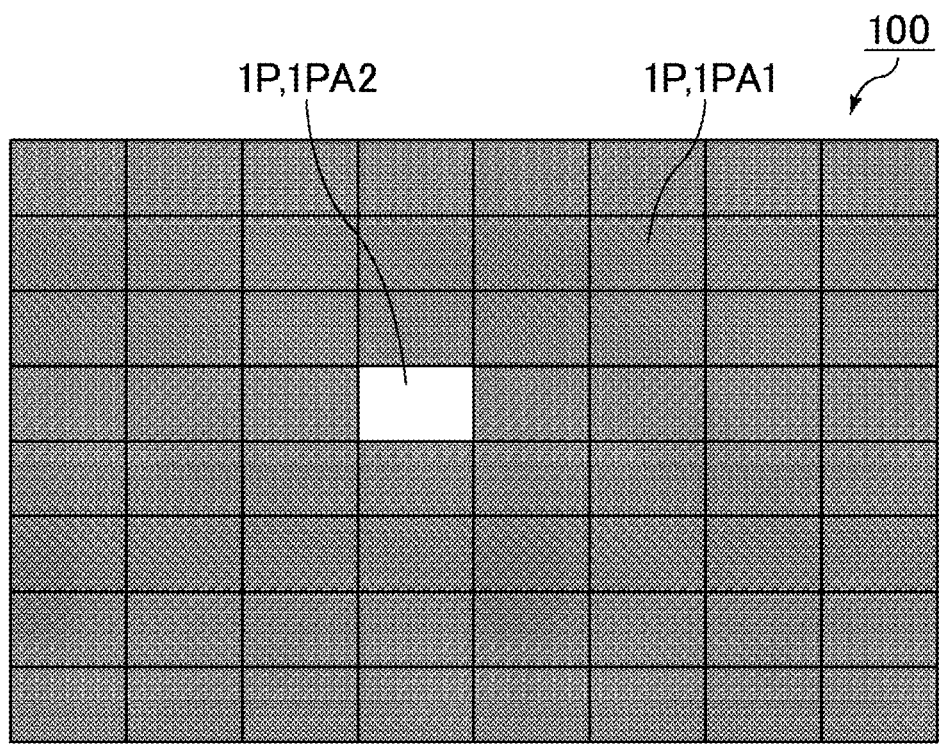
FIG. 18 is a schematic view of the display device according to the first embodiment in which the half scattering degree is 98.5%.

FIG. 13 is a schematic view of the display device according to the first embodiment in which the half scattering degree is 50%. FIG. 14 is a schematic view of the display device according to the first embodiment in which the half scattering degree is 75%. FIG. 15 is a schematic view of the display device according to the first embodiment in which the half scattering degree is 80%. FIG. 16 is a schematic view of the display device according to the first embodiment in which the half scattering degree is 87.5%. FIG. 17 is a schematic view of the display device according to the first embodiment in which the half scattering degree is 95%. FIG. 18 is a schematic view of the display device according to the first embodiment in which the half scattering degree is 98.5%.

Figure 19:
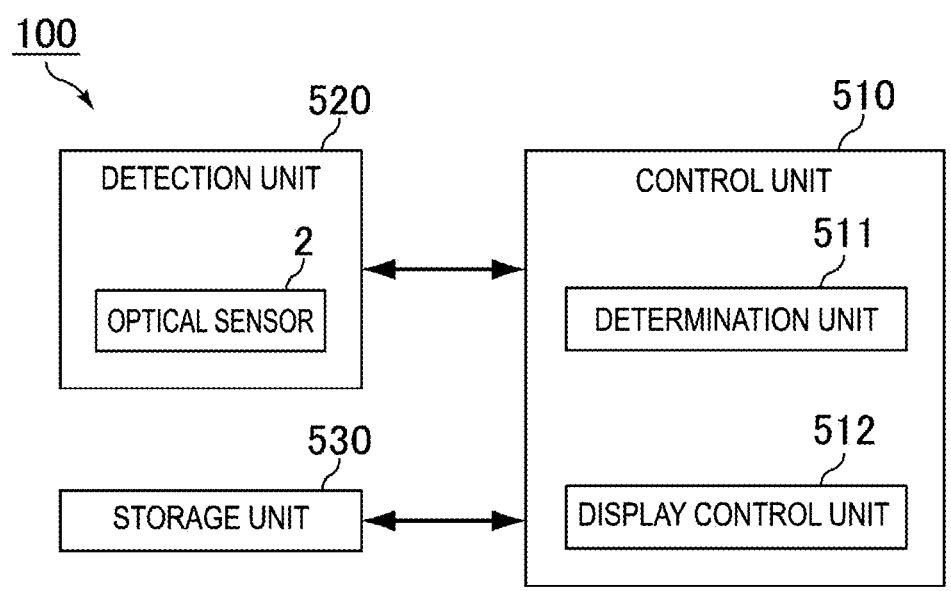
FIG. 19 is a block diagram for describing a configuration of the display device according to the first embodiment.

FIG. 19 is a block diagram for describing a configuration of the display device according to the first embodiment. As illustrated in FIG. 19, the display device 100 includes a control unit 510, a detection unit 520, and a storage unit 530. The detection unit 520 includes the optical sensor 2. The optical sensor 2 is provided inside the display panel 11. Each of the control unit 510 and the storage unit 530 may be provided in the display panel 11 or may be provided in a part other than the display panel 11.

The control unit 510 includes a program for realizing various processing stored in the storage unit 530, a central processing unit (CPU) that executes the program, various hardware controlled by the CPU, and the like. The control unit 510 controls each unit of the display device 100 according to the program stored in the storage unit 530.

The control unit 510 has a function of calculating the relationship between brightness of the first space and brightness of the second space as a numerical value based on the luminance, and switching the display of the light modulation layer 120 based on the numerical value. More specifically, the control unit 510 has a function of calculating the brightness ratio of the first space and the second space based on the luminance, setting transmittance or non-transmittance of the display panel 11 based on the brightness ratio, and switching the display of the light modulation layer 120 based on the transmittance or the non-transmittance. For example, it is preferable that the control unit 510 has a function of calculating the brightness ratio based on the luminance, setting the half scattering degree based on the brightness ratio, and switching the display of the light modulation layer 120 based on the half scattering degree.

The control unit 510 may include, for example, a determination unit 511 and a display control unit 512. The determination unit 511 may have a function of calculating the brightness ratio of the first space and the second space based on the luminance and setting the transmittance or the non-transmittance of the display panel 11 based on the brightness ratio. The display control unit 512 may have a function of switching the display of the light modulation layer 120 based on the transmittance or the non-transmittance. More specifically, the determination unit 511 may have a function of calculating the brightness ratio of the first space and the second space based on the luminance and setting the half scattering degree of the display panel 11 based on the brightness ratio. The display control unit 512 may have a function of switching the display of the light modulation layer 120 based on the half scattering degree.

The storage unit 530 includes a nonvolatile storage device such as a semiconductor memory or a hard disk, and stores various programs and various data for controlling the display device 100. The storage unit 530 stores the luminance of light incident from the first space and the second space and passing through the light modulation layer 120, and the like.

It is preferable that the luminance includes the first luminance and the second luminance, the first luminance is a luminance detected in the non-transmissive display state of the display panel 11, and the second luminance is a luminance detected in the transmissive display state of the display panel 11. With such an aspect, the brightness ratio can be effectively calculated.

Here, the non-transmissive display state of the display panel 11 refers to a state in which an area of 90% or more and 100% or less of the display surface of the display panel 11 is subjected to the non-transmissive display, is preferably a state in which an area of 95% or more and 100% or less of the display surface of the display panel 11 is subjected to the non-transmissive display, and is more preferably a state in which the entire display surface of the display panel 11 is subjected to the non-transmissive display. The transmissive display state of the display panel 11 refers to a state in which an area of 90% or more and 100% or less of the display surface of the display panel 11 is subjected to the transmissive display, is preferably a state in which an area of 95% or more and 100% or less of the display surface of the display panel 11 is subjected to the transmissive display, and is more preferably a state in which the entire display surface of the display panel 11 is subjected to the transmissive display.

It is preferable that the luminance includes the first luminance and the second luminance, the first luminance is a luminance detected in a state in which the entire surface of the display panel 11 is subjected to the scattering display, and the second luminance is a luminance detected in a state in which the entire surface of the display panel 11 is subjected to the transmissive display. With such an aspect, the brightness ratio can be effectively calculated.

Figure 20:
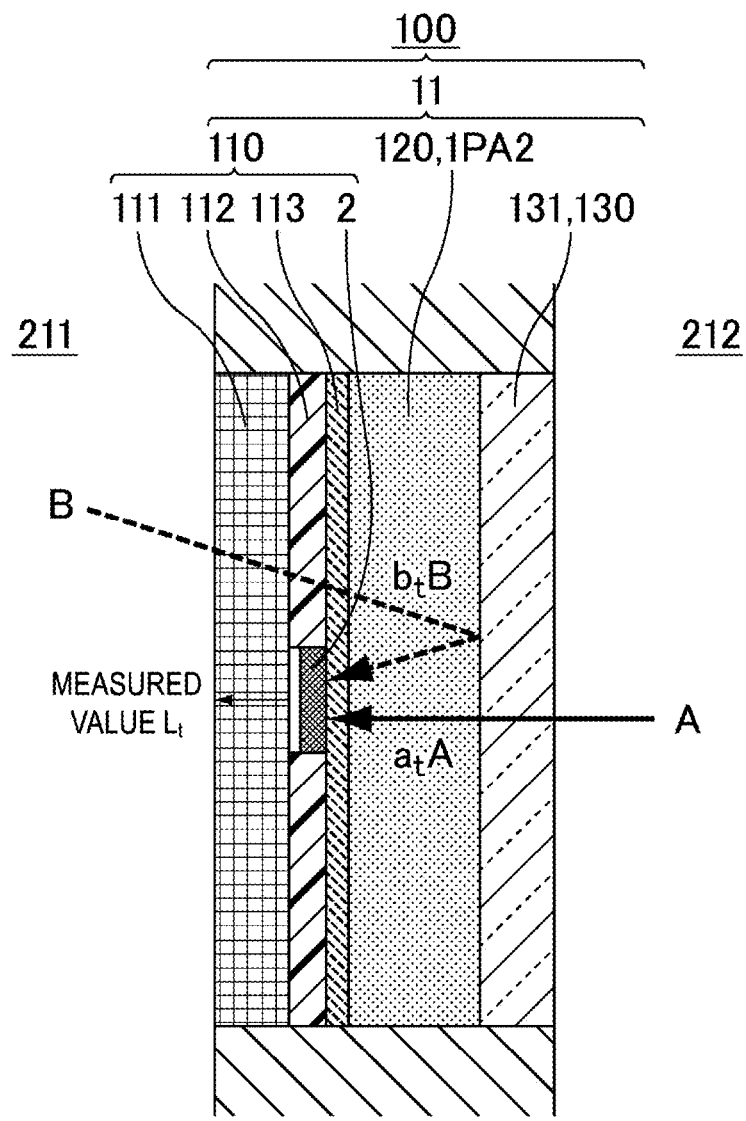
FIG. 20 is a schematic cross-sectional view for describing a case where the display device according to the first embodiment is in the transmissive mode.
Figure 21:
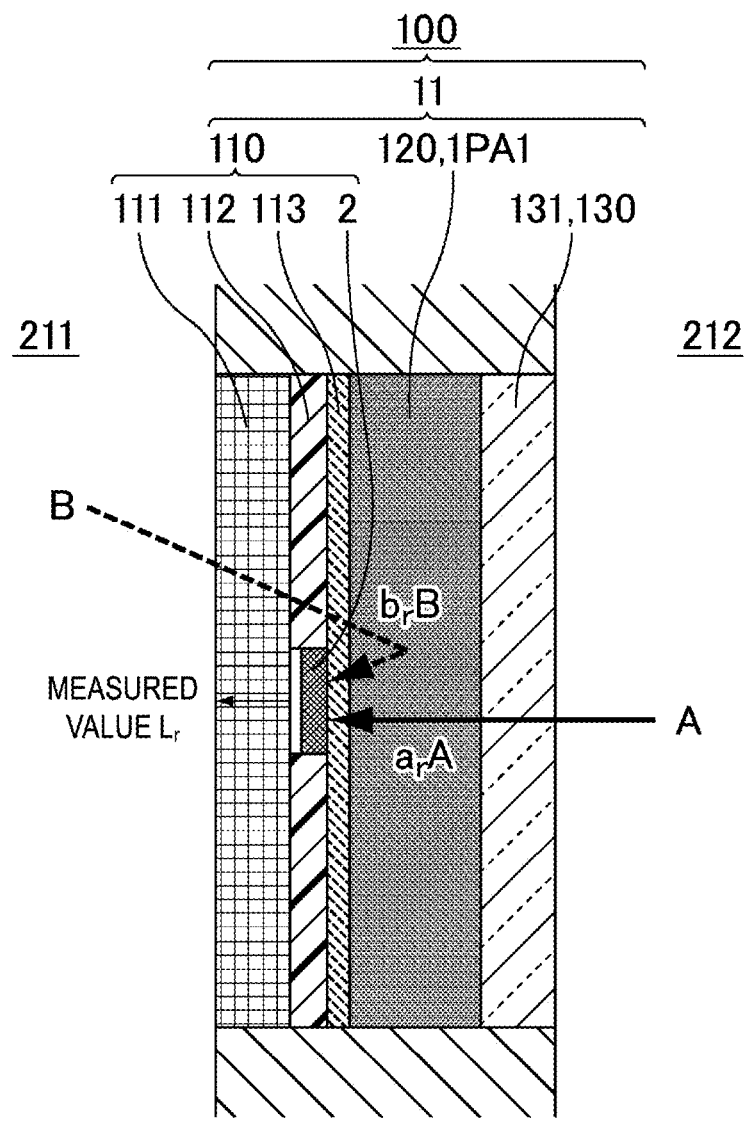
FIG. 21 is a schematic cross-sectional view for describing a case where the display device according to the first embodiment is in the full scattering mode.

FIG. 20 is a schematic cross-sectional view for describing a case where the display device according to the first embodiment is in the transmissive mode. FIG. 21 is a schematic cross-sectional view for describing a case where the display device according to the first embodiment is in the full scattering mode. An example of a method of setting the half scattering degree will be described with reference to FIGS. 20 and 21. Hereinafter, a specific method will be described in which the brightness ratio of the first space 211 and the second space 212 is obtained based on the luminance in the case where the display device 100 is in the full scattering mode and the luminance in the case where the display device 100 is in the transmissive mode, and the half scattering degree is set based on the brightness ratio. For example, the first space 211 is a space brighter than the second space 212, and specifically, the first space 211 is outdoors and the second space 212 is indoors.

It is assumed that the indoor (second space 212) brightness is A and the outdoor (first space 211) brightness is B. As illustrated in FIG. 20, when the display device 100 of the present embodiment is in the transmissive mode, the luminance of light obtained from the second space 212 and the luminance of light obtained from the first space 211 are uniquely determined by A and B, respectively, and are denoted by atA and btB, respectively. A luminance obtained by the optical sensor 2 of the display device 100 at this time is denoted by Lt.

Furthermore, as illustrated in FIG. 21, when the display device 100 of the present embodiment is in the full scattering mode, the luminance of light obtained from the indoor (second space 212) and the luminance of light obtained from the outdoor (first space 211) are uniquely determined by A and B, respectively, and are denoted by arA and brB, respectively. A luminance obtained by the optical sensor 2 of the display device 100 at this time is denoted by Lr.

The following (equation T1) and (equation R1) are satisfied, where, as described above, the indoor (second space 212) brightness is A, the outdoor (first space 211) brightness is B, and when the display device 100 is in the transmissive mode, the luminance obtained by the optical sensor 2 is Lt, the luminance of light obtained from the indoor (second space 211) is atA, and the luminance of light obtained from the outdoor (first space 212) is btB, and when the display device 100 is in the full scattering mode, the luminance obtained by the optical sensor 2 is Lr, the luminance of light obtained from the indoor (second space 211) is arA, and the luminance of light obtained from the outdoor (first space 212) is brB.

$$Lt = atA + btB \quad \text{(equation T1)}$$

$$Lr = arA + brB \quad \text{(equation R1)}$$

By solving the above (equation T1) and (equation R1) for A and B, the following (equation A1) and (equation B1) are obtained.

$$A = (brLt - btLr)/(atbr - arbt) \quad \text{(equation A1)}$$

$$B = (atLr - arLt)/(atbr - arbt) \quad \text{(equation B1)}$$

Since at, bt, ar, and br are known, A and B can be calculated from the measured values of Lt and Lr, and the relationship between the indoor (second space 212) brightness and the outdoor (first space 211) brightness can be estimated. In a case where a plurality of the optical sensors 2 are incorporated, accuracy of estimation can be improved by obtaining an average value after removing noise data or the like.

A brightness ratio R of the first space 211 and the second space 212 is obtained by, for example, the following (equation X1).

Brightness ratio $R=n(B/A)+m$ ($n$ and $m$ are real numbers)  (equation X1)

The control unit 510 calculates the brightness ratio R from the (equation X1) and sets the half scattering degree based on the brightness ratio R. In the (equation X1), when n=m=1, the half scattering degree is set, for example, as follows. When (brightness ratio R)>50, the half scattering degree is set equal to more than 90% and 100% or less. When 20<(brightness ratio R)≤50, the half scattering degree is set equal to more than 65% and 90% or less. When 10<(brightness ratio R)≤20, the half scattering degree is set equal to more than 10% and 65% or less. When 0<(brightness ratio R)≤10, the half scattering degree is set equal to 0% or more and 10% or less.

Figure 22:
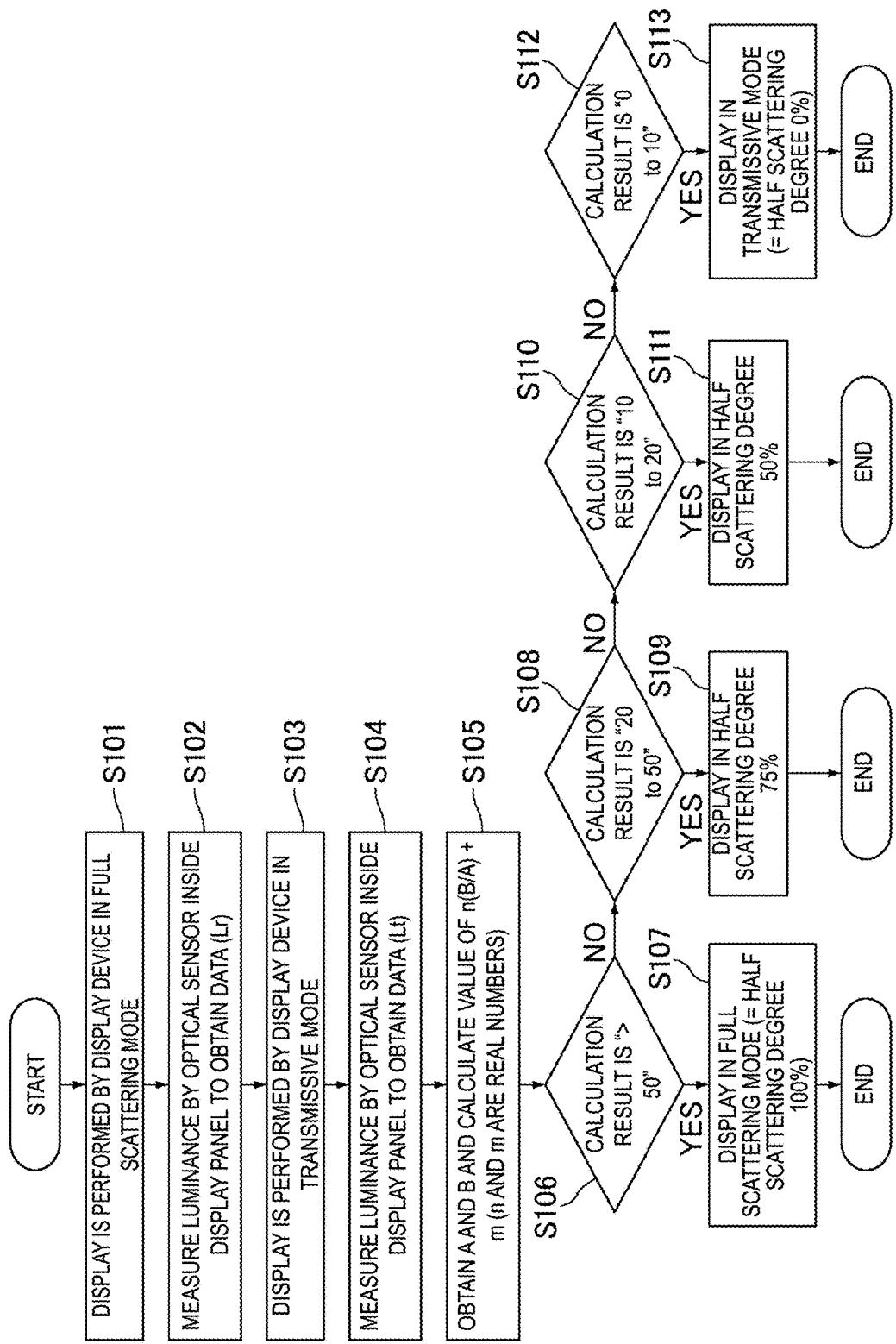
FIG. 22 is a flowchart for describing processing in a control unit included in the display device according to the first embodiment.

FIG. 22 is a flowchart for describing processing in the control unit included in the display device according to the first embodiment. More specifically, the display device 100 sets the half scattering degree as illustrated in FIG. 22 and determines the display mode.

As illustrated in FIG. 22, first, in step S101, the display is performed by the display device 100 in the full scattering mode. In step S102, a luminance is measured by the optical sensor 2 disposed inside the display panel 11 to obtain luminance data (Lr). In step S103, the display is performed by the display device 100 in the transmissive mode. In step S104, a luminance is measured by the optical sensor 2 disposed inside the display panel 11 to obtain luminance data (Lt). In step S105, the indoor (second space 212) brightness A and the outdoor (first space 211) brightness B are obtained, the brightness ratio R represented by the (equation X1) is calculated, and the process proceeds to step S106.

In step S106, if the brightness ratio R exceeds 50, then the process proceeds to step S107, the display is performed by the display device 100 in the full scattering mode (half scattering degree 100%), and the process ends.

In step S106, if the brightness ratio R does not exceed 50, then the process proceeds to step S108. In step S108, if the brightness ratio R is within a range of more than 20 and 50 or less, then the process proceeds to step S109, the display is performed by the display device 100 at the half scattering degree 75%, and the process ends.

In step S108, if the brightness ratio R is not within the range of more than 20 and 50 or less, then the process proceeds to step S110. In step S110, if the brightness ratio R is within a range of 10 or more and 20 or less, then the process proceeds to step S111, the display is performed by the display device 100 at the half scattering degree 50%, and the process ends.

In step S110, if the brightness ratio R is not within the range of 10 or more and 20 or less, then the process proceeds to step S112. In step S112, if the brightness ratio R is 0 or more and 10 or less, then the process proceeds to step S113, the display is performed by the display device 100 in the transmissive mode (half scattering degree 0%), and the process ends.

It is preferable that, every time a certain period of time elapses, the display device 100 repeats the detection of the luminance, the calculation of the numerical value based on the luminance, and the switching of the display of the light modulation layer 120 based on the numerical value. With such an aspect, appropriate display in accordance with the space can be repeated.

Figure 23:
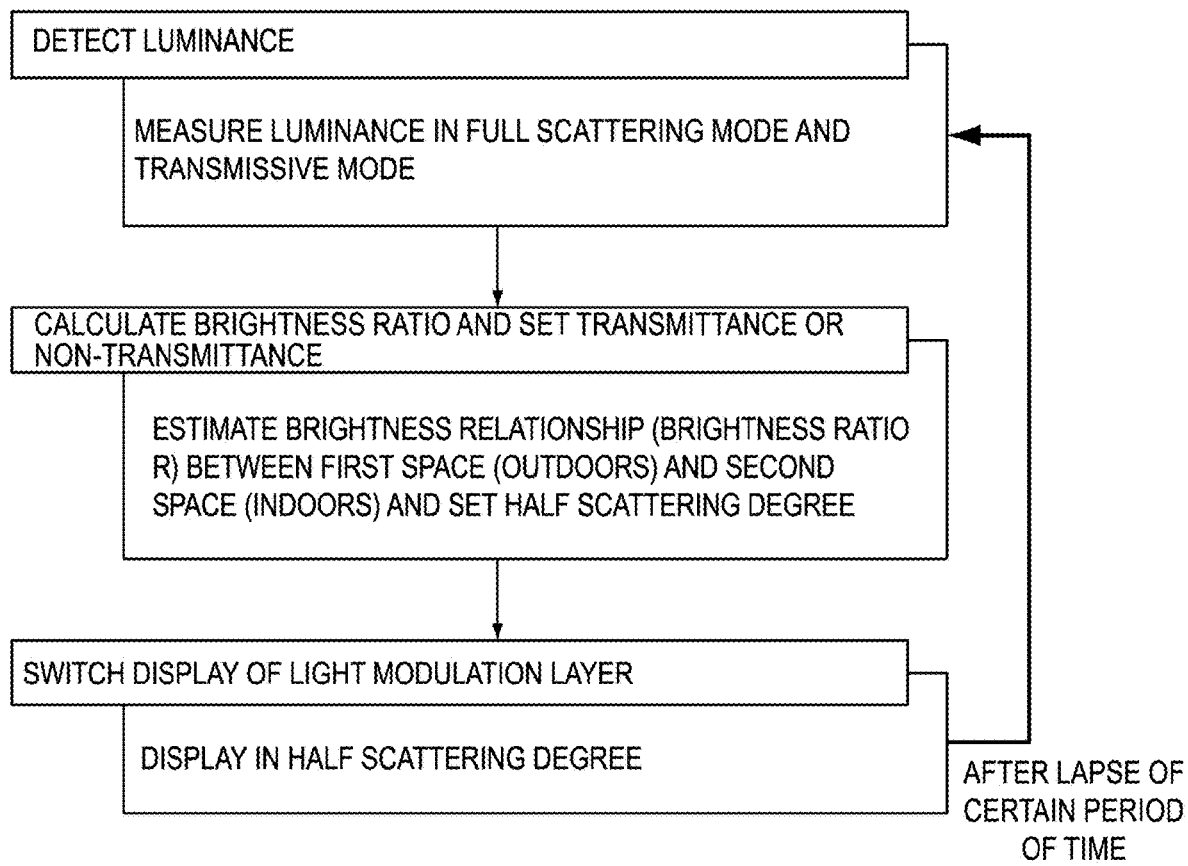
FIG. 23 is a flowchart for describing processing of automatically switching display in accordance with brightness of a space in the display device according to the first embodiment.

FIG. 23 is a flowchart for describing processing of automatically switching the display in accordance with the brightness of the space in the display device according to the first embodiment. Specifically, a system for automatically setting the half scattering degree in accordance with the space can be configured by incorporating a logic as illustrated in FIG. 23 in advance.

As illustrated in FIG. 23, it is preferable that, every time a certain period of time elapses, the display device 100 repeats the detection of the luminance, the calculation of the brightness ratio based on the luminance, the setting of the transmittance or the non-transmittance based on the brightness ratio, and the switching of the display of the light modulation layer 120 based on the transmittance or the non-transmittance. With such an aspect, display in the non-transmittance or transmittance appropriate in accordance with the space can be repeated. More specifically, display in the half scattering degree appropriate in accordance with the space can be repeated.

As described above, the display device 100 according to the present embodiment is a display device that includes the optical sensor 2, wherein modulatable scattering display can be performed, and an appropriate half scattering mode can be realized automatically in accordance with the surrounding space.

The display device 100 according to the present embodiment is equipped with the optical sensor 2 that detects outdoor and indoor illuminance environments. As illustrated in FIG. 2, the first substrate 110 included in the display device 100 according to the present embodiment is a thin film transistor (TFT) substrate including a TFT, and includes the optical sensor 2. The first substrate 110 also includes a sensor readout line and a sensor reset line.

As illustrated in FIG. 1, the display panel 11 of the present embodiment includes a modulation region 100X in which the non-transmissive display (scattering display 1PA1 in the present embodiment) and the transmissive display 1PA2 can be switched, and a non-modulation region 100Y in which the non-transmissive display (scattering display 1PA1 in the present embodiment) and the transmissive display 1PA2 cannot be switched. As illustrated in FIG. 1, the optical sensor 2 is disposed in the modulation region 100X. The optical sensor 2 impairs transparency in the transmissive display, and thus the optical sensor 2 is preferably disposed avoiding the center of the display panel 11. For example, one optical sensor 2 can be disposed at each of four corners of the modulation region 100X.

Figure 24:
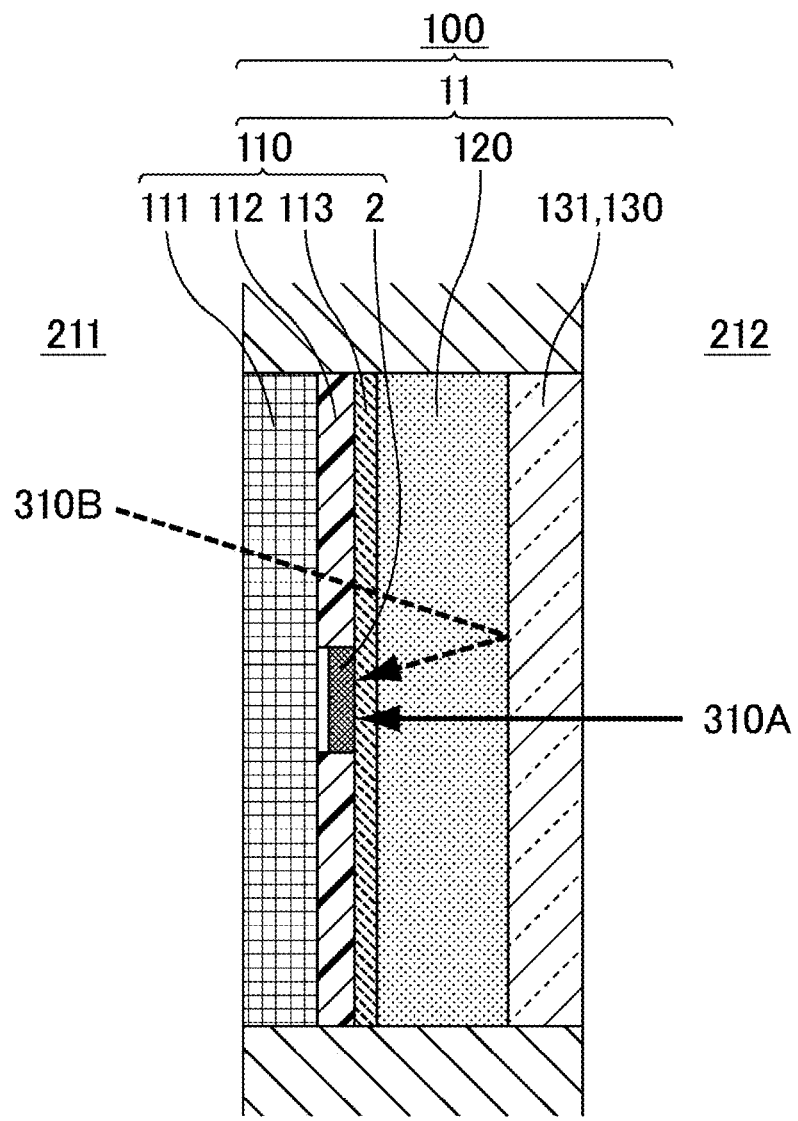
FIG. 24 is an example of a schematic cross-sectional view of a display panel according to the present embodiment.

An advantage of disposing the optical sensor 2 inside the display panel 11 will be described. FIG. 24 is an example of a schematic cross-sectional view of the display panel according to the present embodiment. As illustrated in FIG. 24, the first substrate 110 included in the display panel 11 of the present embodiment includes a first support substrate (for example, a transparent insulating substrate, more specifically, a transparent glass substrate) 111, a TFT layer 112, and an insulating layer 113 in this order, and further includes the optical sensor 2. The second substrate 130 includes a second support substrate (for example, a transparent insulating substrate, more specifically, a transparent glass substrate) 131. As illustrated in FIG. 24, in the display device 100 of the present embodiment in which the optical sensor 2 is disposed inside the display panel 11, not only direct light 310A from the second space 212 (indoors) but also direct light 310B from the first space 211 (outdoors) can be correctly detected as reflected light inside the display panel 11. Note that, although the optical sensor 2 of the present embodiment is disposed between the first support substrate 111 and the light modulation layer 120, the optical sensor may be disposed between the second support substrate 131 and the light modulation layer 120.

Figure 25:
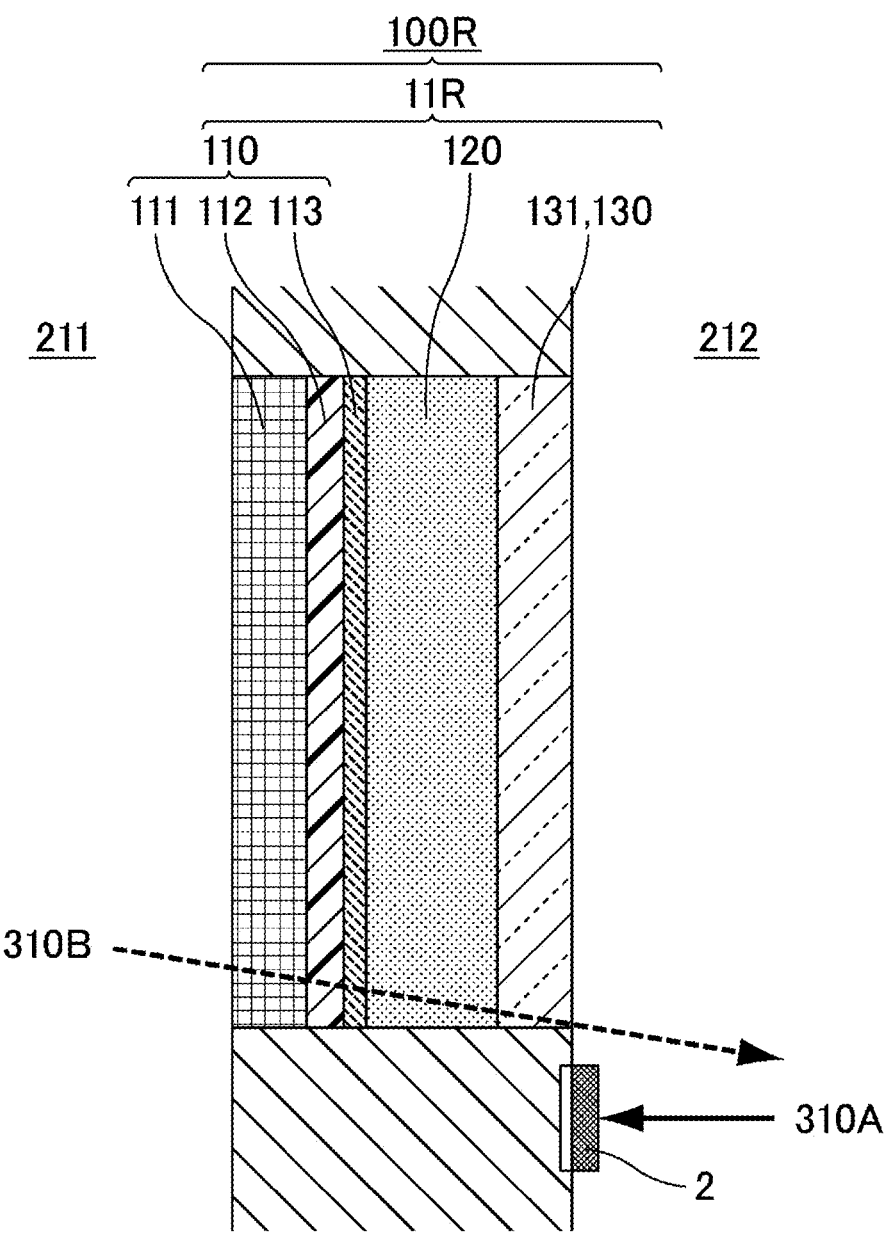
FIG. 25 is a schematic cross-sectional view for describing a case where an optical sensor is disposed outside the display panel.

On the other hand, in a case where the optical sensor is included outside the display panel, the direct light 310B from the first space 211 cannot be correctly detected for the following reason. FIG. 25 is a schematic cross-sectional view for describing a case where the optical sensor is disposed outside the display panel. As illustrated in FIG. 25, in a display device 100R in which the optical sensor 2 is disposed outside a display panel 11R, a first substrate 110R does not include the optical sensor 2. In the display device 100R, the direct light 310B from the rear surface side (the first space 211 side) of the display device 100R is reflected at a complicated manner due to the structure of the second space 212, and thus cannot be correctly detected.

Figure 26:
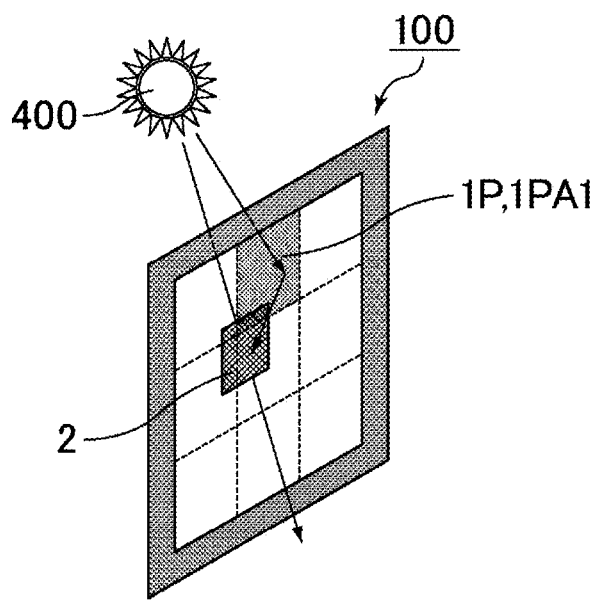
FIG. 26 is a schematic view illustrating a case where a pixel higher than the optical sensor is subjected to scattering display at a time of spatial measurement in the display device according to the first embodiment.
Figure 27:
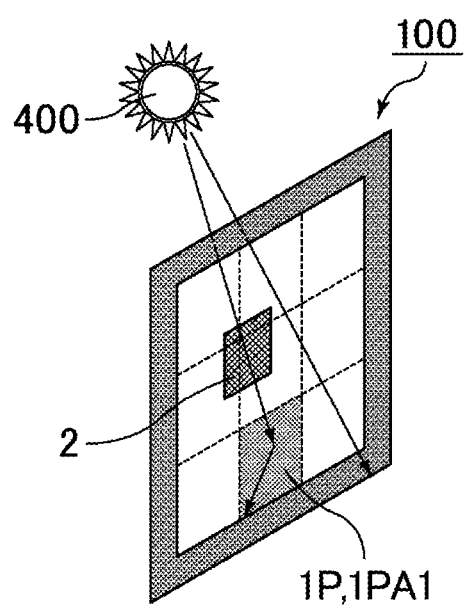
FIG. 27 is a schematic view illustrating a case where a pixel lower than the optical sensor is subjected to the scattering display at the time of the spatial measurement in the display device according to the first embodiment.

In detecting the brightness of the first space 211 and the second space 212 by the optical sensor 2, a direction of a light source can be estimated by subjecting partially the pixels 1P around the optical sensor 2 to full scattering display for the detecting. FIG. 26 is a schematic view illustrating a case where a pixel higher than the optical sensor is subjected to the scattering display at the time of spatial measurement in the display device according to the first embodiment. FIG. 27 is a schematic view illustrating a case where a pixel lower than the optical sensor is subjected to the scattering display at the time of the spatial measurement in the display device according to the first embodiment. When a light source 400 (for example, the sun) in the first space 211 (outdoors) is located higher than the display device 100, the amount of light that can be detected by the optical sensor 2 is larger when the pixel 1P located higher than the optical sensor 2 is subjected to the scattering display as illustrated in FIG. 26 than when the pixel 1P located lower than the optical sensor 2 is subjected to the scattering display as illustrated in FIG. 27. Here, the spatial measurement means a measurement of the luminance of light incident from the first space 211 and the second space 212 and passing through the light modulation layer 120.

Figure 28:
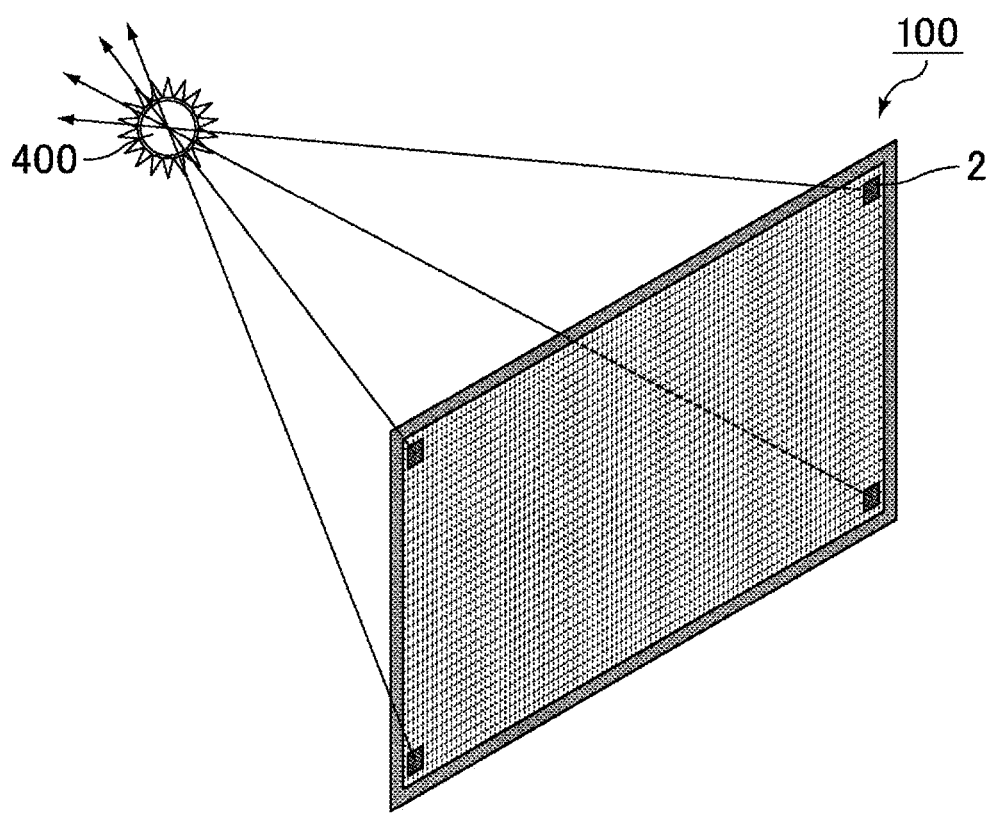
FIG. 28 is a schematic view illustrating a positional relationship between the display device according to the first embodiment and external light.

FIG. 28 is a schematic view illustrating a positional relationship between the display device according to the first embodiment and external light. As illustrated in FIG. 28, the approximate position of the light source 400 can be estimated by estimating a direction of the light source 400 at a plurality of positions inside the display device 100. With this, for example, an application method is conceivable in which an area of direct light entering the second space 212 (indoors) is estimated by estimating the position of the light source 400 (for example, the sun) in the first space 211 (outdoors), and thus the half scattering degree is adjusted. For example, only the lower half of the display panel 11 may be subjected to the scattering display. An application is conceivable in which morning and evening or summer and winter is determined based on the position of the sun and thereby content to be displayed on the display device 100 is selected.

Figure 29:
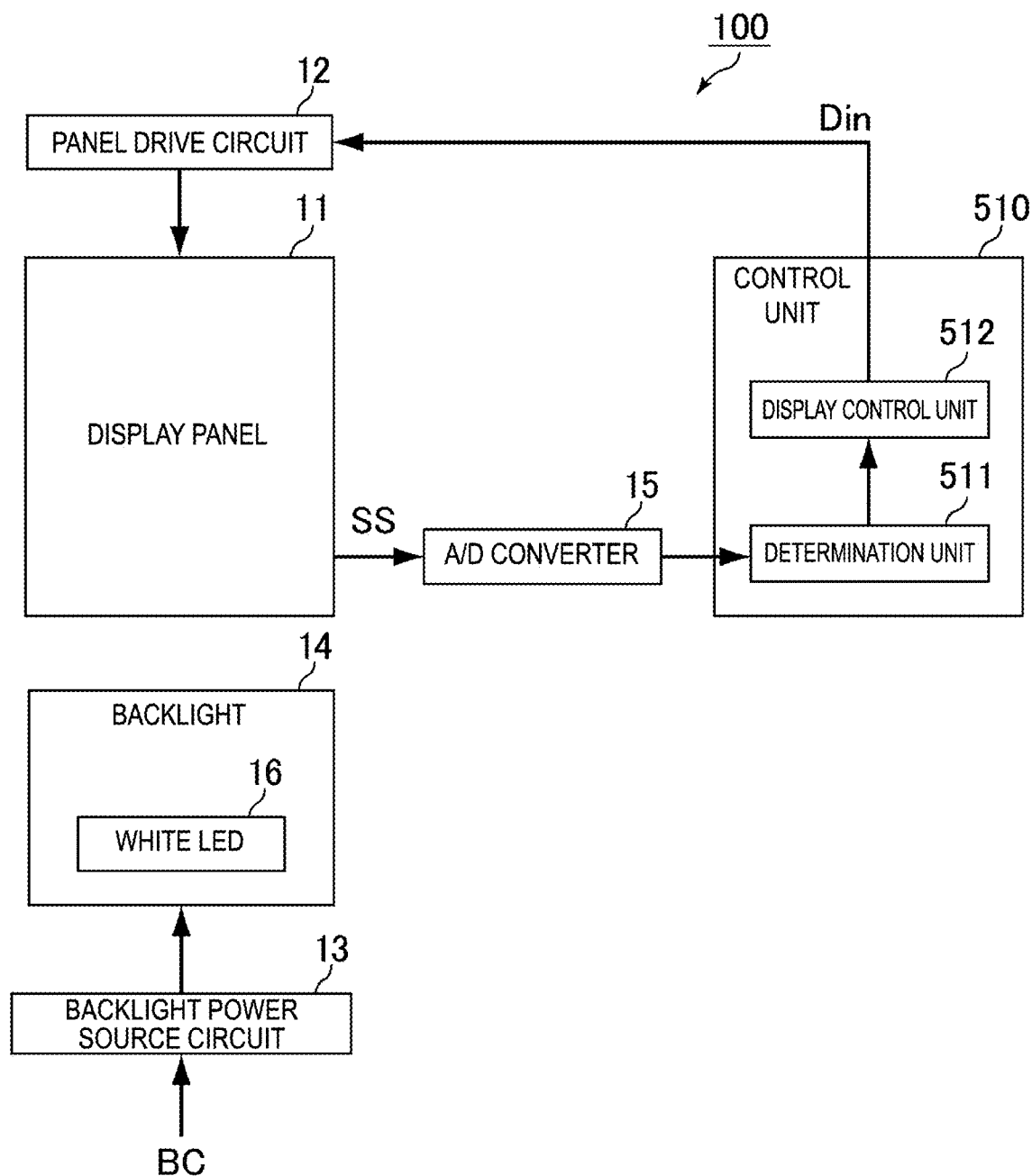
FIG. 29 is a block diagram illustrating a configuration of the display device according to the first embodiment.

FIG. 29 is a block diagram illustrating a configuration of the display device according to the first embodiment. The display device 100 illustrated in FIG. 29 includes the display panel 11, a panel drive circuit 12, a backlight power source circuit 13, a backlight 14, an A/D converter 15, and the control unit 510.

The display panel 11 includes the plurality of pixels 1P disposed two dimensionally and a plurality of the optical sensors 2. The display panel 11 outputs an output signal of the optical sensor 2 as a sensor output signal SS. The A/D converter 15 converts the sensor output signal SS in analog into a digital signal. The control unit 510 calculates the brightness ratio based on the digital signal output from the A/D converter 15, and sets the non-transmittance or the transmittance (in the present embodiment, the half scattering degree as the non-transmittance) based on the brightness ratio. Further, the control unit 510 generates display data Din for causing each pixel 1P to be subjected to the non-transmissive display (in the present embodiment, the scattering display 1PA1) or the transmissive display 1PA2 based on the non-transmittance or the transmittance, and outputs the display data Din to the panel drive circuit 12 to cause each pixel 1P to be subjected to the non-transmissive display or the transmissive display 1PA2. Note that the panel drive circuit 12 may be included in the control unit 510.

For example, the determination unit 511 included in the control unit 510 may calculate the brightness ratio based on the digital signal output from the A/D converter 15, and may set the non-transmittance or the transmittance based on the brightness ratio. The display control unit 512 included in the control unit 510 may generates display data Din for causing each pixel 1P to be subjected to the non-transmissive display or the transmissive display 1PA2 based on the non-transmittance or the transmittance, and outputs the display data Din to the panel drive circuit 12 to cause each pixel 1P to be subjected to the non-transmissive display or the transmissive display 1PA2.

The backlight 14 includes a plurality of white light emitting diodes (LEDs) 16, and irradiates the back face of the display panel 11 with light (backlight light). The backlight power source circuit 13 switches whether to supply a power supply voltage to the backlight 14 in accordance with a backlight control signal BC input from the outside. Hereinafter, it is assumed that the backlight power source circuit 13 supplies the power supply voltage when the backlight control signal BC is at a high level and does not supply the power supply voltage when the backlight control signal BC is at a low level. The backlight 14 is turned on while the backlight control signal BC is at the high level, and is turned off while the backlight control signal BC is at the low level. The backlight 14 is preferably of an edge type. In the present embodiment, an aspect including the backlight 14 will be described, but the display device 100 need not include the backlight.

Figure 30:
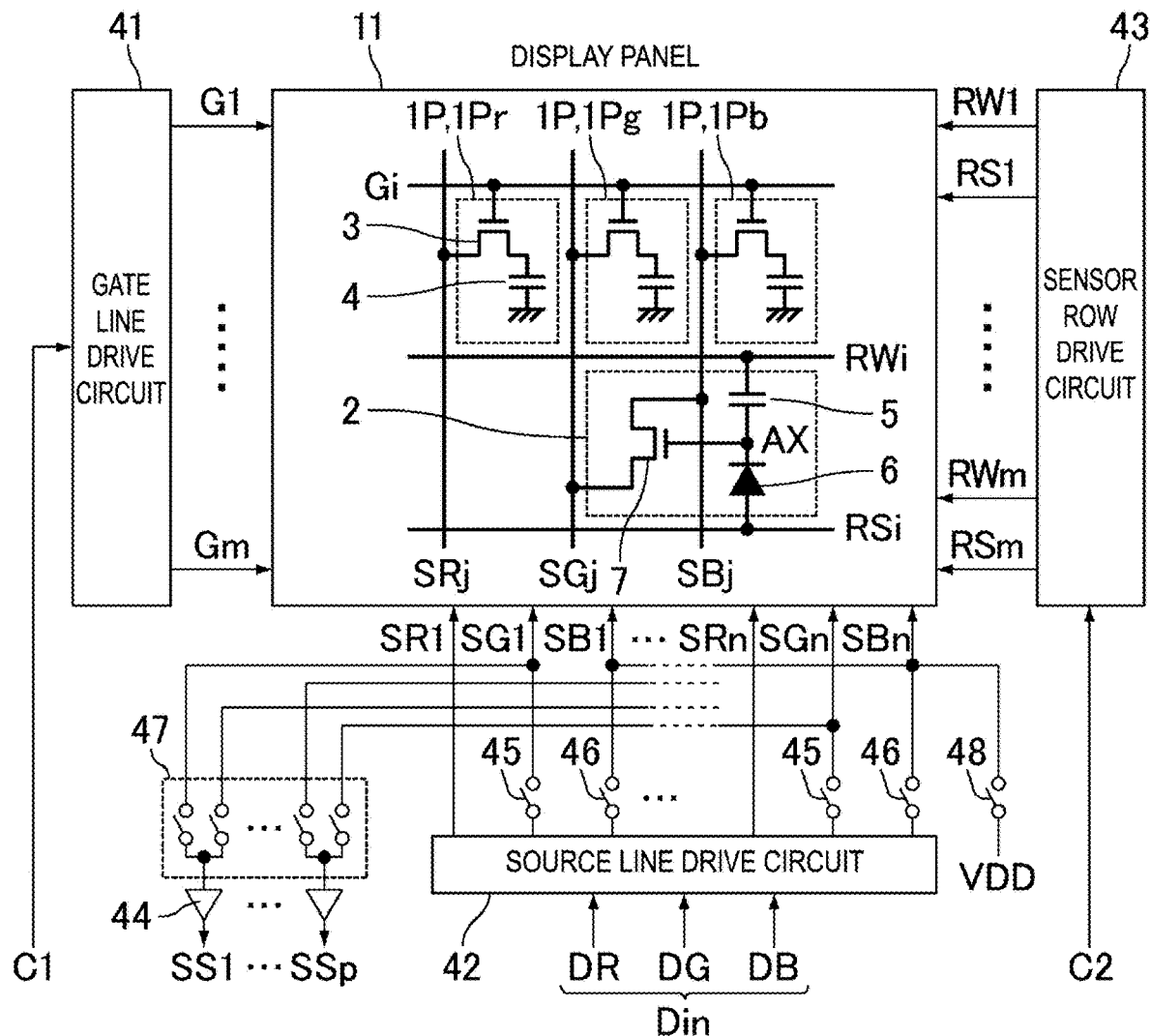
FIG. 30 is a block diagram illustrating a configuration of the display panel included in the display device according to the first embodiment and a peripheral circuit.

FIG. 30 is a block diagram illustrating a configuration of the display panel included in the display device according to the first embodiment and a peripheral circuit. As illustrated in FIG. 30, the display panel 11 includes m gate lines G1 to Gm, 3n source lines SR1 to SRn, SG1 to SGn, SB1 to SBn, and (m×3n) pixels 1P. In addition, the display panel 11 includes (m×n) optical sensors 2, m sensor readout lines RW1 to RWm, and m sensor reset lines RS1 to RSm. The display panel 11 is formed using continuous grain (CG) silicon.

The gate lines G1 to Gm are disposed parallel to each other. The source lines SR1 to SRn. SG1 to SGn, and SB1 to SBn are disposed parallel to each other so as to be orthogonal to the gate lines G1 to Gm. The sensor readout lines RW1 to RWm and the sensor reset lines RS1 to RSm are disposed in parallel with the gate lines G1 to Gm.

The gate lines G1 to Gm, the source lines SR1 to SRn, SG1 to SGn, and SB1 to SBn are formed as a whole in a lattice pattern so as to partition each pixel 1P. A thin film transistor 3 as a switching element is disposed at an intersection of each of the gate lines G1 to Gm and a respective one of the source lines SR1 to SRn, SG1 to SGn, and SB1 to SBn. The pixels 1P are disposed two dimensionally as a whole, with m pixels in the column direction (vertical direction in FIG. 30) and 3n pixels in the row direction (horizontal direction in FIG. 30). Each pixel 1P is classified into an R pixel 1Pr, a G pixel 1Pg, and a B pixel 1Pb depending on what color of color filter is provided. The pixels 1Pr, 1Pg, and 1Pb of three types are disposed side by side in the row direction, and three pixels form one pixel 1P.

Each pixel 1P includes the TFT 3 and a liquid crystal capacitance 4. A gate terminal of the TFT 3 is connected to a gate line Gi (i is an integer of 1 or more and m or less), a source terminal is connected to any one of source lines SRj, SGj, and SBj (j is an integer of 1 or more and n or less), and a drain terminal is connected to one electrode of the liquid crystal capacitance 4. A common electrode voltage is applied to the other electrode of the liquid crystal capacitance 4. Hereinafter, each of the source lines SG1 to SGn connected to a G pixel 1Pg is referred to as a G source line, and each of the source lines SB1 to SBn connected to a B pixel 1Pb is referred to as a B source line. Note that the pixel 1P may include an auxiliary capacity.

Light transmittance of the pixel 1P (brightness of a subpixel) is determined by a voltage written to the pixel 1P. In order to write a certain voltage to the pixel 1P connected to the gate line Gi and the source line SXj (X is any one of R, G, and B), a high-level voltage (a voltage for turning on the TFT 3) is applied to the gate line Gi, and a voltage to be written is applied to the source line SXj. By writing a voltage corresponding to the display data Din to the pixel 1P, the luminance of the subpixel can be set to a desired level.

The optical sensor 2 includes a capacitor 5, a photodiode 6, and a sensor preamplifier 7, and is provided for each pixel 1P. One electrode of the capacitor 5 is connected to a cathode terminal of the photodiode 6 (hereinafter, this connection point is referred to as a node AX). The other electrode of the capacitor 5 is connected to a sensor readout line RWi, and an anode terminal of the photodiode 6 is connected to a sensor reset line RSi. The sensor preamplifier 7 includes a TFT including a gate terminal connected to the node AX, a drain terminal connected to the B source line SBj, and a source terminal connected to the G source line SGj.

In order to detect the amount of light (luminance) by the optical sensor 2 connected to the sensor readout line RWi, the B source line SBj, or the like, a predetermined voltage is applied to the sensor readout line RWi and the sensor reset line RSi, and a power supply voltage VDD is applied to the B source line SBj. After the predetermined voltage is applied to the sensor readout line RWi and the sensor reset line RSi, when light is incident on the photodiode 6, a current corresponding to the amount of incident light flows through the photodiode 6, and a voltage at the node AX decreases by the amount of the current that has flowed. When the power supply voltage VDD is applied to the B source line SBj, the voltage at the node AX is amplified by the sensor preamplifier 7, and the amplified voltage is output to the G source line SGj. Thus, the amount of light detected by the optical sensor 2 can be obtained based on the voltage at the G source line SGj.

A gate line drive circuit 41, a source line drive circuit 42, a sensor row drive circuit 43, p (p is an integer of 1 or more and n or less) sensor output amplifiers 44, and a plurality of switches 45 to 48 are provided around the display panel 11. The gate line drive circuit 41, the source line drive circuit 42, and the sensor row drive circuit 43 correspond to the panel drive circuit 12 in FIG. 29.

The source line drive circuit 42 includes 3n output terminals corresponding to the 3n source lines. One switch 45 is provided between each of the G source lines SG1 to SGn and a respective one of the n output terminals corresponding to the G source lines SG1 to SGn. One switch 46 is provided between each of the B source lines SB1 to SBn and a respective one of the n output terminals corresponding to the B source lines SB1 to SBn. The G source lines SG1 to SGn are divided into groups, each of the groups including p G source lines. In each of the groups, one switch 47 is provided between the k-th (k is an integer of 1 or more and p or less) G source line and an input terminal of the k-th sensor output amplifier 44. Each of the B source lines SB1 to SBn is connected to one end of the switch 48, and the power supply voltage VDD is applied to the other end of the switch 48. The number of each of the switches 45 to 47 included in FIG. 30 is n, and the number of switch 48 is one.

The circuits illustrated in FIG. 30 perform different operations in a display period and a sensing period. In the display period, the switches 45 and 46 are in the on state, and the switches 47 and 48 are in the off state. On the other hand, in the sensing period, the switches 45 and 46 are in the off state, the switch 48 is in the on state, and the switches 47 are in the on state in a time division manner so that the G source lines SG1 to SGn are sequentially connected to the input terminal of the sensor output amplifier 44 for each group.

In the display period, the gate line drive circuit 41 and the source line drive circuit 42 operate. In accordance with a timing control signal C1, the gate line drive circuit 41 selects one gate line from among the gate lines G1 to Gm for each one line time, applies a high-level voltage to the selected gate line, and applies a low-level voltage to the remaining gate lines. The source line drive circuit 42 drives the source lines SR1 to SRn, SG1 to SGn, and SB1 to SBn in a line-sequential manner based on the display data Din (more specifically, display data DR of the R pixel, display data DG of the G pixel, and display data DB of the B pixel). More specifically, the source line drive circuit 42 stores the display data DR, DG, and DB for at least one row, and applies a voltage corresponding to the display data for one row to the source lines SR1 to SRn, SG1 to SGn, and SB1 to SBn for each one line time. Note that the source line drive circuit 42 may drive the source lines SR1 to SRn, SG1 to SGn, and SB1 to SBn in a dot sequential manner.

In the sensing period, the sensor row drive circuit 43 and the sensor output amplifiers 44 operate. In accordance with a timing control signal C2, the sensor row drive circuit 43 selects one signal line from among the sensor readout lines RW1 to RWm and one signal line from among the sensor reset lines RS1 to RSm for each one line time, applies a predetermined readout voltage and a predetermined reset voltage to the selected sensor readout line and sensor reset line, respectively, and applies a voltage different from the voltage at the time of selection to the other signal lines. Note that, typically, the length of the one line time is different between the display period and the sensing period. Each of the sensor output amplifiers 44 amplifies the voltage selected by a respective one of the switches 47 and outputs the amplified voltage as a respective one of the sensor output signals SS1 to SSp.

Figure 31:
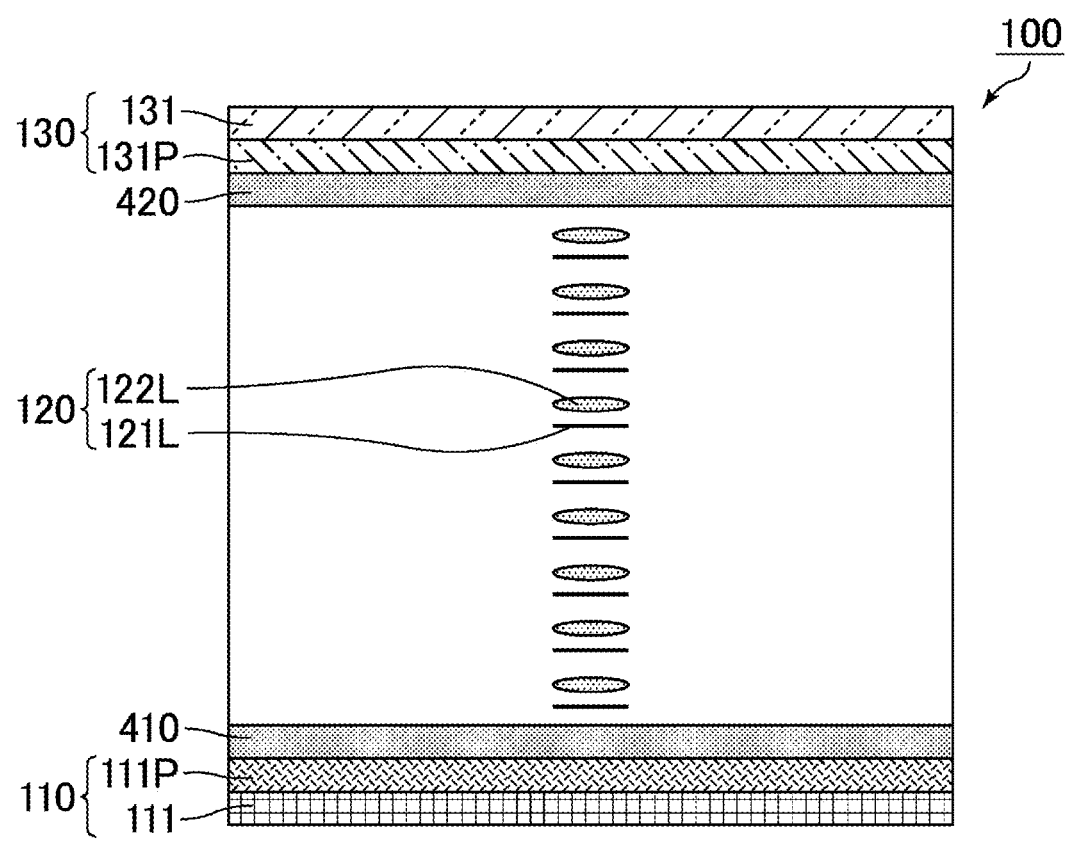
FIG. 31 is a schematic cross-sectional view illustrating a transmissive display state of the light modulation layer included in the display device according to the first embodiment.
Figure 32:
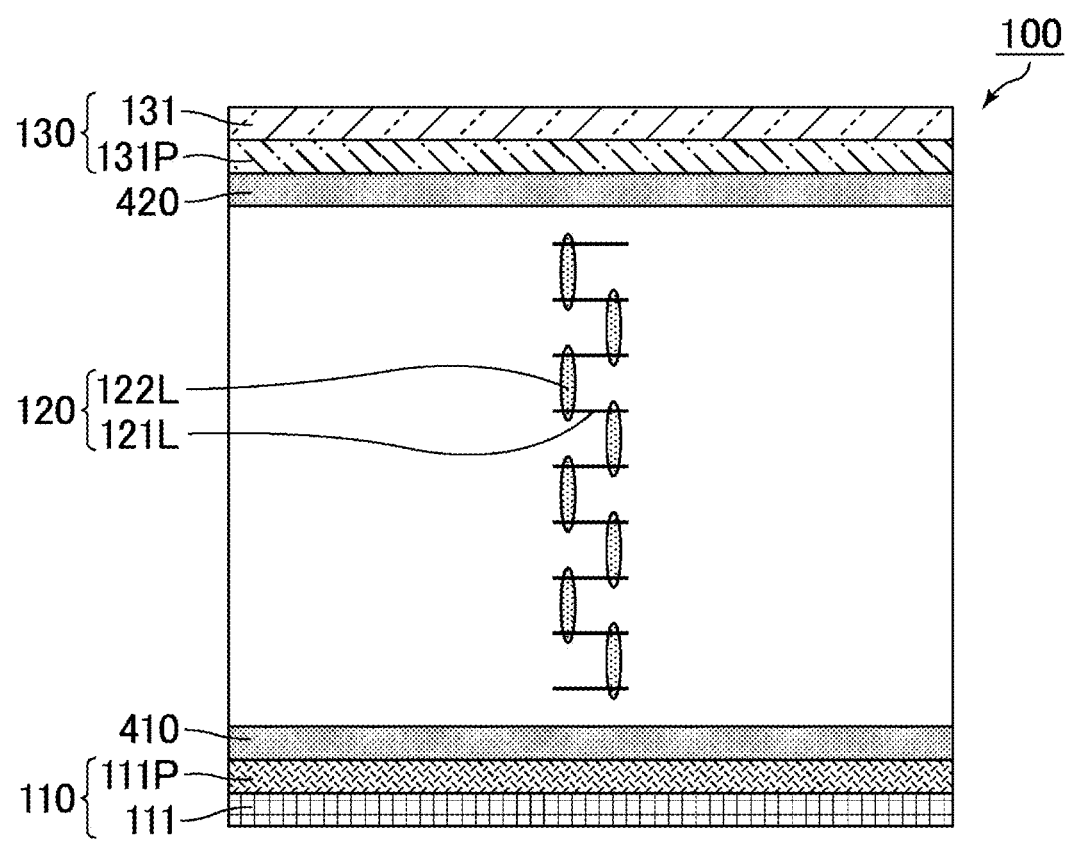
FIG. 32 is a schematic cross-sectional view illustrating a scattering display state of the light modulation layer included in the display device according to the first embodiment.

FIG. 31 is a schematic cross-sectional view illustrating the transmissive display state of the light modulation layer included in the display device according to the first embodiment. FIG. 32 is a schematic cross-sectional view illustrating the scattering display state of the light modulation layer included in the display device according to the first embodiment.

As illustrated in FIGS. 31 and 32, the first substrate 110 constitutes an active matrix substrate. Specifically, the first substrate 110 includes various signal lines (gate lines, source lines, and the like), a TFT, and an insulating layer, which are not illustrated, on the first support substrate 111, and includes a first electrode 111P (pixel electrode) thereon. The various signal lines are driven by a drive circuit (a gate line drive circuit, a source line drive circuit, or the like).

The second substrate 130 includes a second electrode 131P (common electrode) on the second support substrate 131.

The first electrode 111P and the second electrode 131P are formed from a transparent conductive film such as indium tin oxide (ITO), indium zinc oxide (IZO), zinc oxide, and tin oxide. The first electrode 111P is formed divided for each of the pixels 1P, and the second electrode 131P is formed in a solid-like shape common to all of the pixels 1P. Note that, similarly to the first electrode 111P, the second electrode 131P may be formed divided for each of the pixels 1P.

In the present embodiment, the non-transmissive display is the scattering display. As illustrated in FIGS. 31 and 32, the light modulation layer 120 includes a polymer network 121L and liquid crystal components 122L. With such an aspect, the alignment of the liquid crystal components 122L can be controlled in accordance with the voltage applied to the light modulation layer 120 and the transmittance of the light modulation layer 120 can be changed.

In the light modulation layer 120, a fibrous matrix of a cured product of the photopolymerizable liquid crystal compound is aggregated to form the three-dimensionally continuous polymer network 121L, and the liquid crystal components 122L are in a phase-separated state in the polymer network 121L. The light modulation layer 120 includes the polymer network 121L constituted by the cured product of the photopolymerizable liquid crystal compound and the liquid crystal components 122L. When no voltage is applied, the light modulation layer 120 is subjected to the transmissive display, and when a voltage is applied, the alignment of the liquid crystal components 122L is changed and thus the light modulation layer 120 is subjected to the scattering display.

Here, "when no voltage is applied" refers to as a time when the voltage applied to the light modulation layer 120 is less than a threshold voltage (including no voltage application), and "when a voltage is applied" refers to as a time when the voltage applied to the light modulation layer 120 is the threshold voltage or more. "When no voltage is applied" is also referred to as a no voltage applied state, and "when a voltage is applied" is also referred to as a voltage applied state.

Alignment states of the liquid crystal components 122L in the transmissive display and the scattering display will be described below with reference to FIGS. 31 and 32.

As illustrated in FIG. 31, the polymer network 121L and the liquid crystal components 122L preferably have substantially the same alignment direction when no voltage is applied. FIG. 31 illustrates a case where both the polymer network 121L and the liquid crystal components 122L are homogeneously aligned with respect to the main surface of the first substrate 110 and the main surface of the second substrate 130. When no voltage is applied, there are almost no refractive difference in an extraordinary refractive index ne between the liquid crystal components 122L and the polymer network 121L and no refractive difference in an ordinary refractive index no between the liquid crystal components 122L and the polymer network 121L, in all directions including the thickness direction of the light modulation layer 120. Thus, the light incident on the light modulation layer 120 is transmitted through the light modulation layer 120, and the light modulation layer 120 is subjected to the transmissive display. Note that the state in which there are almost no refractive difference in the extraordinary refractive index ne between the liquid crystal components 122L and the polymer network 121L and no refractive difference in the ordinary refractive index no between the liquid crystal components 122L and the polymer network 121L, in all directions including the thickness direction of the light modulation layer 120, can be said to be a state in which the refractive indices of the liquid crystal components 122L and the polymer network 121L are match.

The transmissive display means display having transparency to light. The transmissive display means that the transmittance is 48% or more and 100% or less, and the transmittance is preferably 56% or more and 100% or less. In the present embodiment, the light modulation layer 120 subjected to the transmissive display is transparent to visible light. In the present specification, the transmittance refers to parallel light transmittance.

The transmittance of the light modulation layer 120 subjected to the transmissive display can be obtained, for example, as follows. A luminance in a case where the display panel 11 whose entire surface is subjected to the transmissive display is disposed on a normal backlight (a light source for a liquid crystal display device) including a halogen lamp as a light source and a luminance in a case where nothing is disposed on the backlight are measured at a light receiving angle of 2° using a luminance meter (SR-UL1) manufactured by Topcon Co., Ltd. A measurement wavelength is about 550 nm. The transmittance of the light modulation layer 120 subjected to the transmissive display can be obtained by dividing the luminance in the case where the display panel 11 whose entire surface is subjected to the transmissive display is disposed on the backlight by the luminance in the case where nothing is disposed on the backlight.

As illustrated in FIG. 32, when the voltage is applied, the polymer network 121L remain horizontally aligned with respect to the main surface of the first substrate 110 and the main surface of the second substrate 130, but the liquid crystal components 122L are vertically aligned. When the voltage is applied, the alignment direction of the liquid crystal components 122L is changed by an electrical field formed in the light modulation layer 120, whereas the polymer network 121L is not affected by the electrical field. Thus, the refractive difference in the extraordinary refractive index ne between the liquid crystal components 122L and the polymer network 121L and the refractive difference in the ordinary refractive index no between the liquid crystal components 122L and the polymer network 121L are large in all directions including the thickness direction of the light modulation layer 120. Thus, the light incident on the light modulation layer 120 is scattered in the light modulation layer 120, and the light modulation layer 120 is subjected to the scattering display. Note that the state in which the refractive difference in the extraordinary refractive index ne between the liquid crystal components 122L and the polymer network 121L and the refractive difference in the ordinary refractive index no between the liquid crystal components 122L and the polymer network 121L are large, in all directions including the thickness direction of the light modulation layer 120, can be said to be a state in which the refractive indices of the liquid crystal components 122L and the polymer network 121L are mismatched.

The non-transmissive display means display in which light does not transmit. The non-transmissive display means that the transmittance is 0% or more and 20% or less and the transmittance is preferably 0% or more and 10% or less.

The transmittance of the light modulation layer 120 subjected to the non-transmissive display can be obtained, for example, as follows. A luminance in a case where the display panel 11 whose entire surface is subjected to the non-transmissive display is disposed on a normal backlight (a light source for a liquid crystal display device) including a halogen lamp as a light source and a luminance in a case where nothing is disposed on the backlight are measured at a light receiving angle of 2° using a luminance meter (SR-UL1) manufactured by Topcon Co., Ltd. A measurement wavelength is about 550 nm. The transmittance of the light modulation layer 120 subjected to the non-transmissive display can be obtained by dividing the luminance in the case where the display panel 11 whose entire surface is subjected to the non-transmissive display is disposed on the backlight by the luminance in the case where nothing is disposed on the backlight.

The light modulation layer 120 of the present embodiment performs the scattering display as the non-transmissive display. The scattering display means display in which light is scattered. The scattering display means that haze indicating the light scattering rate is 5% or more and 100% or less and the haze is preferably 15% or more and 100% or less. In the present embodiment, the light modulation layer 120 subjected to the scattering display scatters visible light. Thus, the light modulation layer 120 subjected to the scattering display is in a state similar to frosted glass.

The haze of the light modulation layer 120 subjected to the scattering display is measured by a method conforming to JIS K 7136. The haze can be measured using a halogen lamp as the light source by, for example, a turbidimeter "Haze Meter NDH2000" manufactured by Nippon Denshoku Industries Co., Ltd.

As described above, by changing the refractive difference of ne and the refractive difference of no between the liquid crystal components 122L and the polymer network 121L in the light modulation layer 120, the display device 100 adjusts the amount of light transmitted through the display panel 11, and thus a polarizer required in a general liquid crystal display device is not required.

The photopolymerizable liquid crystal compound for forming the polymer network 121L is, for example, a compound that exhibits a liquid crystal phase at room temperature, is miscible with the liquid crystal components 122L, and is phase-separated from the liquid crystal components 122L when a polymer is formed through curing by irradiation with ultraviolet light.

Examples of the photopolymerizable liquid crystal compound include monomers having: a substituent (hereinafter, also referred to as a mesogenic group) such as a biphenyl group, a terphenyl group, a naphthalene group, a phenyl benzoate group, an azobenzene group, and derivatives thereof; a photoreactive group such as a cinnamoyl group, a chalcone group, a cinnamylidene group, a 13-(2-phenyl) acryloyl group, a cinnamate group, and derivatives thereof; and a polymerizable group such as an acrylate, a methacrylate, a maleimide, an N-phenylmaleimide, and a siloxane. The polymerizable group is preferably an acrylate. The number of polymerizable groups per molecule of the photopolymerizable liquid crystal compound is not particularly limited, but is preferably one or two.

The liquid crystal components 122L may be configured not containing a polymerizable group such as an acrylate, a methacrylate, a maleimide, an N-phenylmaleimide, or a siloxane.

In the present embodiment, the liquid crystal components 122L may have positive dielectric constant anisotropy (Δs) as defined by the following (equation L), or may have negative dielectric constant anisotropy (Δs), but when alignment films 410 and 420 to be described later are horizontal alignment films, preferably have positive dielectric constant anisotropy. With such an aspect, strong scattering and low voltage driving can be more effectively achieved in a compatible manner. The liquid crystal components (liquid crystal molecules) having positive dielectric constant anisotropy is aligned in a direction parallel to the electrical field direction, and the liquid crystal components (liquid crystal molecules) having negative dielectric constant anisotropy is aligned in a direction perpendicular to the electrical field direction. Note that the liquid crystal components (liquid crystal molecules) having positive dielectric constant anisotropy is also referred to as positive-working liquid crystal, and the liquid crystal components (liquid crystal molecules) having negative dielectric constant anisotropy is also referred to as negative-working liquid crystal. The major axis direction of the liquid crystal components (liquid crystal molecules) is the direction of the slow axis. The major axis direction of the liquid crystal components (liquid crystal molecules) when no voltage is applied is also referred to as a direction of the initial alignment of the liquid crystal components (liquid crystal molecules).

$$\Delta\varepsilon = \text{(dielectric constant of the liquid crystal components (liquid crystal molecules) in a major axis direction)} - \text{(dielectric constant of the liquid crystal components (liquid crystal molecules) in a minor axis direction)} \quad \text{(equation L)}$$

As the liquid crystal components 122L, for example, a tolan-based liquid crystal material (a liquid crystal material having a —C≡C— (carbon-carbon triple bond) as a linking group) can be used.

Preferably, the refractive index anisotropy Δn of the liquid crystal components 122L is from 0.18 to 0.24, the dielectric constant anisotropy Δε of the liquid crystal components 122L is from 15 to 25, and a rotational viscosity γ1 of the liquid crystal components 122L is from 100 mPa·s to 300 mPa·s. With such an aspect, strong scattering and low voltage driving can be effectively achieved in a compatible manner, and a response speed comparable to a typical liquid crystal display device that does not contain a polymer network can be realized. Such an effect can be achieved by setting the refractive index anisotropy Δn, the dielectric constant anisotropy Δε, and the rotational viscosity γ1 of the liquid crystal components 122L all within the ranges described above.

Specific examples of the tolan-based liquid crystal material include liquid crystal materials having a structure represented by the following general formula (L1).

[Chemical Formula 1]

(L1)

(Wherein, $Q_1$ and $Q_2$ each independently represent an aromatic ring group, X represents a fluorine group or a cyano group, and $n_1$ and $n_2$ each independently represent 0 or 1.)

In general formula (L1) above, $n_1$ and $n_2$ are not simultaneously 0. That is, the sum of $n_1$ and $n_2$ is 1 or 2.

The aromatic ring group in general formula (L1) above may have a substituent.

In general formula (L1) above, preferably, $Q_1$ and $Q_2$ are each independently a structure of any of the following general formulas (L2-1) to (L2-7).

[Chemical Formula 2]

(L2-1)

(L2-2)

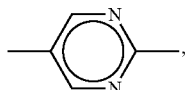
(L2-3)

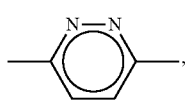
(L2-4)

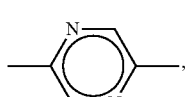
(L2-5)

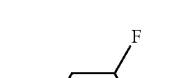
(L2-6)

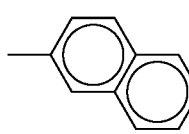
(L2-7)

Examples of specific structures of the liquid crystal material having a structure represented by the above general formula (L1) include the following structures (L3-1) to (L3-21).

[Chemical Formula 3]

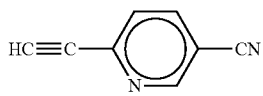
(L3-1)

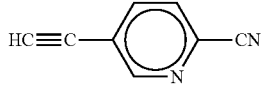
(L3-2)

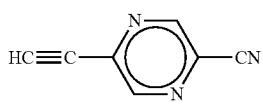
(L3-3)

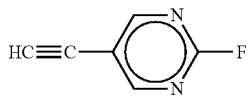
(L3-4)

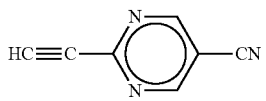
(L3-5)

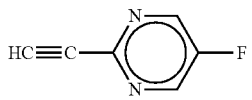
(L3-6)

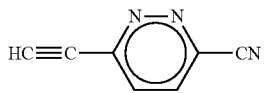
(L3-7)

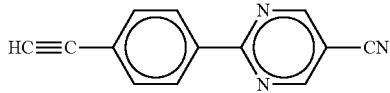
(L3-8)

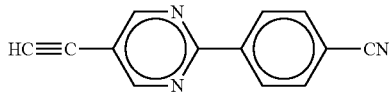
(L3-9)

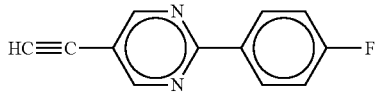
(L3-10)

[Chemical Formula 4]

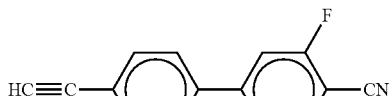
(L3-11)

(L3-12)

(L3-13)

(L3-14)

(L3-15)

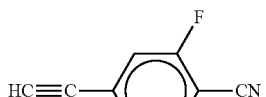
(L3-16)

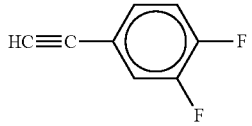
(L3-17)

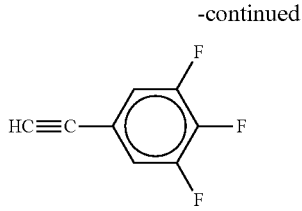

(L3-18)

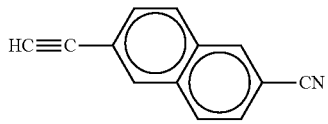

(L3-19)

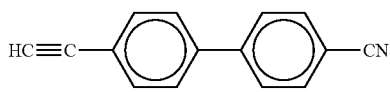

(L3-20)

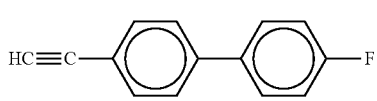

(L3-21)

The weight ratio of the liquid crystal components 122L to the polymer network 121L is preferably liquid crystal components:polymer network=90:10 to 97:3. In other words, preferably, the weight ratio of the liquid crystal components 122L is from 90 to 97, and when the weight ratio of the liquid crystal components 122L is 90 or more, the weight ratio of the polymer network 121L is 10 or less, and when the weight ratio of the liquid crystal components 122L is 97 or less, the weight ratio of the polymer network 121L is 3 or more. With such an aspect, strong scattering and low voltage driving can be effectively achieved in a compatible manner. If the weight ratio of the polymer network 121L exceeds 10, strong scattering is obtained, but the drive voltage increases. If the weight ratio of the polymer network 121L is less than 3, the drive voltage is suppressed, but strong scattering may not be achieved.

The display panel 11 preferably includes an alignment film provided between at least one of the pair of substrates (the first substrate 110 and the second substrate 130) sandwiching the light modulation layer 120 and the light modulation layer 120. With such an aspect, when the voltage applied to the light modulation layer 120 is less than the threshold voltage (including no voltage application), the alignment of the liquid crystal components 122L in the light modulation layer 120 can be controlled mainly by the function of the alignment film.

Hereinafter, an aspect in which a first alignment film 410 is provided between the first substrate 110 and the light modulation layer 120, and a second alignment film 420 is provided between the second substrate 130 and the light modulation layer 120 will be described, but the aspect is not limited thereto. For example, the alignment film may be provided only either between the first substrate 110 and the light modulation layer 120 or between the second substrate 130 and the light modulation layer 120. The alignment film need not be provided between the first substrate 110 and the light modulation layer 120 nor between the second substrate 130 and the light modulation layer 120. For example, in a case that the display panel 11 includes only either the first alignment film 410 or the second alignment film 420 and the alignment film is a horizontal alignment film, and that the other substrate side is slippery (zero anchoring), the liquid crystal components 122L assumes a twisted horizontal alignment state, and as a result, the same alignment state as a case in which a horizontal alignment film is provided on the substrates of both sides can be achieved.

The first alignment film 410 and the second alignment film 420 are layers that have been subjected to an alignment treatment for controlling the alignment of the liquid crystal components 122L and the photopolymerizable liquid crystal compound, and an alignment film made of polyimide or the like that is commonly used in the field of liquid crystal display devices can be used. The first alignment film 410 and the second alignment film 420 may be rubbing alignment films that have been subjected to a rubbing treatment, or may be photo-alignment films that have been subjected to a photo-alignment treatment. In the following, the liquid crystal components 122L and the photopolymerizable liquid crystal compound may also be simply referred to as liquid crystal molecules.

The rubbing alignment film is obtained, for example, by depositing an alignment film material containing a polymer for a rubbing alignment film on a substrate to form a film, rotating a roller on which is wound a fabric made of rayon, cotton, or the like while maintaining a constant rotational speed and a constant distance between the roller and the substrate, and rubbing the surface of the film containing the polymer for the rubbing alignment film in a predetermined direction (rubbing method).

An example of the polymer for the rubbing alignment film is a polyimide. The polymer for the rubbing alignment film contained in the rubbing alignment film may be one type, or may be two or more types.

The photo-alignment film is obtained, for example, by depositing, on a substrate, an alignment film material containing a photo-alignment polymer having a photo-functional group to form a film, and irradiating the film with polarized ultraviolet light to generate anisotropy in the surface of the film containing the photo-alignment polymer (photo-alignment method).

Examples of the photo-alignment polymer include photo-alignment polymers having at least one photo-functional group selected from a cyclobutane group, an azobenzene group, a chalcone group, a cinnamate group, a coumarin group, a stilbene group, a phenol ester group, and a phenyl benzoate group. The photo-alignment polymer contained in the photo-alignment film may be one type, or may be two or more types. The photo-functional group of the photo-alignment polymer may be present on the main chain of the polymer, on a side chain of the polymer, or on both the main chain and a side chain of the polymer.

The type of photoreaction of the photo-alignment polymer is not particularly limited, and suitable examples of photo-alignment polymers include photolytic polymers, photo-rearrangement polymers (preferably photo-Fires rearrangement polymers), photo-isomerization polymers, photo-dimerization polymers, and photo-crosslinked polymers. Any one of these may be used alone, or two or more types can be used in combination. Among these, from the perspective of alignment stability, a photolytic polymer having a reaction wavelength (main sensitivity wavelength) near 254 nm and a photo-rearrangement polymer having a reaction wavelength (main sensitivity wavelength) near 254 nm are particularly preferable. Photo-isomerization and photo-dimerization polymers having a photo-functional group on a side chain are also preferable.

The main chain structure of the photo-alignment polymer is not particularly limited, and examples of suitable structures include a polyamic acid structure, a polyimide structure, a poly(meth)acrylic acid structure, a polysiloxane structure, a polyethylene structure, a polystyrene structure, and a polyvinyl structure.

The first alignment film 410 and the second alignment film 420 are horizontal alignment films in which the liquid crystal components 122L are aligned in parallel to the surfaces of the alignment films, or are vertical alignment films in which the liquid crystal components 122L are aligned perpendicular to the surfaces of the alignment films. The first alignment film 410 and the second alignment film 420 are preferably horizontal alignment films. With such an aspect, strong scattering and low voltage driving can be effectively achieved in a compatible manner. More preferably, the first alignment film 410 and the second alignment film 420 are horizontal alignment films, and the liquid crystal components 122L have positive dielectric constant anisotropy. With such an aspect, strong scattering and low voltage driving can be more effectively achieved in a compatible manner.

In a case that the first alignment film 410 and the second alignment film 420 are horizontal alignment films and that the voltage applied to the light modulation layer 120 is less than the threshold voltage (including no voltage application), the alignment of the liquid crystal components 122L is controlled, mainly by the function of the first alignment film 410 and the second alignment film 420, such that the major axis of the liquid crystal components 122L is oriented in the horizontal direction relative to the first alignment film 410 and the second alignment film 420.

In other words, the liquid crystal components 122L are horizontally aligned (homogeneously aligned) with respect to the first substrate 110 when no voltage is applied, and the alignment of the liquid crystal components 122L is changed in accordance with the electrical field generated in the light modulation layer 120 due to the voltage applied between the first electrode 111P and the second electrode 131P, so that the transmission amount of light transmitted through the light modulation layer 120 can be controlled. The liquid crystal components 122L are horizontally aligned by a regulating force of the first alignment film 410 and the second alignment film 420 when no voltage is applied between the first electrode 111P and the second electrode 131P, and rotate in accordance with a vertical electrical field generated in the light modulation layer 120 when a voltage is applied between the first electrode 111P and the second electrode 131P.

Here, "the major axis of the liquid crystal components 122L is oriented in the horizontal direction relative to the first alignment film 410 and the second alignment film 420" means that a tilt angle (including a pre-tilt angle) of the liquid crystal components 122L is from 0 to 5° with respect to the first alignment film 410 and the second alignment film 420, and the tilt angle is preferably from 0 to 3° and more preferably from 0 to 1°. The tilt angle of the liquid crystal components 122L refers to an angle at which the major axis (optical axis) of the liquid crystal components 122L is inclined with respect to the surfaces of the first alignment film 410 and the second alignment film 420.

In a case that the first alignment film 410 and the second alignment film 420 are the vertical alignment films, and that the voltage applied to the light modulation layer 120 is less than the threshold voltage (including no voltage application), the alignment of the liquid crystal molecules is controlled, mainly by the function of the first alignment film 410 and the second alignment film 420, such that the major axis of the liquid crystal molecules is oriented in the perpendicular direction relative to the first alignment film 410 and the second alignment film 420.

In other words, the liquid crystal components 122L are vertically aligned with respect to the first substrate 110 when no voltage is applied, and the alignment of the liquid crystal components 122L is changed in accordance with the electrical field generated in the light modulation layer 120 due to the voltage applied between the first electrode 111P and the second electrode 131P, so that the transmission amount of light transmitted through the light modulation layer 120 can be controlled. The liquid crystal components 122L are vertically aligned by the regulating force of the first alignment film 410 and the second alignment film 420 when no voltage is applied between the first electrode 111P and the second electrode 131P, and rotate in accordance with the vertical electrical field generated in the light modulation layer 120 when a voltage is applied between the first electrode 111P and the second electrode 131P.

Here, "the major axis of the liquid crystal components 122L is oriented in the perpendicular direction relative to the first alignment film 410 and the second alignment film 420" means that a tilt angle (including a pre-tilt angle) of the liquid crystal components 122L is from 86 to 90° with respect to the first alignment film 410 and the second alignment film 420, and the tilt angle is preferably from 87 to 89° and more preferably from 87.5 to 89°.

Next, a method for manufacturing the display panel 11 of the present embodiment will be described below. The method for manufacturing the display panel 11 includes: an alignment film forming step of forming the first alignment film 410 and the second alignment film 420 subjected to an alignment treatment on one surface of the first substrate 110 and one surface of the second substrate 130, respectively; an injection step of disposing the first substrate 110 and the second substrate 130 facing each other with the first alignment film 410 and the second alignment film 420 inside, and injecting a composition containing the liquid crystal components 122L, the photopolymerizable liquid crystal compound, and a polymerization initiator between the first substrate 110 and the second substrate 130; and a light irradiation step of irradiating the composition with light to form a polymer network 121L while the photopolymerizable liquid crystal compound is cured.

The first substrate 110 and the second substrate 130 can be fabricated by methods commonly used in the field of liquid crystal display devices.

In the above-described alignment film forming step, an alignment film material is applied to each of the first substrate 110 and the second substrate 130 to form the first alignment film 410 and the second alignment film 420. Examples of the method of applying the alignment film material include application methods such as an ink-jet method and a roll coater method. Next, the first alignment film 410 and the second alignment film 420 are subjected to an alignment treatment. Examples of the alignment treatment include a rubbing treatment in which the alignment film surface is rubbed with a roller or the like, and a photo-alignment treatment in which the alignment film surface is irradiated with light. According to the photo-alignment treatment, the alignment treatment can be implemented without contacting the surface of the alignment film, and therefore unlike the rubbing treatment, a merit is included of being able to suppress the generation of dirtiness, waste, and the like during the alignment treatment. An alignment film that is alignment treated through the photo-alignment treatment is also referred to as a photo-alignment film.

The first alignment film 410 and the second alignment film 420 may be subjected to a rubbing treatment so as to be aligned in a mutually antiparallel manner (antiparallel alignment), or may be subjected to a rubbing treatment so as to be aligned in a mutually parallel manner (parallel alignment).

In the injection step described above, the first substrate 110 and the second substrate 130 are disposed facing each other with the first alignment film 410 and the second alignment film 420 inside, and a composition containing the liquid crystal components 122L, a photopolymerizable liquid crystal compound, and a polymerization initiator is injected between the first substrate 110 and the second substrate 130. In the injection step, the liquid crystal molecules on the first alignment film 410 side are aligned along the alignment treatment direction of the first alignment film 410, the liquid crystal molecules on the second alignment film 420 side are aligned along the alignment treatment direction of the second alignment film 420, and the alignment direction of liquid crystal molecules located between the first alignment film 410 and the second alignment film 420 is continuously changed between the first alignment film 410 and the second alignment film 420.

The polymerization initiator is not particularly limited, and a known polymerization initiator can be used. Examples of the polymerization initiator that can be used include Omnirad 184 (trade name, available from IGM Resins B.V.) represented by the following chemical formula (IN1) and OXE03 (available from BASF SE) represented by the following chemical formula (IN2).

[Chemical Formula 5]

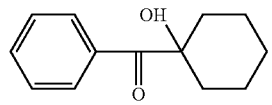

(IN1)

[Chemical Formula 6]

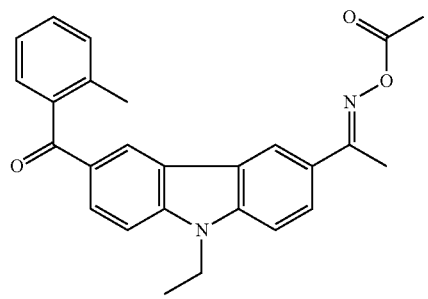

(IN2)

The weight ratio of the liquid crystal components 122L to the photopolymerizable liquid crystal compound in the composition is preferably from 90:10 to 97:3. In other words, preferably, the weight ratio of the liquid crystal components 122L is from 90 to 97, and when the weight ratio of the liquid crystal components 122L is 90 or more, the weight ratio of the photopolymerizable liquid crystal compound is 10 or less, and when the weight ratio of the liquid crystal components 122L is 97 or less, the weight ratio of the photopolymerizable liquid crystal compound is 3 or more. With such an aspect, strong scattering and low voltage driving can be effectively achieved in a compatible manner. When the weight ratio of the photopolymerizable liquid crystal compound exceeds 10, strong scattering is obtained, but the drive voltage increases, and when the weight ratio of the photopolymerizable liquid crystal compound is less than 3, the drive voltage is suppressed, but strong scattering may not be obtained.

In the light irradiation step, the polymer network 121L is formed by irradiating the composition with light while curing the photopolymerizable liquid crystal compound. Here, when the liquid crystal molecules are aligned in the injection step described above, the photopolymerizable liquid crystal compound is in a liquid crystal phase. However, in the light irradiation step, the composition is irradiated with light, and the photopolymerizable liquid crystal compound is cured through a photo polymerization reaction. Thereby, the photopolymerizable liquid crystal compound is solidified with the alignment state thereof being maintained, and the polymer network 121L is formed, resulting in a failure of electrical field response. Thus, the alignment direction of the polymer network 121L constituted of the cured product of the photopolymerizable liquid crystal compound is not aligned with the electrical field direction even when a voltage is applied thereafter. On the other hand, the alignment state of the liquid crystal components 122L is not fixed, and therefore the alignment direction is aligned with the electrical field direction when a voltage is applied.

Accordingly, when no voltage is applied, the alignment directions of the polymer network 121L and the liquid crystal components 122L are in a state of matching the direction parallel to the first substrate 110 and the second substrate 130. In this state, the refractive indices of the polymer network 121L and the liquid crystal components 122L are matched, and thereby the light modulation layer 120 is subjected to the transmissive display. When a power supply is connected between the first electrode 111P and the second electrode 131P and a voltage is applied to the light modulation layer 120, the alignment direction of the liquid crystal components 122L is aligned with the electrical field direction. Thus, a light scattering state is caused by the mismatching of the refractive indices at the interface between the liquid crystal components 122L and the polymer network 121L, and the light modulation layer 120 is subjected to the scattering display.

The type of the light used in the light irradiation step is not particularly limited, and for example, ultraviolet light can be used. Examples of the ultraviolet light include light having a peak wavelength in a wavelength band of from 340 nm to 390 nm.

In the light irradiation step, the composition is preferably irradiated with light having an illuminance of from 5 mW/cm² to 50 mW/cm². When the illuminance is set equal to 5 mW/cm² or higher, more sufficient scattering can be obtained, and when the illuminance is set equal to 50 mW/cm² or lower, increases in temperature during irradiation can be suppressed, and deterioration in production yield and variations in characteristics can be suppressed.

In the aforementioned light irradiation step, the composition is preferably irradiated with light having an irradiation dose of from 0.5 J/cm² to 5 J/cm². When the irradiation dose is set equal to 0.5 J/cm² or higher, the polymerization reaction of the photopolymerizable liquid crystal compound can be sufficiently promoted, an amount of unreacted photopolymerizable liquid crystal compound can be reduced, and the polymer network 121L can be formed. As a result, the hysteresis and baking characteristics of the display panel 11 can be improved. Production tact time can be improved by setting the irradiation dose equal to 5 J/cm$^2$ or lower.

Second Embodiment

In the present embodiment, features unique to the present embodiment will be mainly described, and a description of contents overlapping the above-described first embodiment will be omitted. The present embodiment is substantially the same as the first embodiment except that the light modulation layer 120 is different.

Hereinafter, a case where the non-transmissive display is the reflective display will be described as an example. Specifically, a case will be described in detail in which the display device 100 includes a plurality of pixels 1P and the light modulation layer 120 can switch between the transmissive display and the reflective display for each pixel 1P. A case will be described as an example in which the control unit sets the half mirror degree as the non-transmittance. Note that, in the present embodiment, the case where the non-transmittance is set is taken as an example, but the same effect can be obtained when the transmittance is set.

That is, the light modulation layer 120 of the present embodiment switches between the transmissive display and the reflective display. The control unit calculates the brightness ratio of the first space and the second space based on the luminance, sets the half mirror degree as the non-transmittance of the display panel 11 based on the brightness ratio, and switches the display of the light modulation layer 120 based on the half mirror degree.

The light modulation layer 120 of the present embodiment performs the reflective display as the non-transmissive display. The reflective display means display in which light is reflected. The reflective display means that the reflectivity is 8% or more and 100% or less, and the reflectivity is preferably 24% or more and 100% or less. In the present embodiment, the light modulation layer 120 subjected to the reflective display reflects visible light. Thus, the light modulation layer 120 subjected to the reflective display is in the same state as a mirror.

The reflectivity of the light modulation layer 120 subjected to the reflective display can be measured by a spectral colorimeter (manufactured by Minolta Co., Ltd., CM-2002) using luminous reflectivity (Y) as an index.

The display device 100 according to the present embodiment can switch between three types of display modes of a mirror mode, the transmissive mode, and a half mirror mode, based on the brightness ratio. Specifically, when the half mirror degree is set equal to 0% based on the brightness ratio, that is, when the ratio of the light reflected by the display panel 11 to the light incident on the display panel 11 is set equal to 0%, the mode is the transmissive mode in which all of the light incident on the display panel 11 is transmitted. When the half mirror degree is set equal to 100% based on the brightness ratio, that is, when the ratio of the light reflected by the display panel to the light incident on the display panel 11 is set equal to 100%, the mode is the mirror mode in which all of the light incident on the display panel 11 is reflected. When the half mirror degree is set equal to more than 0% and less than 100% based on the brightness ratio, that is, when the ratio of the light reflected by the display panel to the light incident on the display panel 11 is set equal to more than 0% and less than 100%, the mode is the half mirror mode in which a part of the light incident on the display panel 11 is reflected.

In the present embodiment, for example, the first space 211 is a space brighter than the second space 212, and specifically, the first space 211 is the bright room and the second space 212 is the dark room.

Figure 33:
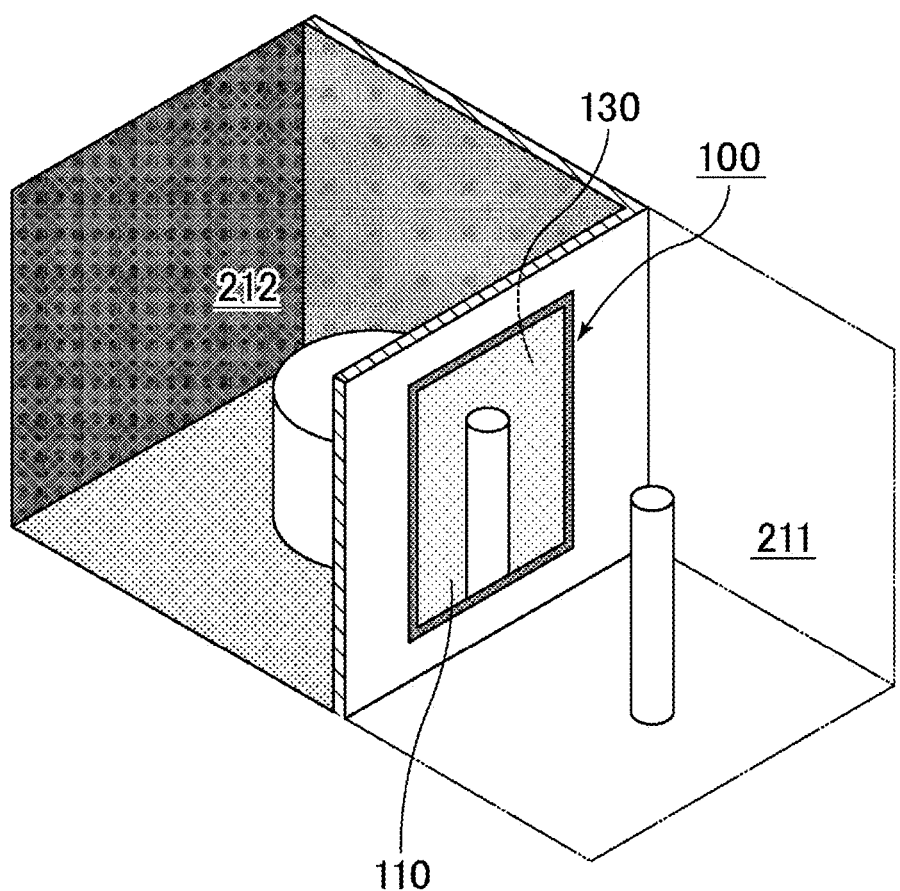
FIG. 33 is a schematic view for describing a case where the display device according to a second embodiment is in a mirror mode.
Figure 34:
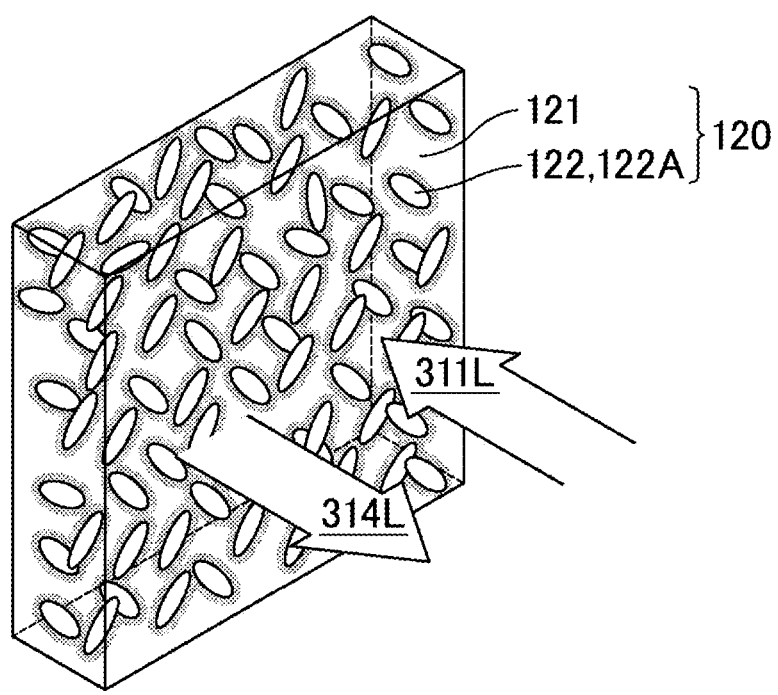
FIG. 34 is a schematic view illustrating the light modulation layer in the case where the display device according to the second embodiment is in the mirror mode.
Figure 35:
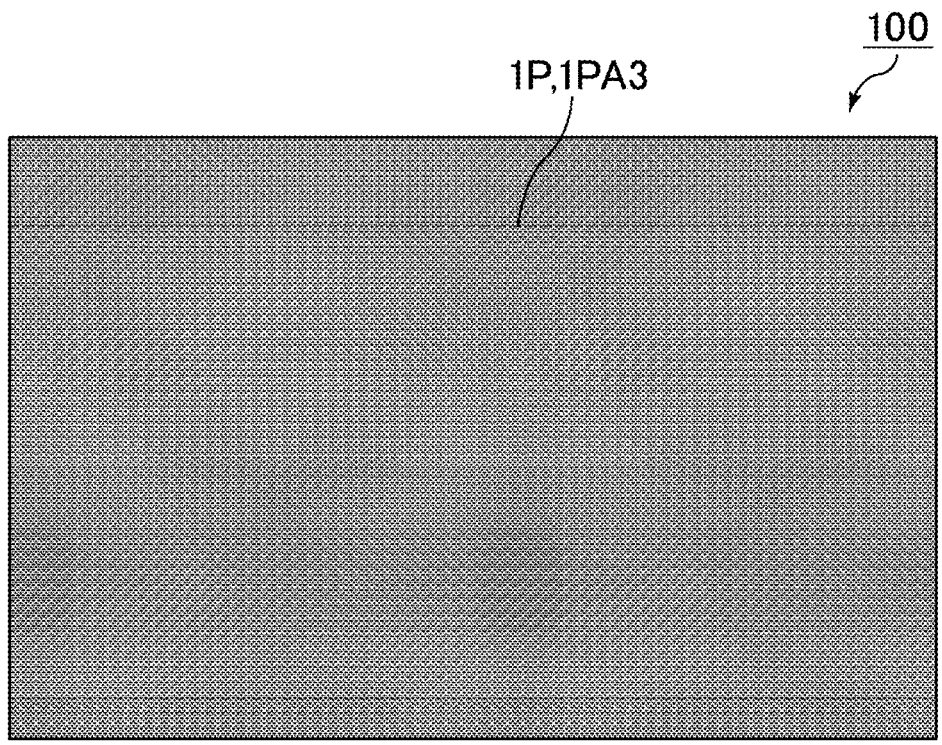
FIG. 35 is a schematic view illustrating the display device in the case where the display device according to the second embodiment is in the mirror mode.

FIG. 33 is a schematic view for describing a case where the display device according to a second embodiment is in the mirror mode. FIG. 34 is a schematic view illustrating the light modulation layer in the case where the display device according to the second embodiment is in the mirror mode. FIG. 35 is a schematic view illustrating the display device in the case where the display device according to the second embodiment is in the mirror mode. In the present embodiment, the first substrate 110 of the display device 100 is disposed on the first space 211 side, and the second substrate 130 of the display device 100 is disposed on the second space 212 side.

When the display device 100 of the present embodiment is in the mirror mode, as illustrated in FIGS. 33 to 35, in the display device 100 of the present embodiment, all of the plurality of pixels 1P are reflective display 1PA3, that is, the entire surface of the display panel 11 is the reflective display 1PA3. With such an aspect, almost all of the incident light 311L incident on the display device 100 from the first space 211 is reflected at the display device 100 to become reflected light 314L. Almost all of the light incident on the display device 100 from the second space 212 is reflected in the display device 100. As a result, the mirror mode is realized in which the second space 212 is invisible from the first space 211 and the first space 211 is invisible from the second space 212.

In the mirror mode of the present embodiment, regardless of the illuminance of the surrounding space, that is, regardless of the brightness of the bright room (first space 211) and the dark room (second space 212), a portion other than a portion where the image is displayed appears to be reflected when viewed both from the bright room (first space 211) side and from the dark room (second space 212) side. On the other hand, the portion where the image is displayed appears transparent when viewed both from the bright room (first space 211) side and from the dark room (second space 212) side.

Figure 36:
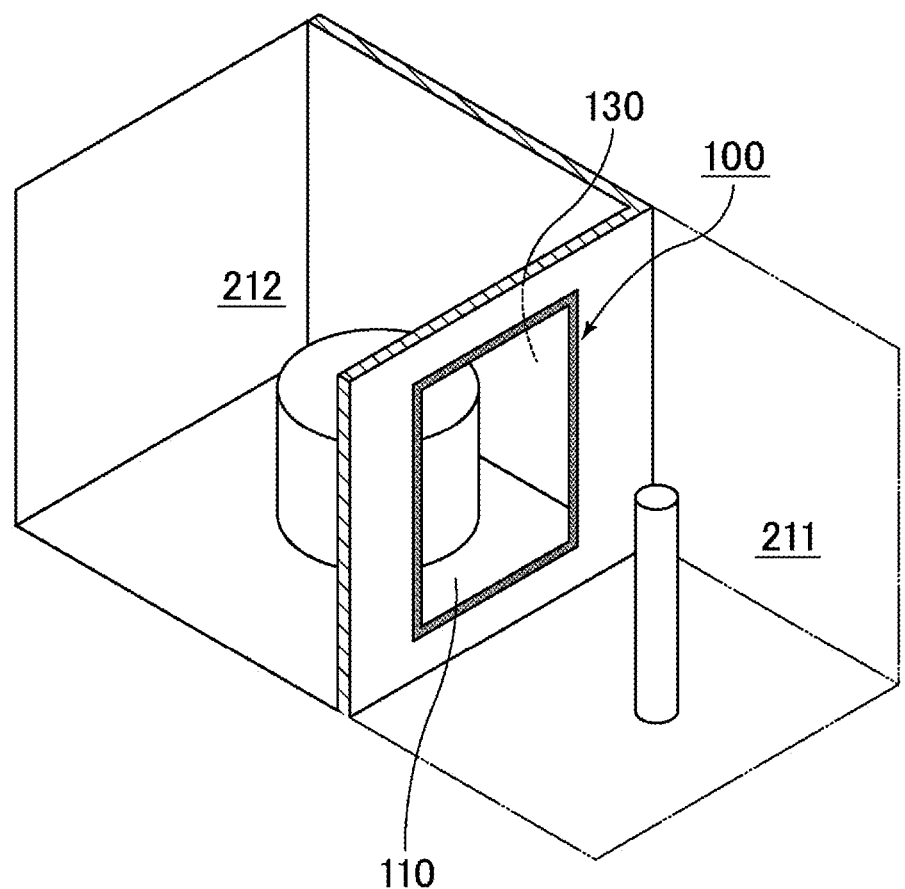
FIG. 36 is a schematic view for describing a case where the display device according to the second embodiment is in the transmissive mode.
Figure 37:
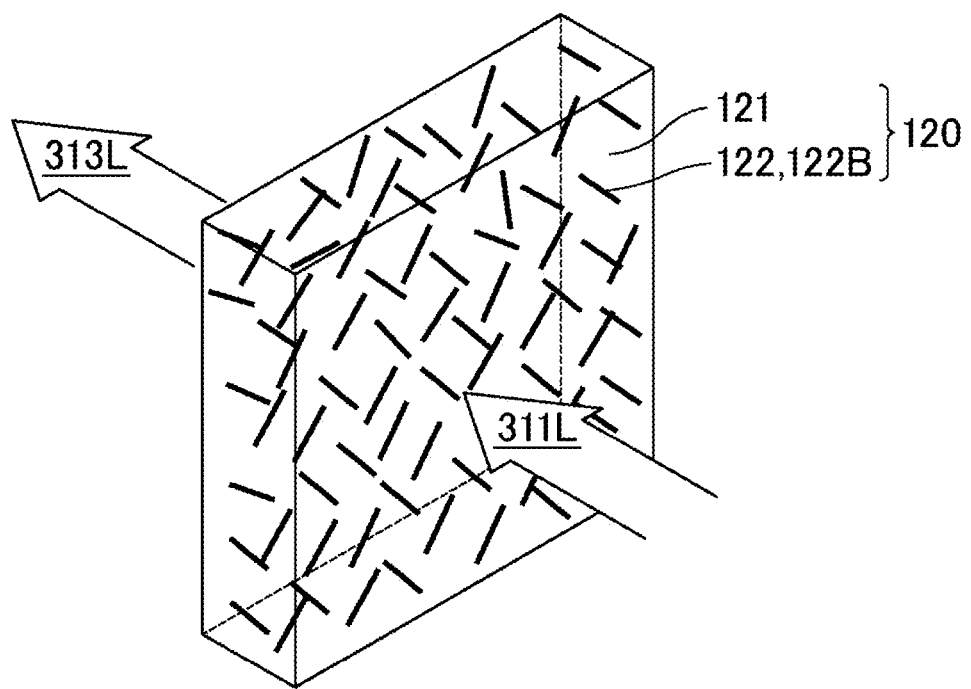
FIG. 37 is a schematic view illustrating the light modulation layer in the case where the display device according to the second embodiment is in the transmissive mode.
Figure 38:
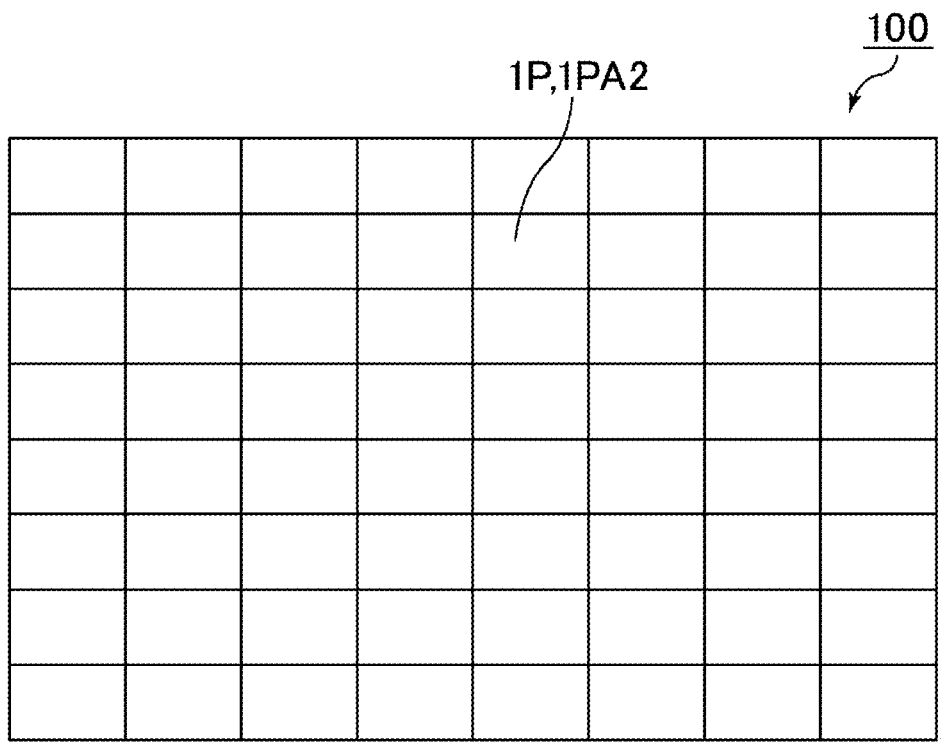
FIG. 38 is a schematic view illustrating the display device in the case where the display device according to the second embodiment is in the transmissive mode.

FIG. 36 is a schematic view for describing a case where the display device according to the second embodiment is in the transmissive mode. FIG. 37 is a schematic view illustrating the light modulation layer in the case where the display device according to the second embodiment is in the transmissive mode. FIG. 38 is a schematic view illustrating the display device in the case where the display device according to the second embodiment is in the transmissive mode.

When the display device 100 of the present embodiment is in the transmissive mode, as illustrated in FIGS. 36 to 38, in the display device 100 of the present embodiment, all of the plurality of pixels 1P are the transmissive display 1PA2, that is, the entire surface of the display panel 11 is the transmissive display 1PA2. With such an aspect, almost all of the light incident on the display device 100 from the first space 211 is transmitted through the display device 100, and transmitted light 313L is incident on the second space 212. Almost all of the light incident on the display device 100 from the second space 212 is transmitted through the display device 100, and the transmitted light is incident on the first space 211. As a result, the transmissive mode is realized in which the second space 212 is visible from the first space 211 and the first space 211 is visible from the second space 212.

In the transmissive mode of the present embodiment, regardless of the illuminance of the surrounding space, that is, regardless of the brightness of the bright room (first space 211) and the dark room (second space 212), the portion other than the portion where the image is displayed appears transparent when viewed both from the bright room (first space 211) side and from the dark room (second space 212) side. On the other hand, the portion where the image is displayed appears to be a mirror when viewed both from the bright room (first space 211) side and from the dark room (second space 212) side.

Here, in the first embodiment, the light modulation layer 120 includes the polymer network 121L and the liquid crystal components 122L, and the alignment of the liquid crystal components 122L is controlled, and thus the transmissive display and the scattering display can be realized. On the other hand, in the present embodiment, as illustrated in FIGS. 34 and 37, the light modulation layer 120 includes a medium 121 and shape anisotropic members 122, and the alignment of the shape anisotropic members 122 are controlled, and thus the transmissive display 1PA2 and the reflective display 1PA3 can be realized. Specifically, by controlling the voltage applied to the light modulation layer 120, a first alignment state 122A is set in which the shape anisotropic members 122 are aligned so as to stick to the first substrate 110 or the second substrate 130, and thus the reflective display 1PA3 can be realized, and a second alignment state 122B is set in which the shape anisotropic members 122 are vertically aligned to the first substrate 110 and the second substrate 130, and thus the transmissive display 1PA2 can be realized.

Figure 39:
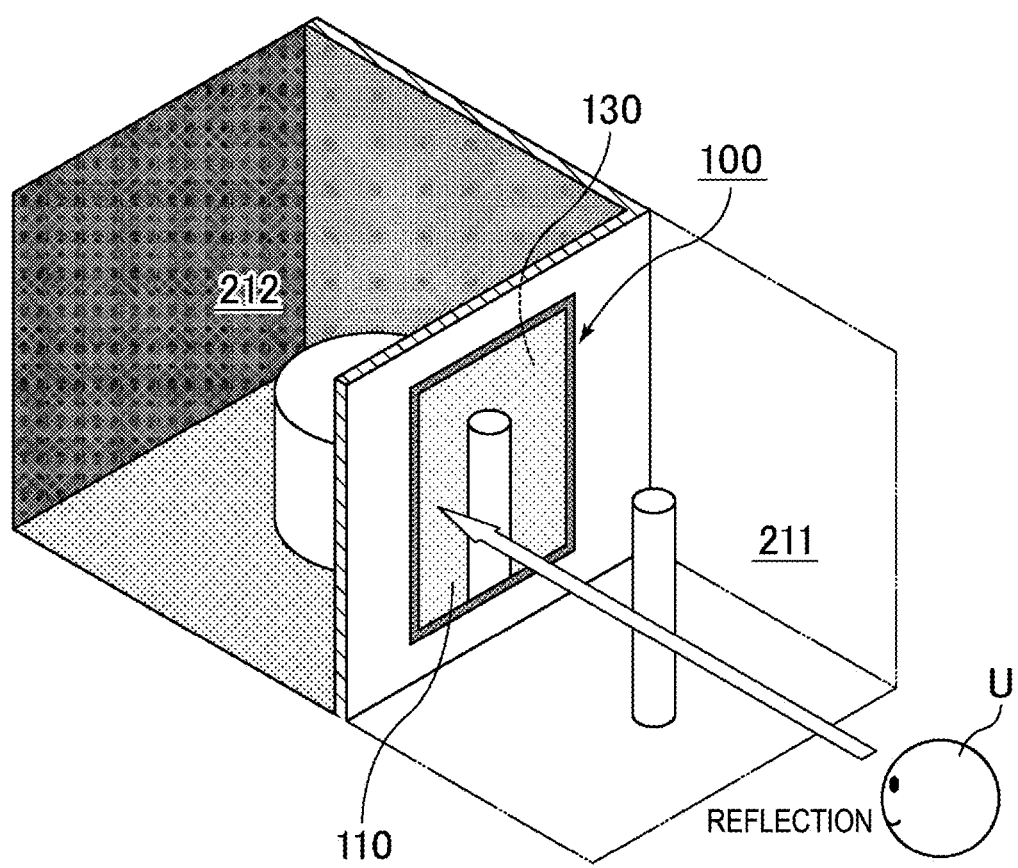
FIG. 39 is a view for describing a case where the display device according to the second embodiment is in a half mirror mode, and is a schematic view illustrating a case where the display device is viewed from a first space.
Figure 40:
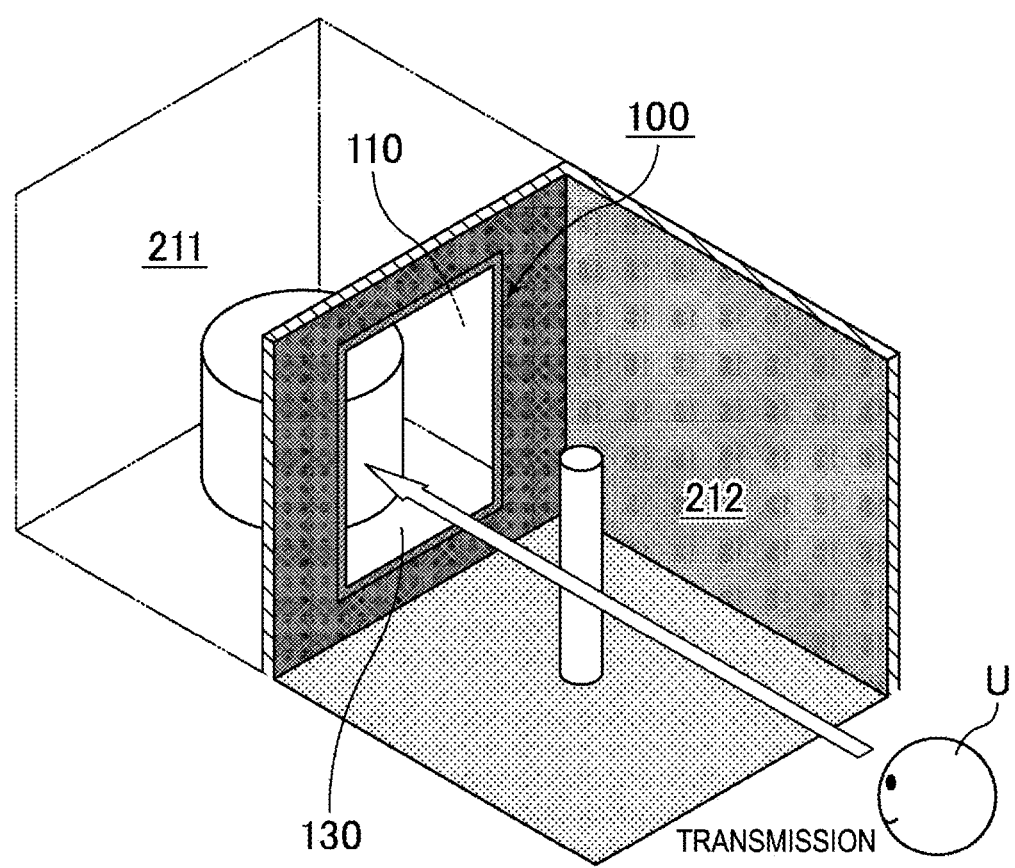
FIG. 40 is a view for describing a case where the display device according to the second embodiment is in the half mirror mode, and is a schematic view illustrating a case where the display device is viewed from a second space.
Figure 41:
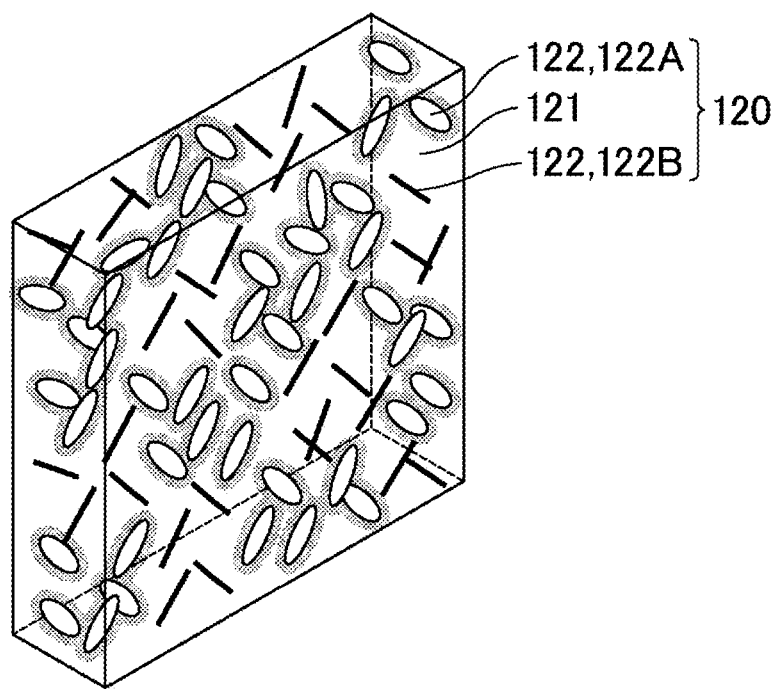
FIG. 41 is a schematic view illustrating the light modulation layer in the case where the display device according to the second embodiment is in the half mirror mode.
Figure 42:
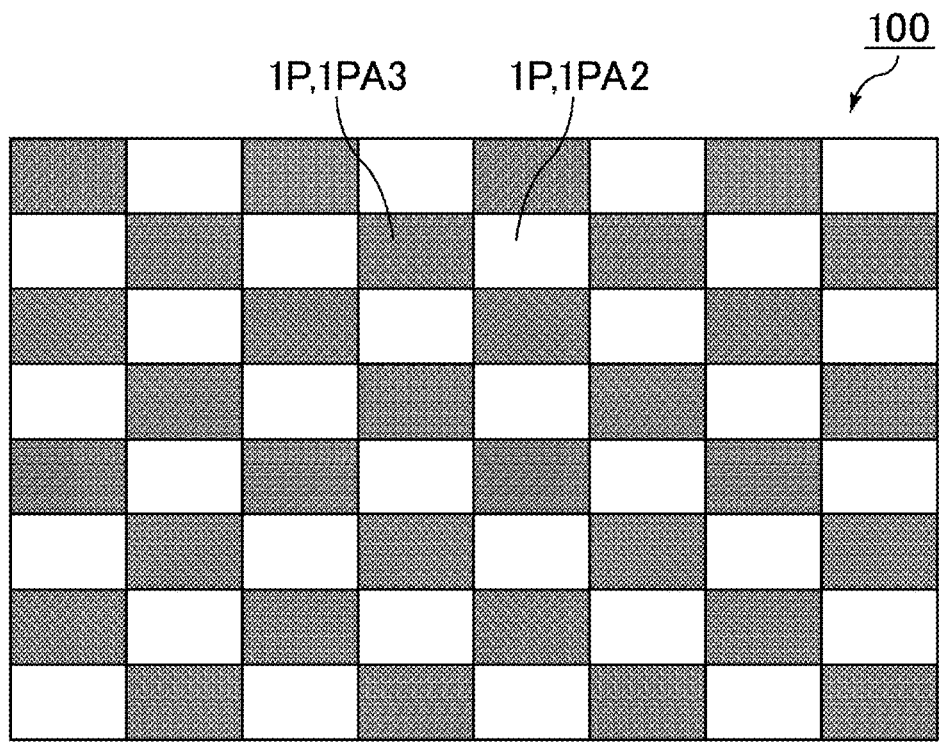
FIG. 42 is a schematic view illustrating the display device in the case where the display device according to the second embodiment is in the half mirror mode.

FIG. 39 is a view for describing a case where the display device according to the second embodiment is in the half mirror mode, and is a schematic view illustrating a case where the display device is viewed from the first space. FIG. 40 is a view for describing the case where the display device according to the second embodiment is in the half mirror mode, and is a schematic view illustrating a case where the display device is viewed from the second space. FIG. 41 is a schematic view illustrating the light modulation layer in the case where the display device according to the second embodiment is in the half mirror mode. FIG. 42 is a schematic view illustrating the display device in the case where the display device according to the second embodiment is in the half mirror mode.

When the display device 100 of the present embodiment is in the half mirror mode, as illustrated in FIGS. 39 to 42, in the display device 100 of the present embodiment, a part of the plurality of pixels 1P is the reflective display 1PA3 and the other pixels 1P are the transmissive display 1PA2, that is, a part of the display panel is the reflective display 1PA3 and the other part is the transmissive display 1PA2. With such an aspect, a part of the light incident on the display device 100 from the first space 211 is reflected in the display device 100, and the other part is transmitted through the display device 100 and incident on the second space 212. A part of the light incident on the display device 100 from the second space 212 is reflected at the display device 100, and the other part is transmitted through the display device 100 and incident on the first space 211. Here, when the first space 211 is brighter than the second space 212, for example, when the first space 211 is the bright room and the second space 212 is the dark room darker than the first space 211, the light from the first space 211 is easily visible in the second space 212 and the light from the second space 212 is hardly visible in the first space 211. As a result, the half mirror mode is realized in which the second space 212 is invisible from the first space 211 and the first space 211 is visible from the second space 212.

In the half mirror mode according to the present embodiment, a view from an observer U changes depending on a relationship between an illuminance of a space on the observer U side of the display device 100 and an illuminance of a space on the back side of the display device 100. When a level of the illuminance is lower on the back side of the display device 100 than on the observer U side, the display device 100 appears to be in the mirror mode from the observer U. That is, from the observer U in the bright room (first space 211), the display device 100 appears to be in the mirror mode as illustrated in FIG. 39. When the level of the illuminance is higher on the back side of the display device 100 than on the observer U side, the display device 100 appears to be in the transmissive mode from the observer U. That is, from the observer U in the dark room (second space 212), the display device 100 appears to be in the transmissive mode as illustrated in FIG. 40. Note that a portion in which the image is displayed in the half mirror mode may be the reflective display or the transmissive display.

It is preferable that the display device 100 includes the plurality of pixels 1P, and the control unit causes a number of pixels 1P corresponding to the half mirror degree among the plurality of pixels 1P to be subjected to the reflective display. With such an aspect, the half mirror mode can be effectively realized, and thus the state can be more effectively realized in which one space of the first space and the second space is visible from the other space and the other space is invisible from the one space. A method in which a part of the pixels 1P among the plurality of pixels 1P is subjected to the reflective display and the other part of the pixels 1P is subjected to the transmissive display is also referred to as the pixel division method. The pixel division method will be described below.

The half mirror degree in the pixel division method is, specifically, a ratio of a reflective display area to the entire display area of the display panel 11. More specifically, in the case where the display panel 11 includes the plurality of pixels 1P, the half mirror degree in the pixel division method is a ratio of a total area of the pixels 1P subjected to the reflective display to a total area of the plurality of pixels 1P.

The half mirror degree 0% means that all of the plurality of pixels 1P (that is, the entire surface of the display panel 11) are the transmissive display 1PA2. The half mirror degree 100% means that all of the plurality of pixels 1P (that is, the entire surface of the display panel 11) are the reflective display 1PA3. In the half mirror mode, the half mirror degree is adjusted in a range of more than 0% and less than 100%. FIGS. 43 to 48 illustrate examples of the display device 100 having various half mirror degrees.

Figure 43:
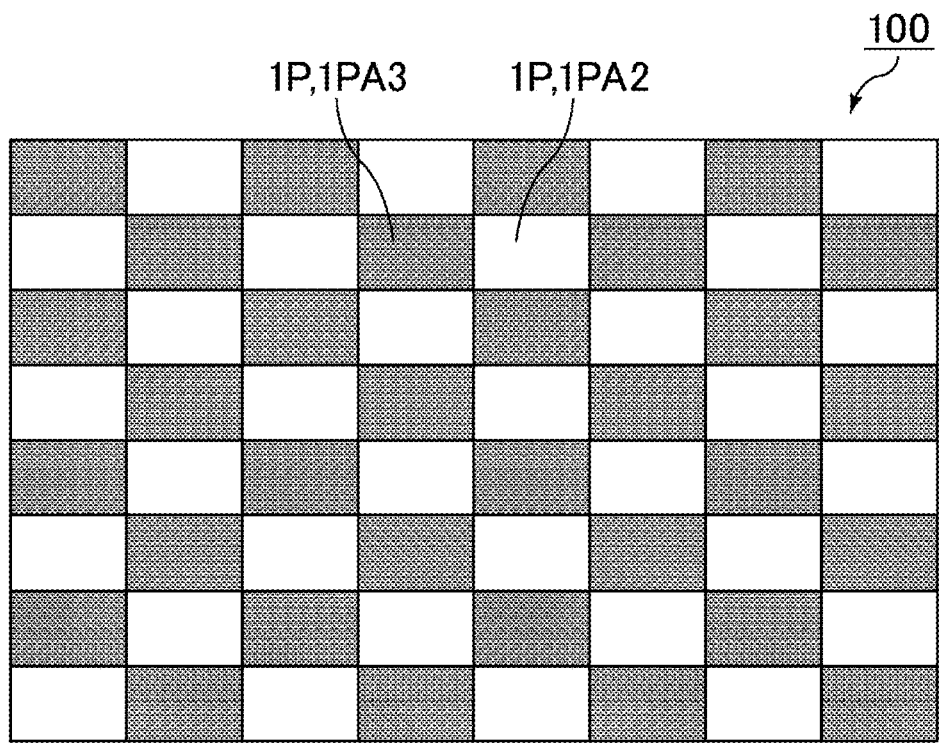
FIG. 43 is a schematic view of the display device according to the second embodiment in which a half mirror degree is 50%.
Figure 44:
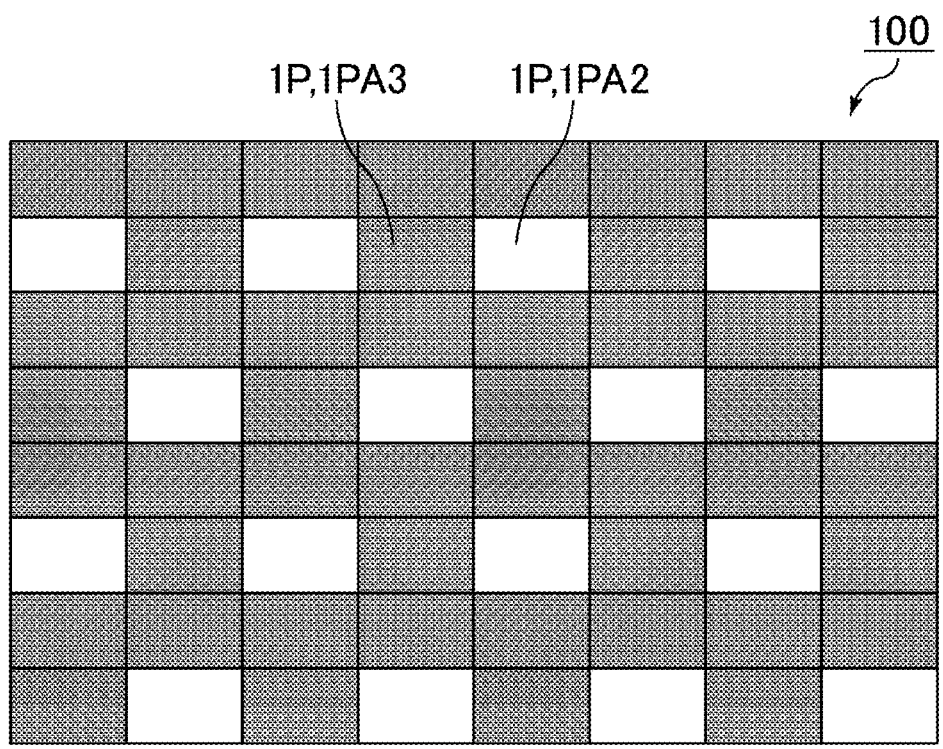
FIG. 44 is a schematic view of the display device according to the second embodiment in which the half mirror degree is 75%.
Figure 45:
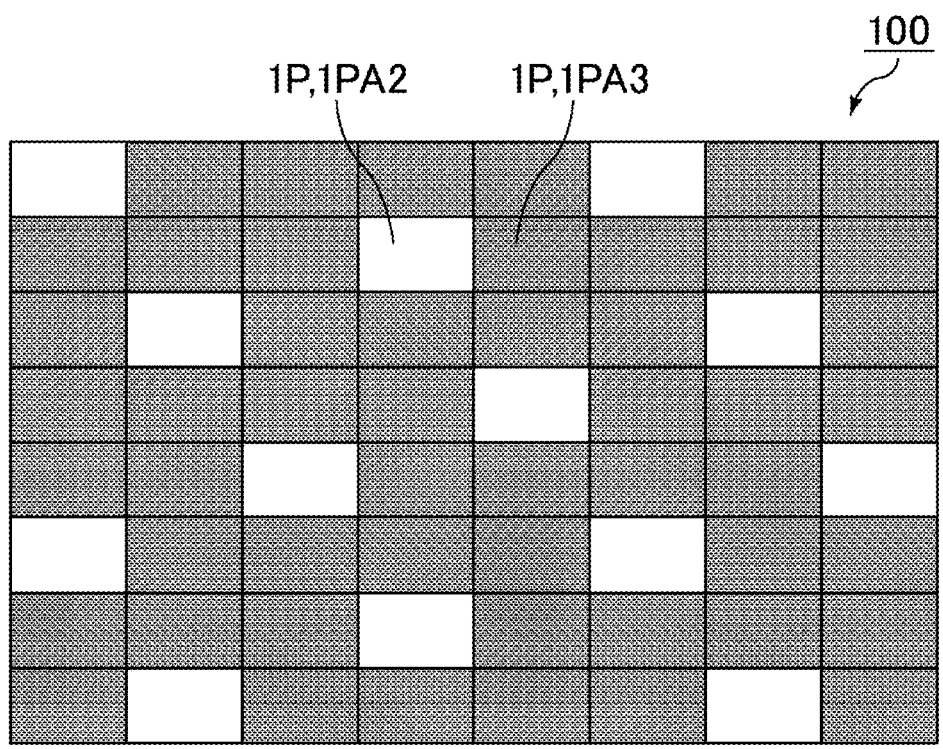
FIG. 45 is a schematic view of the display device according to the second embodiment in which the half mirror degree is 80%.
Figure 46:
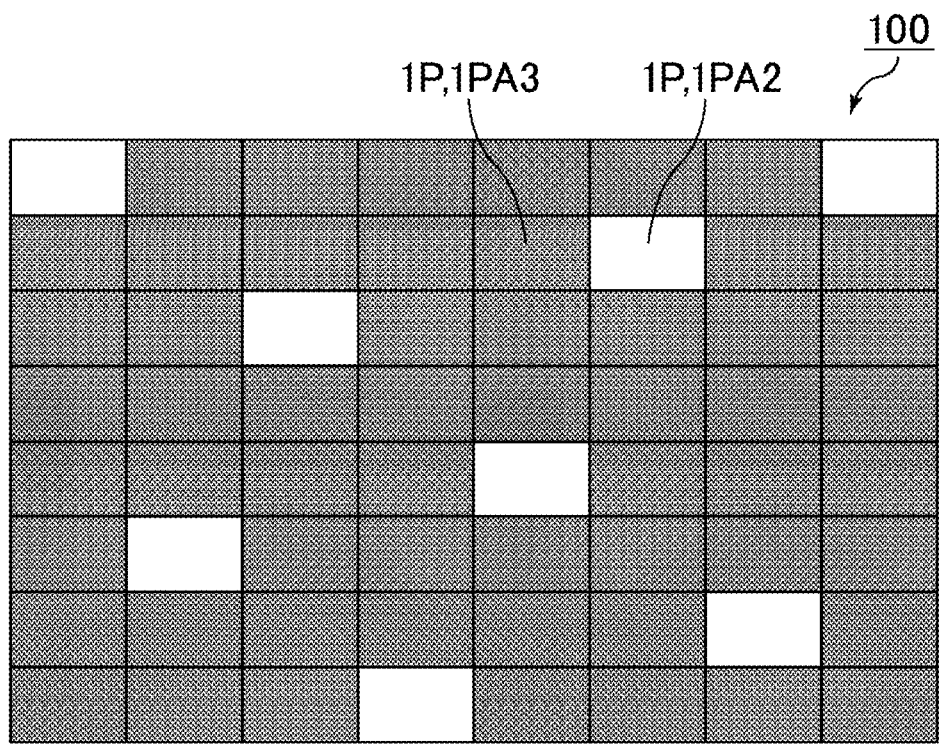
FIG. 46 is a schematic view of the display device according to the second embodiment in which the half mirror degree is 87.5%.
Figure 47:
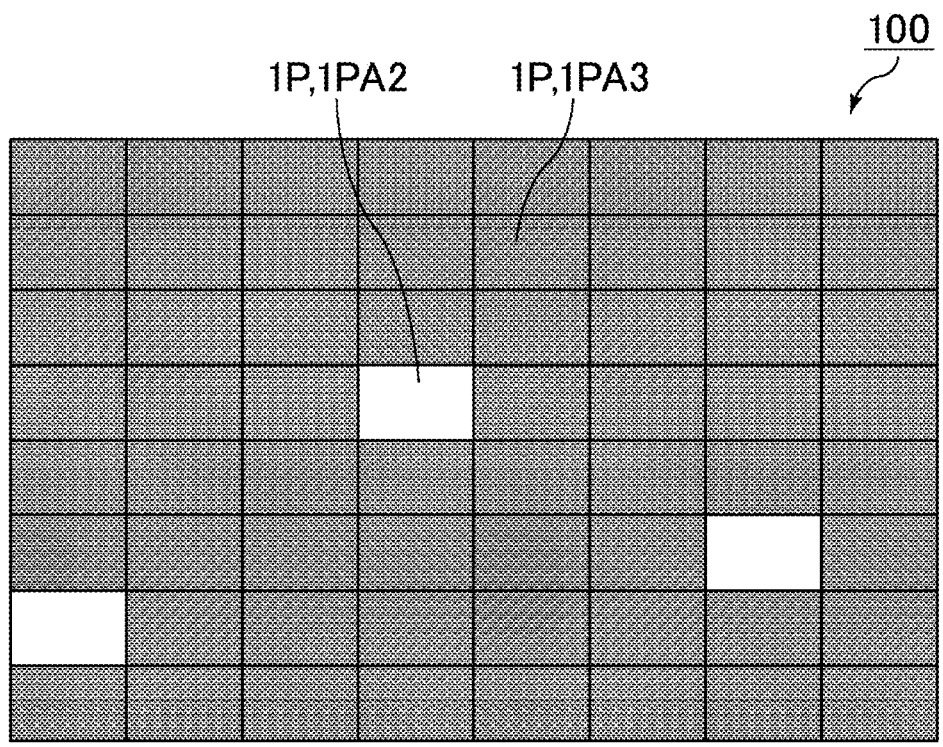
FIG. 47 is a schematic view of the display device according to the second embodiment in which the half mirror degree is 95%.
Figure 48:
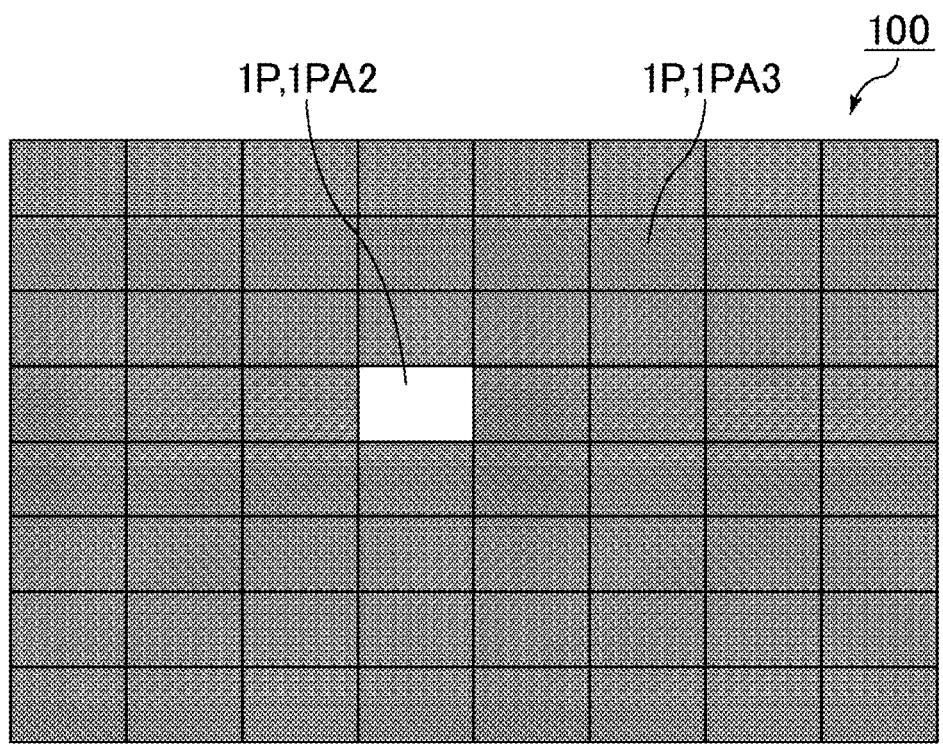
FIG. 48 is a schematic view of the display device according to the second embodiment in which the half mirror degree is 98.5%.

FIG. 43 is a schematic view of the display device according to the second embodiment in which the half mirror degree is 50%. FIG. 44 is a schematic view of the display device according to the second embodiment in which the half mirror degree is 75%. FIG. 45 is a schematic view of the display device according to the second embodiment in which the half mirror degree is 80%. FIG. 46 is a schematic view of the display device according to the second embodiment in which the half mirror degree is 87.5%. FIG. 47 is a schematic view of the display device according to the second embodiment in which the half mirror degree is 95%. FIG. 48 is a schematic view of the display device according to the second embodiment in which the half mirror degree is 98.5%.

The display device 100 according to the present embodiment has a configuration similar to those in FIGS. 19 and 29 illustrated in the first embodiment.

The control unit 510 has a function of calculating the brightness ratio based on the luminance, setting the half mirror degree based on the brightness ratio, and switching the display of the light modulation layer 120 based on the half mirror degree.

More specifically, the determination unit 511 may have a function of calculating the brightness ratio of the first space and the second space based on the luminance and setting the half mirror degree of the display panel 11 based on the brightness ratio, and the display control unit 512 may have a function of switching the display of the light modulation layer 120 based on the half mirror degree.

It is preferable that the luminance includes the first luminance and the second luminance, the first luminance is a luminance detected in a state in which the entire surface of the display panel 11 is subjected to the reflective display, and the second luminance is a luminance detected in a state in which the entire surface of the display panel 11 is subjected to the transmissive display. With such an aspect, the brightness ratio can be effectively calculated.

Figure 49:
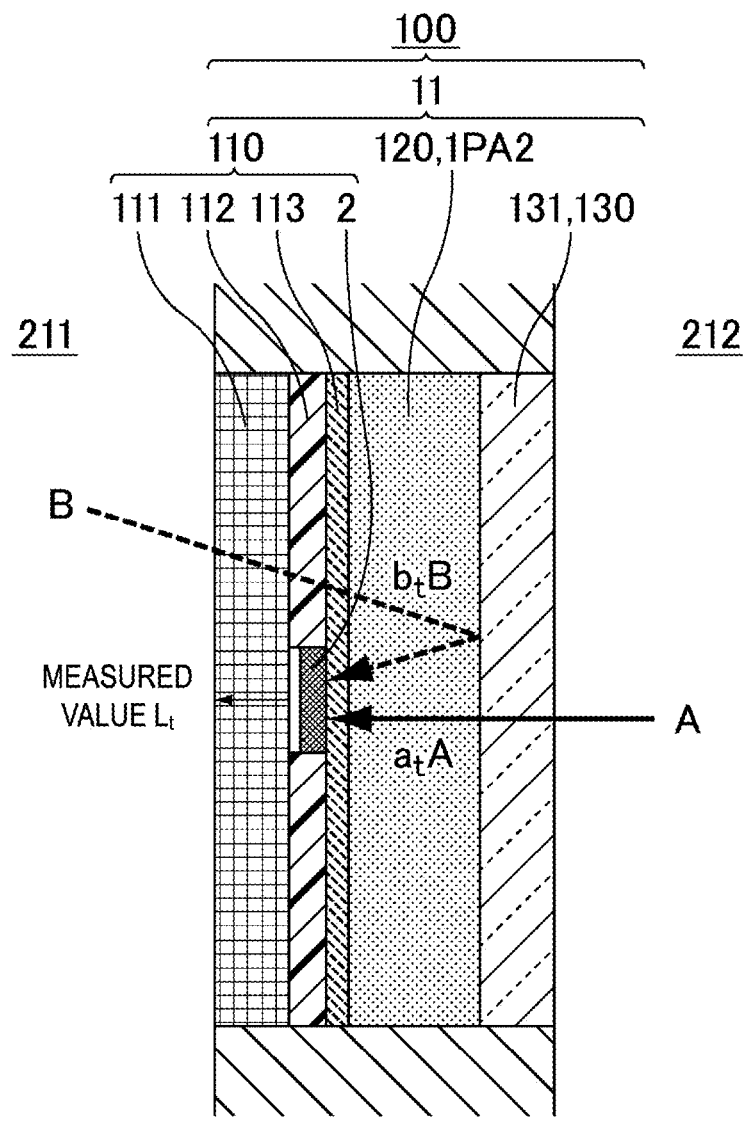
FIG. 49 is a schematic cross-sectional view for describing a case where the display device according to the second embodiment is in the transmissive mode.
Figure 50:
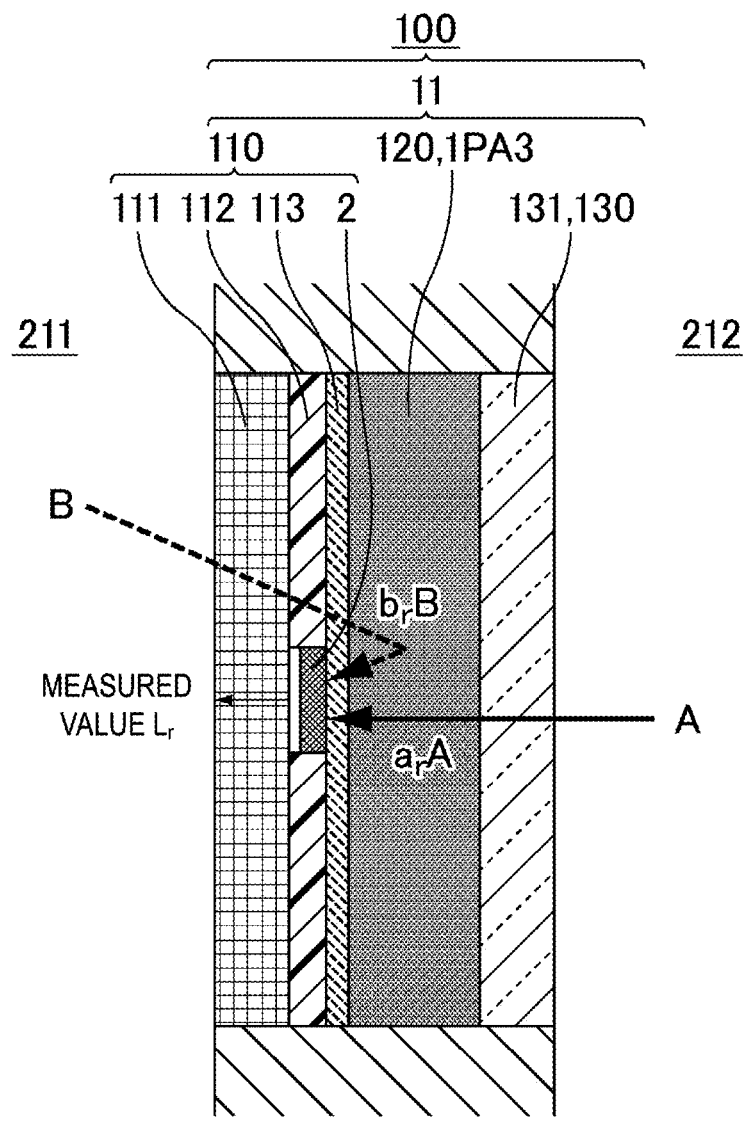
FIG. 50 is a schematic cross-sectional view for describing a case where the display device according to the second embodiment is in the mirror mode.

FIG. 49 is a schematic cross-sectional view for describing a case where the display device according to the second embodiment is in the transmissive mode. FIG. 50 is a schematic cross-sectional view for describing a case where the display device according to the second embodiment is in the mirror mode. An example of a method of setting the half mirror degree will be described with reference to FIGS. 49 and 50. Hereinafter, a specific method will be described in which the brightness ratio of the first space 211 and the second space 212 is obtained based on the luminance in the case where the display device 100 is in the mirror mode and the luminance in the case where the display device 100 is in the transmissive mode, and the half mirror degree is set based on the brightness ratio.

It is assumed that brightness of the dark room (second space 212) is A and brightness of the bright room (first space 211) is B. As illustrated in FIG. 49, when the display device 100 of the present embodiment is in the transmissive mode, the luminance of light obtained from the second space 212 and the luminance of light obtained from the first space 211 are uniquely determined by A and B, respectively, and are denoted by atA and btB, respectively. A luminance obtained by the optical sensor 2 of the display device 100 at this time is denoted by Lt.

Furthermore, as illustrated in FIG. 50, when the display device 100 of the present embodiment is in the mirror mode, the luminance of light obtained from the dark room (second space 212) and the luminance of light obtained from the bright room (first space 211) are uniquely determined by A and B, respectively, and are denoted by arA and brB, respectively. A luminance obtained by the optical sensor 2 of the display device 100 at this time is denoted by Lr.

That is, the above (equation T1) and (equation R1) are satisfied, where the brightness of the dark room (second space 212) is A, the brightness of the bright room (first space 211) is B, and when the display device 100 is in the transmissive mode, the luminance obtained by the optical sensor 2 is Lt, the luminance of light obtained from the dark room (second space 211) is atA, and the luminance of light obtained from the bright room (first space 212) is btB, and when the display device 100 is in the mirror mode, the luminance obtained by the optical sensor 2 is Lr, the luminance of light obtained from the dark room (second space 211) is arA, and the luminance of light obtained from the bright room (first space 212) is brB.

By solving the above (equation T1) and (equation R1) for A and B, the above (equation A1) and (equation B1) are obtained.

Since at, bt, ar, and br are known, A and B can be calculated from the measured values of Lt and Lr, and the relationship between the dark room (second space 212) brightness and the bright room (first space 211) brightness can be estimated. In a case where a plurality of the optical sensors 2 are incorporated, accuracy of estimation can be improved by obtaining an average value after removing noise data or the like.

A brightness ratio R of the first space 211 and the second space 212 is obtained by, for example, the above (equation X1).

The control unit 510 calculates the brightness ratio R from the (equation X1) and sets the half mirror degree based on the brightness ratio R. In the (equation X1), when n=m=1, the half mirror degree is set, for example, as follows. When (brightness ratio R)>100, the half mirror degree is set equal to 0% or more and 10% or less. When 20<(brightness ratio R)≤100, the half mirror degree is set equal to more than 65% and 90% or less. When 5<(brightness ratio R)≤20, the half mirror degree is set equal to more than 90% and 98% or less. When 1 (brightness ratio R)≤5, the half mirror degree is set equal to more than 98% and 100% or less.

Figure 51:
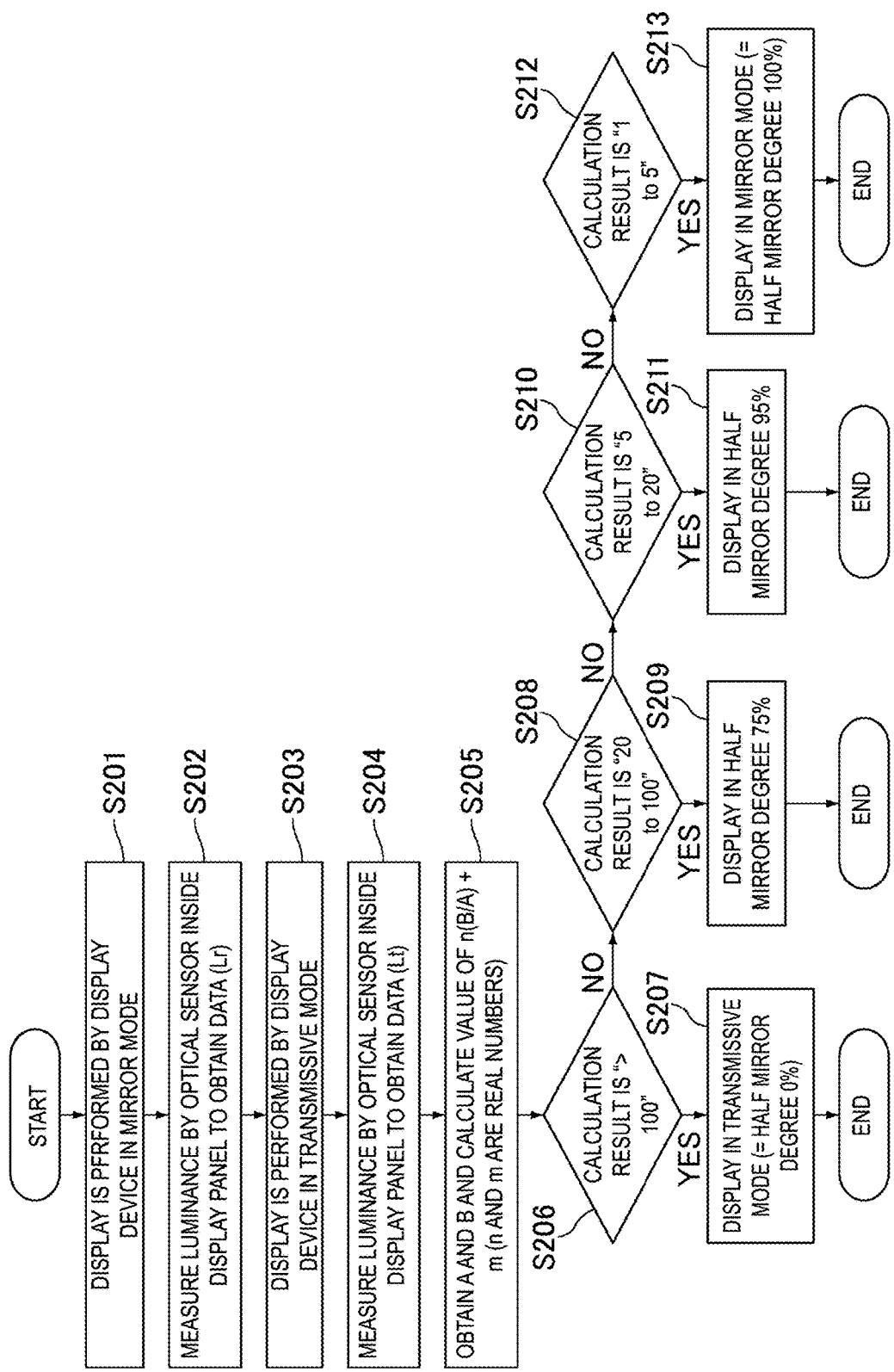
FIG. 51 is a flowchart for describing processing in a control unit included in the display device according to the second embodiment.

FIG. 51 is a flowchart for describing processing in a control unit included in the display device according to the second embodiment. More specifically, the display device 100 sets the half mirror degree as illustrated in FIG. 51 and determines the display mode.

As illustrated in FIG. 51, first, in step S201, the display is performed by the display device 100 in the mirror mode. In step S202, a luminance is measured by the optical sensor 2 disposed inside the display panel 11 to obtain luminance data (Lr). In step S203, the display is performed by the display device 100 in the transmissive mode. In step S204, a luminance is measured by the optical sensor 2 disposed inside the display panel 11 to obtain luminance data (Lt). In step S205, the dark room (second space 212) brightness A and the bright room (first space 211) brightness B are obtained, the brightness ratio R represented by the above (equation X1) is calculated, and the process proceeds to step S206.

In step S206, if the brightness ratio R exceeds 100, then the process proceeds to step S207, the display is performed by the display device 100 in the transmissive mode (half mirror degree 0%), and the process ends.

In step S206, if the brightness ratio R does not exceed 100, then the process proceeds to step S208. In step S208, if the brightness ratio R is within a range of more than 20 and 100 or less, then the process proceeds to step S209, the display is performed by the display device 100 at the half mirror degree 75%, and the process ends.

In step S208, if the brightness ratio R is not within the range of more than 20 and 100 or less, then the process proceeds to step S210. In step S210, if the brightness ratio R is within a range of 5 or more and 20 or less, then the process proceeds to step S211, the display is performed by the display device 100 at the half mirror degree 95%, and the process ends.

In step S210, if the brightness ratio R is not within the range of 5 or more and 20 or less, then the process proceeds to step S212. In step S212, if the brightness ratio R is within a range of 1 or more and less than 5, then the process proceeds to step S213, the display is performed by the display device 100 in the mirror mode (half mirror degree 100%), and the process ends.

Figure 52:
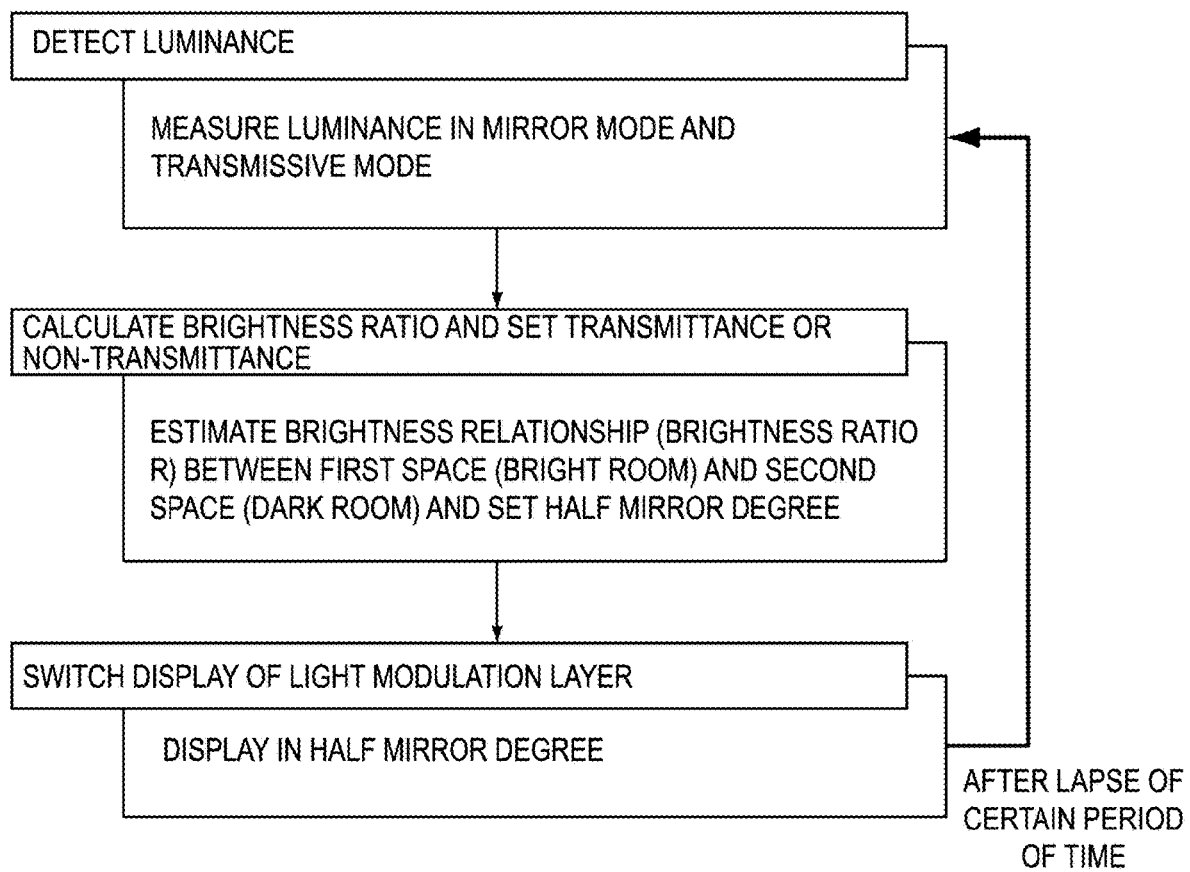
FIG. 52 is a flowchart for describing processing of automatically switching display in accordance with brightness of a space in the display device according to the second embodiment.

FIG. 52 is a flowchart for describing processing of automatically switching the display in accordance with the brightness of the space in the display device according to the second embodiment. A system for automatically setting the half mirror degree in accordance with the space can be configured by incorporating a logic as illustrated in FIG. 52 in advance.

Specifically, as illustrated in FIG. 52, every time a certain period of time elapses, the display device 100 repeats the detection of the luminance, the calculation of the brightness ratio based on the luminance, the setting of the half mirror degree based on the brightness ratio, and the switching of the display of the light modulation layer 120 based on the half mirror degree. With such an aspect, display in the half mirror degree appropriate in accordance with the space can be repeated.

As described above, the display device 100 according to the present embodiment is a display device that includes the optical sensor 2, wherein modulatable reflective display can be performed, and an appropriate half mirror mode can be realized automatically in accordance with the surrounding space.

Similarly to the first embodiment, the display device 100 according to the present embodiment is equipped with the optical sensor 2 that detects illuminance environments in the bright room and the dark room. The first substrate 110 included in the display device 100 according to the present embodiment is a TFT substrate and includes the optical sensor 2. The first substrate 110 also includes sensor readout lines and sensor reset lines.

The display panel 11 of the present embodiment includes the modulation region 100X in which the reflective display 1PA3 and the transmissive display 1PA2 can be switched, and the non-modulation region 100Y in which the reflective display 1PA3 and the transmissive display 1PA2 cannot be switched. The optical sensor 2 is disposed in the modulation region 100X. The optical sensor 2 impairs transparency in the transmissive display, and thus the optical sensor 2 is preferably disposed avoiding the center of the display panel 11. For example, one optical sensor 2 can be disposed at each of four corners of the modulation region 100X.

The display panel 11 includes the plurality of pixels 1P disposed two dimensionally and a plurality of the optical sensors 2. The display panel 11 outputs an output signal of the optical sensor 2 as a sensor output signal SS. The A/D converter 15 converts the sensor output signal SS in analog into a digital signal. The control unit 510 calculates the brightness ratio based on the digital signal output from the A/D converter 15, and sets the half mirror degree based on the brightness ratio. Further, the control unit 510 generates display data Din for causing each pixel 1P to be subjected to the reflective display 1PA3 or the transmissive display 1PA2 based on the half mirror degree, and outputs the display data Din to the panel drive circuit 12 to cause each pixel 1P to be subjected to the reflective display 1PA3 or the transmissive display 1PA2.

Similar to the first embodiment, as illustrated in FIG. 29, the backlight 14 of the present embodiment includes a plurality of white LEDs 16 and irradiates the back face of the display panel 11 with light (backlight light).

Similar to the first embodiment, as illustrated in FIG. 29, the display panel 11 of the present embodiment includes m gate lines G1 to Gm, 3n source lines SR1 to SRn, SG1 to SGn, SB1 to SBn, and (m×3n) pixels 1P. In addition, the display panel 11 includes (m×n) optical sensors 2, m sensor readout lines RW1 to RWm, and m sensor reset lines RS1 to RSm.

Similar to the first embodiment, as illustrated in FIG. 30, the optical sensor 2 of the present embodiment includes the capacitor 5, the photodiode 6, and the sensor preamplifier 7, and is provided for each pixel 1P.

The gate line drive circuit 41, the source line drive circuit 42, the sensor row drive circuit 43, p (p is an integer of 1 or more and n or less) sensor output amplifiers 44, and the plurality of switches 45 to 48 are provided around the display panel 11 according to the present embodiment.

Figure 53:
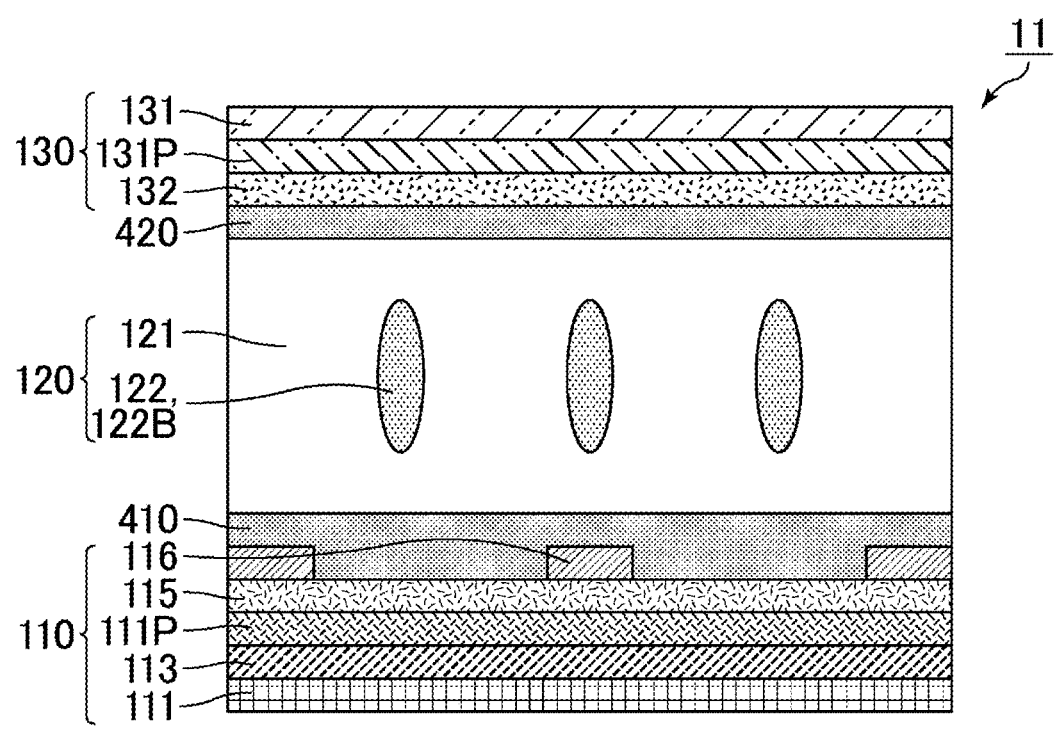
FIG. 53 is a schematic cross-sectional view for describing the case where the display device according to the second embodiment is in the transmissive mode.
Figure 54:
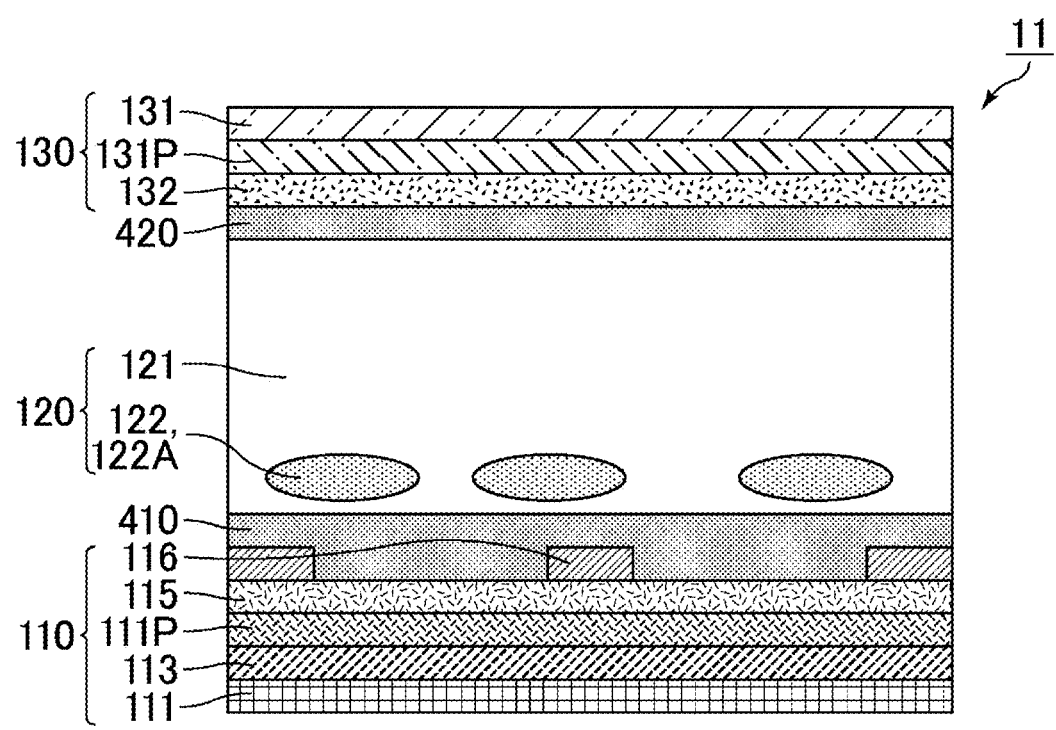
FIG. 54 is a schematic cross-sectional view for describing the case where the display device according to the second embodiment is in the mirror mode.
Figure 55:
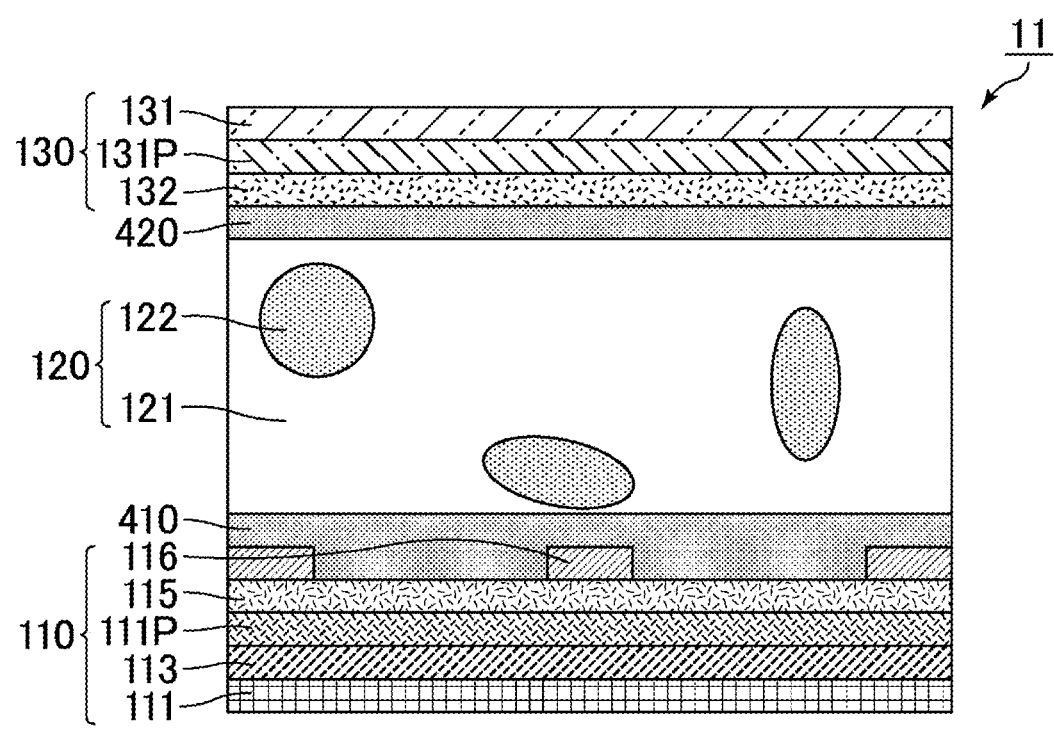
FIG. 55 is a schematic cross-sectional view for describing the case where the display device according to the second embodiment is in the half mirror mode.

FIG. 53 is a schematic cross-sectional view for describing the case where the display device according to the second embodiment is in the transmissive mode. FIG. 54 is a schematic cross-sectional view for describing the case where the display device according to the second embodiment is in the mirror mode. FIG. 55 is a schematic cross-sectional view for describing the case where the display device according to the second embodiment is in the half mirror mode.

As illustrated in FIGS. 53 to 55, the first substrate 110 constitutes an active matrix substrate. Specifically, the first substrate 110 includes various signal lines (gate lines, source lines, and the like), the TFT, and the insulating layer 113, which are not illustrated, on the first support substrate 111, and includes the first electrode 111P (pixel electrode), an insulating layer 115, and ribs 116 thereon. The various signal lines are driven by a drive circuit (a gate line drive circuit, a source line drive circuit, or the like).

The second substrate 130 includes a second electrode 131P (common electrode) and an insulating layer 132 on the second support substrate 131.

Figure 56:
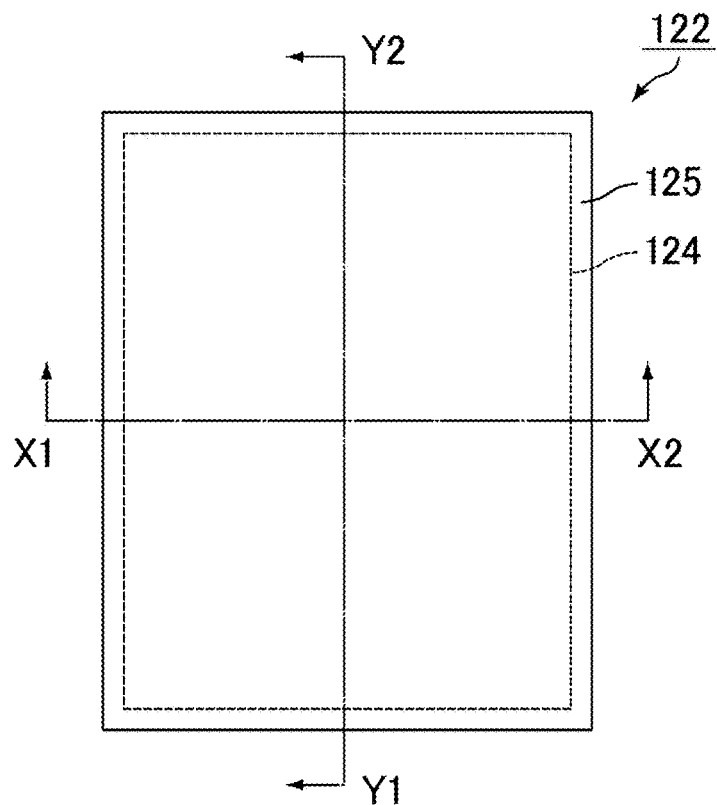
FIG. 56 is a schematic plan view illustrating a configuration of a shape anisotropic member included in a light modulation layer of the second embodiment.
Figure 57:
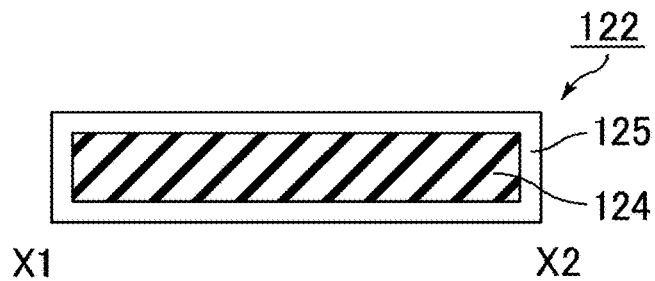
FIG. 57 is a schematic cross-sectional view illustrating the configuration of the shape anisotropic member taken along a line X1-X2 in FIG. 56.
Figure 58:
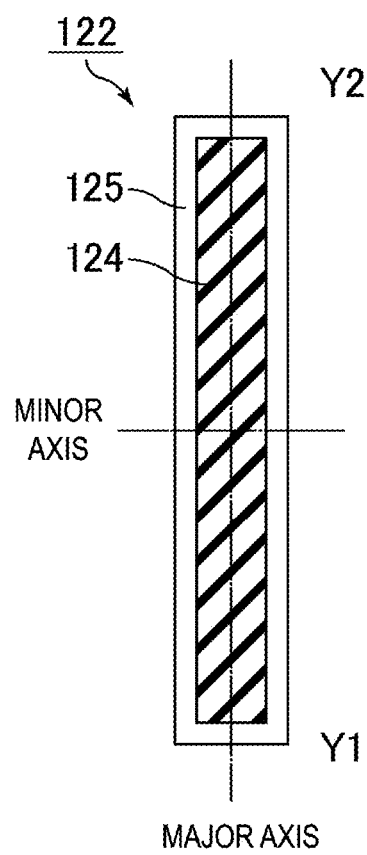
FIG. 58 is a schematic cross-sectional view illustrating the configuration of the shape anisotropic member taken along a line Y1-Y2 in FIG. 56.

FIG. 56 is a schematic plan view illustrating a configuration of a shape anisotropic member included in the light modulation layer of the second embodiment. FIG. 57 is a schematic cross-sectional view illustrating the configuration of the shape anisotropic member taken along a line X1-X2 in FIG. 56. FIG. 58 is a schematic cross-sectional view illustrating the configuration of the shape anisotropic member taken along a line Y1-Y2 in FIG. 56. As illustrated in FIGS. 53 to 58, in the present embodiment, the non-transmissive display is the reflective display, the light modulation layer 120 includes a plurality of the shape anisotropic members 122, and each of the plurality of shape anisotropic members 122 includes a core 124 serving as a conductor and a covering layer 125 serving as a dielectric covering a periphery of the core 124. With such an aspect, the alignment of the plurality of shape anisotropic members 122 can be controlled in accordance with the voltage applied to the light modulation layer 120 and the transmittance of the light modulation layer 120 can be changed.

More specifically, a frequency of the voltage applied to the light modulation layer 120 by the power supply connected to the first electrode 111P and the second electrode 131P is controlled, and thus the transmittance of the light modulation layer 120 can be changed. Here, in the present specification, a case where a frequency of an alternating voltage is 0 Hz is referred to as "direct current". A thickness (cell thickness) of the light modulation layer 120 is set according to a length of the shape anisotropic member 122 in the major axis direction, and is set equal to, for example, 80 μm.

The light modulation layer 120 includes the medium 121 and the plurality of shape anisotropic members 122.

Each shape anisotropic member 122 includes the core 124 and the covering layer 125. The shape anisotropic member 122 is long along the major axis and short along the minor axis. Here, the shape anisotropic member 122 is a rectangular plate-shaped flake, but may be a flake having a disk shape.

The core 124 is a conductor such as a metal having a flake (thin leaf) shape. The core 124 has light reflectivity. Note that the shape of the core 124 is not limited to the flake shape, and, for example, a cylindrical shape or an oval spherical shape can be adopted. As the core 124, an aluminum flake used for general coating can be used. For example, as the core 124, the aluminum flake having a length (major diameter) 20 μm in the major axis direction and a thickness (minor diameter) 0.3 μm in the minor axis direction can be used.

The covering layer 125 is a dielectric layer covering the entire periphery (entire surface) of the core 124. As illustrated in FIGS. 56 to 58, the covering layer 125 covers the entire periphery (a front surface, a back face, a left side surface, a right side surface, an upper face, and a lower face) of the core 124. Here, the covering layer 125 has optical transparency. Note that the covering layer 125 may be colored so as to absorb visible light in a specific range. Note that the covering layer 125 may absorb visible light (color is black) and transmit light other than the visible light (infrared light, ultraviolet light, or the like).

As a material of the covering layer 125, an organic material such as an acrylic resin, a polyimide resin, and polyester, and an inorganic material such as silicon dioxide, silicon nitride, and alumina may be used. In a case of forming the covering layer 125 of the organic material around the core 124, for example, the cores are dispersed in an acrylic monomer solution and irradiated with ultraviolet light, and thus an acrylic polymer can be formed round each of the cores. In a case of forming the covering layer 125 of the inorganic material around the core 124, for example, silicon dioxide can be formed around the core by using a known sol-gel process. The covering layer 125 may be composed of a plurality of materials, and for example, a part of the plurality of materials may be composed of silicon dioxide.

The shape anisotropic member 122 is a response member that rotates according to the direction of the electrical field. In terms of display characteristics, the shape anisotropic member 122 is a member in which an area (projected area to the first substrate 110 and the second substrate 130) of a projected image of the shape anisotropic member 122 viewed from the normal direction of the first substrate 110 and the second substrate 130 changes according to the change in the frequency of the applied voltage. Furthermore, a projected area ratio (maximum projected area:minimum projected area) is preferably 2:1 or more. That is, an area of the cross section (FIG. 56) perpendicular to the minor axis of the shape anisotropic member 122 is preferably twice or more of an area of the cross section (FIG. 57) perpendicular to the major axis.

The shape anisotropic member 122 is a member having a positive or negative charging property in the medium 121. The shape anisotropic member 122 is charged in the medium 121. Specifically, for example, a member that can exchange electrons with the electrode, the medium, or the like can be used.

The shape of the shape anisotropic member 122 is not limited to the flake shape, and, for example, a cylindrical shape or an oval spherical shape can be adopted.

The specific gravity of the shape anisotropic member 122 is preferably 11 g/cm$^3$ or less, more preferably 3 g/cm$^3$ or less, and further preferably equivalent to the specific gravity of the medium 121. This is because, when the specific gravity of the shape anisotropic member 122 is significantly different from the specific gravity of the medium 121, there is a problem that the shape anisotropic member 122 may settle or float. When a material, such as a resin, having small specific gravity is used as the covering layer 125, the specific gravity of the shape anisotropic member 122 can be adjusted (reduced) by adjusting (increasing) a film thickness of the covering layer 125.

The medium 121 is a material having transparency in the visible light region. As the medium 121, a liquid that substantially does not absorb light in the visible light region, one obtained by coloring the liquid with a pigment, or the like can be used. The specific gravity of the medium 121 is preferably equivalent to that of the shape anisotropic member 122. The medium 121 is an insulator.

The medium 121 preferably has low volatility in consideration of a step of being sealed inside the cell. The viscosity of the medium 121 is related to a response, and is preferably 5 mPa·s or less, and more preferably 0.5 mPa·s or more in order to prevent the shape anisotropic member 122 from settling.

The medium 121 may be formed of a single substance or a mixture of a plurality of substances. For example, propylene carbonate, N-methyl-2-pyrrolidone (NMP), fluorocarbon, silicone oil, or the like may be used.

The light incident on the light modulation layer 120 is reflected by the shape anisotropic member 122. The light reflected by the shape anisotropic member 122 includes light reflected at a surface of the core 124 and light reflected at an interface (surface of the covering layer 125) between the medium 121 and the covering layer 125. A difference in refractive index between the medium 121 and the covering layer 125 serving as a dielectric is preferably 0.3 or less, and more preferably 0.2 or less. By setting the difference in the refractive index between the medium 121 and the covering layer 125 equal to 0.3 or less, the reflectivity at the interface between the media 121 and the covering layer 125 can be suppressed to approximately 1% or less. An intensity of the reflected light at the interface between the medium 121 and the covering layer 125 is small, and thus interference between the reflected light and reflected light at the surface of the core 124 is small. Thus, in the reflected light of the shape anisotropic member 122, the reflected light can be prevented from appearing colored as a result of the light of a specific wavelength being intensified by interference. That is, the display device 100 can display a desired color regardless of an angle at which the display device 100 is observed.

For example, by using N-methyl-2-pyrrolidone (NMP) having a refractive index of 1.48 as the medium 121 and by using silicon dioxide having a refractive index of 1.45 as the dielectric constituting the covering layer 125, the reflectivity at the interface between the media 121 and the covering layer 125 can be reduced to approximately 0.01% or less.

By adjusting the film thickness of the covering layer 125, the interference can be reduced. The wavelength of the visible light is approximately 380 nm or more and 780 nm or less. The film thickness of the covering layer 125 may be set so that the light having the wavelength in this range does not strongly interfere. It is assumed that the wavelength of light is λ, the refractive index of the covering layer 125 (dielectric) is n, and the film thickness of the covering layer 125 is d.

$$2d=\lambda/n \quad \text{(equation 1)}$$

When the above (equation 1) is satisfied, the light reflected at the surface of the covering layer 125 and the light reflected at the surface of the core 124 interfere with each other to intensify each other with respect to light incident from the normal direction of the surface of the shape anisotropic member 122. That is, the light of the specific wavelength in the reflected light is enhanced by the first order interference, and the reflected light appears colored.

In order to prevent the first order interference light of the visible light (wavelength is 380 nm or more and 780 nm or less) from appearing in the reflected light, the film thickness d of the covering layer 125 may be set so as not to satisfy the above (equation 1). That is, when the film thickness d is smaller than 0.19/n [μm] or larger than 0.39/n [μm], the reflected light can be prevented from appearing colored. For example, when silicon dioxide having a refractive index of 1.45 is used as the dielectric constituting the covering layer 125, the film thickness d of the covering layer 125 is preferably set to be smaller than 0.13 μm or larger than 0.27 μm.

The minor diameter (thickness) of the shape anisotropic member 122 is preferably ½ or less of the major diameter. Thus, for example, even when the thickness of the core 124 is close to 0, the thickness of the covering layer 125 on one side is preferably ½ or less of the major diameter of the shape anisotropic member 122 so that the minor diameter (thickness) of the shape anisotropic member 122 is ½ or less of the major diameter. For example, the thickness (film thickness) d of the covering layer 125 is preferably (y−2x)/2 or less, where the thickness of the core 124 is x and the major diameter of the core 124 is y.

Next, a method of controlling the transmissive display and the reflective display by the light modulation layer 120 will be specifically described. Here, a case will be described in which the shape anisotropic member 122 (referred to as a flake) having the flake shape illustrated in FIGS. 56 to 58 is used.

When a voltage (alternating voltage) having a frequency such as 60 Hz as a high frequency is applied to the light modulation layer 120, the flake rotates so that its major axis becomes parallel to the electric force line as illustrated in FIG. 53 due to a force described from a dielectrophoresis phenomenon, a Coulombic force, or an electrical energy point of view. That is, the flake is aligned such that the major axis of the flake is perpendicular to the first substrate 110 and the second substrate 130 (hereinafter, also referred to as a vertical alignment). Thus, the light incident on the light modulation layer 120 is transmitted (passed) through the light modulation layer 120 and is emitted to the observer side. That is, the transmissive display can be realized by the light modulation layer 120. The smaller the thickness of the shape anisotropic member 122 is, the higher the transmittance can be.

On the other hand, when a voltage having a frequency such as 0.1 Hz or a direct current (frequency=0 Hz) as a low frequency is applied to the light modulation layer 120, almost all (preferably all) of flakes having the charging property are attracted to the vicinity of an electrode charged with a charge having a polarity opposite to the polarity of the charged charge due to a force described by an electrophoretic force or a Coulombic force. Then, the flakes rotate so as to have the most stable alignment and stick to the first substrate 110 or the second substrate 130. FIG. 54 illustrates, as an example, a state in which, when the direct current voltage is applied to the light modulation layer 120, a polarity (positive) of charges charged on the first electrode 111P of the first substrate 110 and a polarity (negative) of charges charged on the flake are different from each other and the flake is aligned so as to stick to the first substrate 110. That is, the flake is aligned such that the major axis of the flake becomes parallel to the first substrate 110 and the second substrate 130 (hereinafter, also referred to as a horizontal alignment). At this time, the minor axis of the flake is perpendicular to the first substrate 110 and the second substrate 130. Thus, the light incident on the light modulation layer 120 is reflected by the flake, and thus the reflective display can be realized by the light modulation layer 120. As the thickness of the shape anisotropic member 122 is smaller, unevenness of the stacked shape anisotropic members on the display surface side becomes smaller, and scattering of external light can be reduced.

Here, relationships between the luminance Lt obtained by the optical sensor 2 in the transmissive mode and the luminance Lr obtained by the optical sensor 2 in the mirror mode and the brightness ratio B/A will be described.

Figure 59:
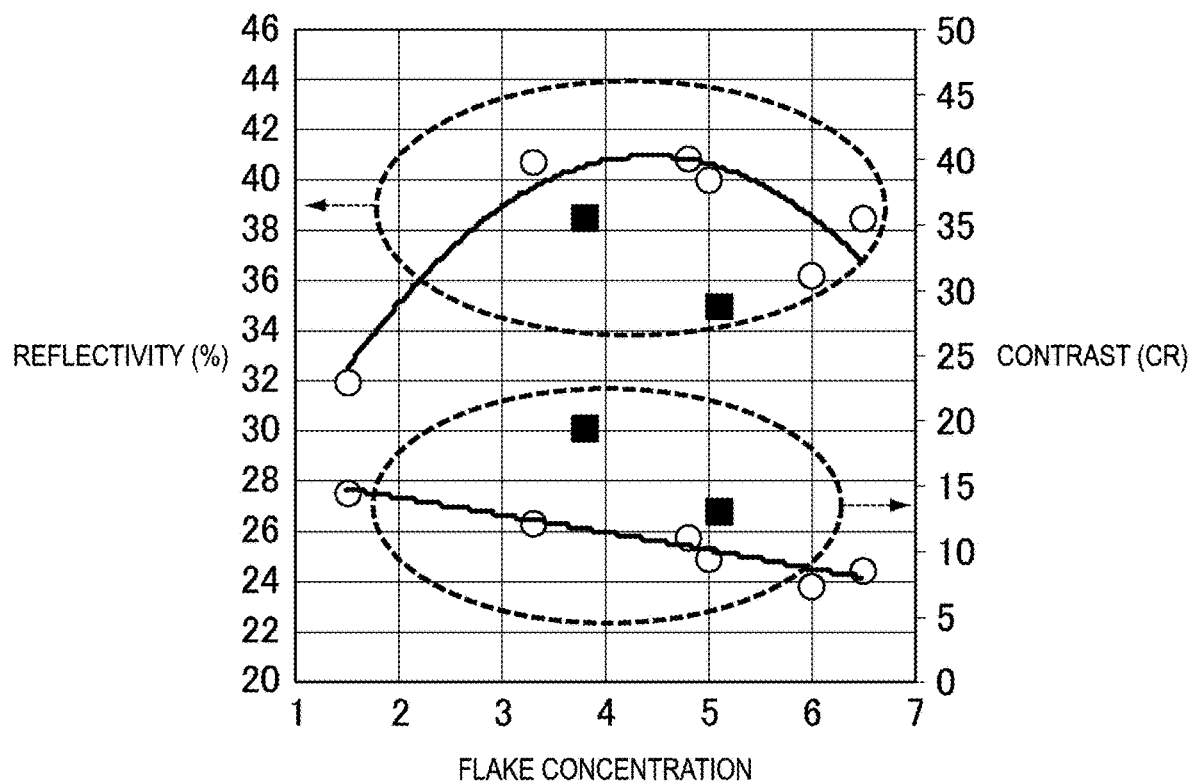
FIG. 59 is a graph showing relationships between a concentration of the shape anisotropic member in the light modulation layer of the second embodiment and the reflectivity and contrast of the display device.

Relationships between a concentration of the flake in the light modulation layer 120 and the reflectivity and contrast of the display device are as illustrated in FIG. 59. FIG. 59 is a graph showing relationships between a concentration of the shape anisotropic member in the light modulation layer of the second embodiment and the reflectivity and contrast of the display device.

When the concentration of the shape anisotropic member in the light modulation layer 120, that is, the concentration of the flake in the light modulation layer 120 is 3.8 wt. %, the reflectivity in the reflective display is 38.5%, and the contrast is 21 in FIG. 59, and thus the reflectivity in the transmissive display is found to be 1.83%.

Assuming that interface reflection X=4%, wiring reflection Y=30%, and flake reflection Z=1.83% at the time of the transmissive display, the following is established. Here, as the interface reflection, reflectivity at a general air/glass interface is used. As the wiring reflection, a target value of a liquid crystal see-through display is used. at =(1−X)*(1−Y−Z)=0.6544bt=(1−X−Y)*(X+Z)=0.0385

Assuming that the interface reflection X=4%, the wiring reflection Y=30%, and the flake reflection Z=38.5% at the time of the reflective display, the following is established. ar=(1−X)*(1−Y−Z)=0.3024br=(1−X−Y)*(X+Z)=0.2805

Figure 60:
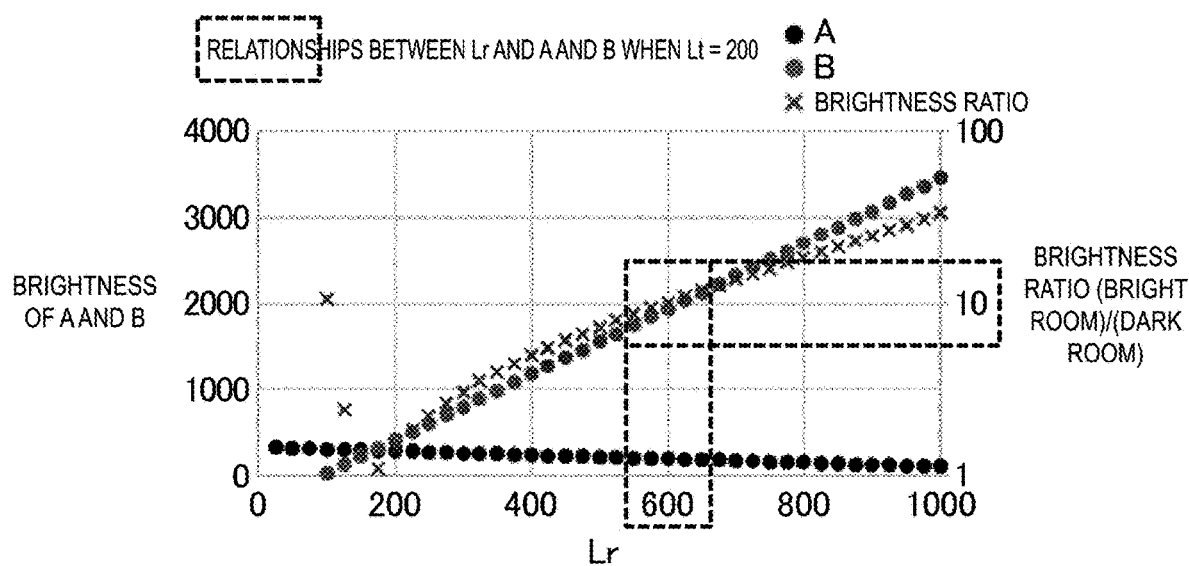
FIG. 60 is a graph showing relationships between brightness A and B and a brightness ratio with respect to a luminance Lr in the mirror mode when a luminance Lt in the transmissive mode is set equal to 200 in the display device according to the second embodiment.
Figure 61:
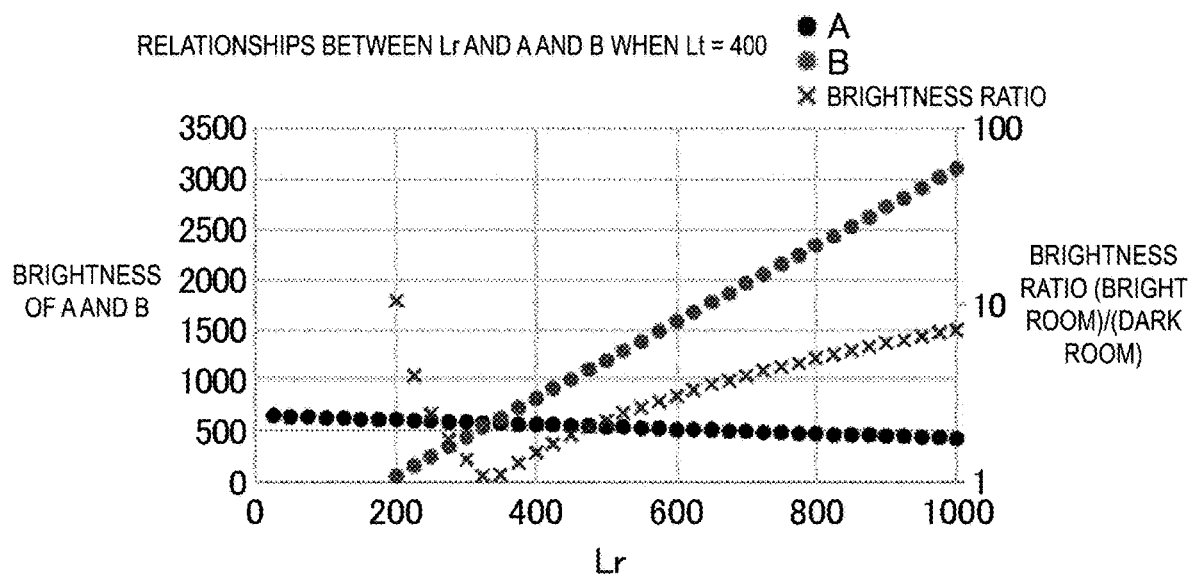
FIG. 61 is a graph showing relationships between brightness A and B and a brightness ratio with respect to the luminance Lr in the mirror mode when the luminance Lt in the transmissive mode is set equal to 400 in the display device according to the second embodiment.
Figure 62:
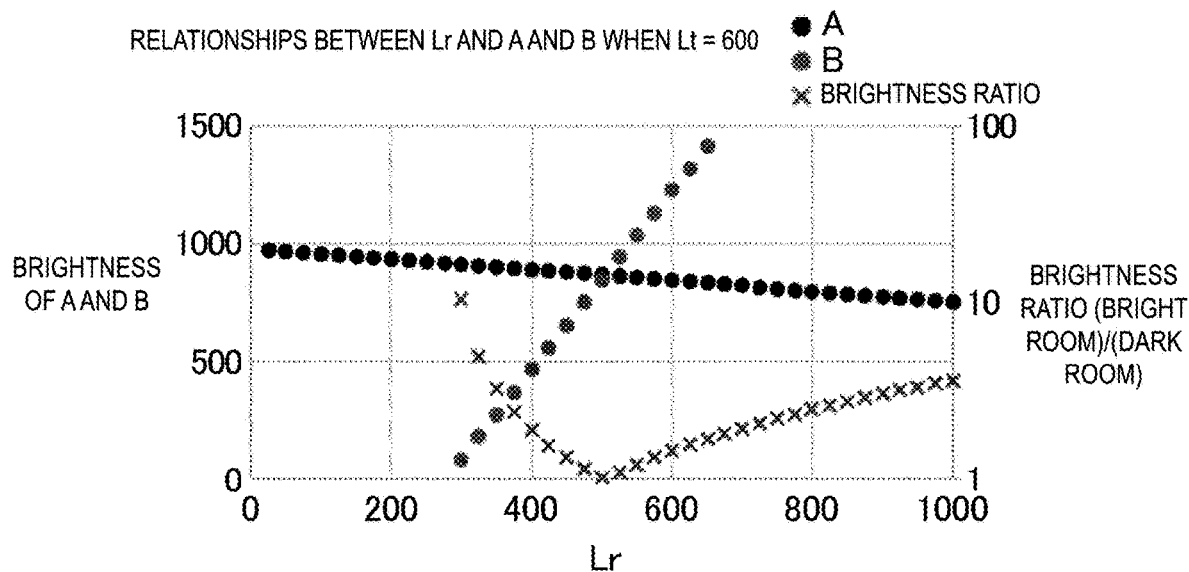
FIG. 62 is a graph showing relationships between brightness A and B and a brightness ratio with respect to the luminance Lr in the mirror mode when the luminance Lt in the transmissive mode is set equal to 600 in the display device according to the second embodiment.
Figure 63:
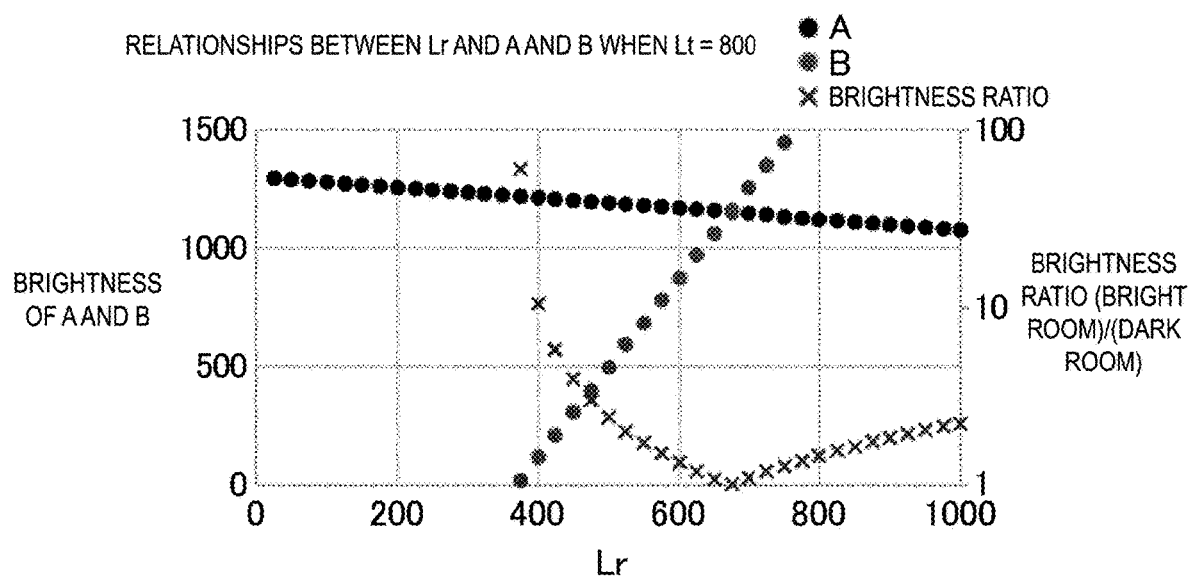
FIG. 63 is a graph showing relationships between brightness A and B and a brightness ratio with respect to the luminance Lr in the mirror mode when the luminance Lt in the transmissive mode is set equal to 800 in the display device according to the second embodiment.
Figure 64:
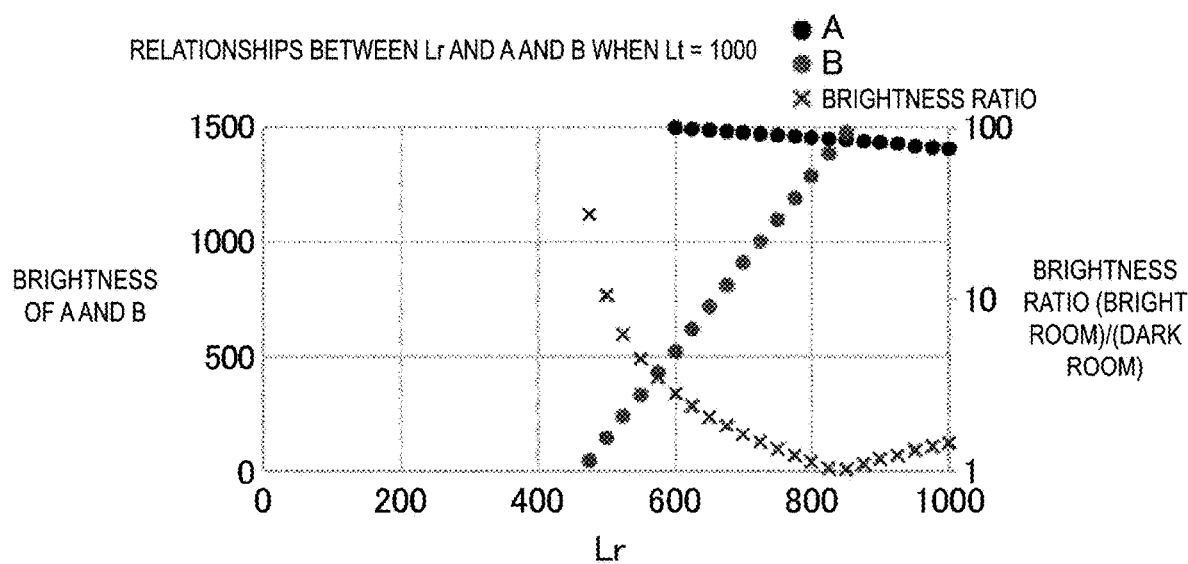
FIG. 64 is a graph showing relationships between brightness A and B and a brightness ratio with respect to the luminance Lr in the mirror mode when the luminance Lt in the transmissive mode is set equal to 1000 in the display device according to the second embodiment.

From the above, in a case where at, bt, ar, and br are 0.70, 0.037, 0.34, and 0.28, respectively, and Lt is 200, 400, 600, 800, and 1000, the value of Lr and the values of A and B are obtained by simulation, and thus the results are as illustrated in FIGS. 60 to 64. FIG. 60 is a graph showing relationships of brightness A and B and a brightness ratio with respect to a luminance Lr in the mirror mode when a luminance Lt in the transmissive mode is set equal to 200 in the display device according to the second embodiment. FIG. 61 is a graph showing relationships of brightness A and B and a brightness ratio with respect to a luminance Lr in the mirror mode when a luminance Lt in the transmissive mode is set equal to 400 in the display device according to the second embodiment. FIG. 62 is a graph showing relationships of brightness A and B and a brightness ratio with respect to a luminance Lr in the mirror mode when a luminance Lt in the transmissive mode is set equal to 600 in the display device according to the second embodiment. FIG. 63 is a graph showing relationships of brightness A and B and a brightness ratio with respect to a luminance Lr in the mirror mode when a luminance Lt in the transmissive mode is set equal to 800 in the display device according to the second embodiment. FIG. 64 is a graph showing relationships of brightness A and B and a brightness ratio with respect to the luminance Lr in the mirror mode when a luminance Lt in the transmissive mode is set equal to 1000 in the display device according to the second embodiment.

For example, in FIG. 60, information that "when the luminance Lt in the transmissive mode is 200 and the luminance Lr in the mirror mode is 600, the first space 211 (brightness B) is 10 times brighter than the second space 212 (brightness A)" can be obtained.

Third Embodiment

In the present embodiment, features unique to the present embodiment will be mainly described, and a description of contents overlapping the above-described first embodiment and the second embodiment will be omitted. The present embodiment is substantially the same as the first embodiment except that the light modulation layer 120 is different.

Hereinafter, a case where the non-transmissive display is the light blocking display will be described as an example. Specifically, a case will be described in detail in which the display device 100 includes a plurality of pixels 1P and the light modulation layer 120 can switch between the transmissive display and the light blocking display for each pixel 1P. A case will be described as an example in which the control unit sets the half light blocking degree as the non-transmittance. Note that, in the present embodiment, the case where the non-transmittance is set is taken as an example, but the same effect can be obtained when the transmittance is set.

That is, the light modulation layer 120 of the present embodiment switches between the transmissive display and the light blocking display. The control unit calculates the brightness ratio of the first space and the second space based on the luminance, sets the half light blocking degree as the non-transmittance of the display panel 11 based on the brightness ratio, and switches the display of the light modulation layer 120 based on the half light blocking degree.

The light modulation layer 120 of the present embodiment performs the light blocking display as the non-transmissive display. The light blocking display means display in which light is blocked (more specifically, absorbed).

The display device 100 according to the present embodiment can switch between three types of display modes of a light blocking mode, the transmissive mode, and a half light blocking mode, based on the brightness ratio. Specifically, when the half light blocking degree is set equal to 0% based on the brightness ratio, that is, when the ratio of the light blocked by the display panel 11 to the light incident on the display panel 11 is set equal to 0%, the mode is the transmissive mode in which all of the light incident on the display panel 11 is transmitted. When the half light blocking degree is set equal to 100% based on the brightness ratio, that is, when the ratio of the light blocked by the display panel to the light incident on the display panel 11 is set equal to 100%, the mode is the light blocking mode in which all of the light incident on the display panel 11 is blocked. When the half light blocking degree is set equal to more than 0% and less than 100% based on the brightness ratio, that is, when the ratio of the light blocked by the display panel to the light incident on the display panel 11 is set equal to more than 0% and less than 100%, the mode is the half light blocking mode in which a part of the light incident on the display panel 11 is blocked.

In the present embodiment, for example, the first space 211 is a space brighter than the second space 212, and specifically, the first space 211 is the bright room and the second space 212 is the dark room.

When the display device 100 of the present embodiment is in the light blocking mode, all of the plurality of pixels 1P are the light blocking display in the display device 100, that is, the entire surface of the display panel 11 is the light blocking display. With such an aspect, almost all of the incident light 311L incident on the display device 100 from the first space 211 is blocked at the display device 100. Almost all of the light incident on the display device 100 from the second space 212 is blocked in the display device 100. As a result, the light blocking mode is realized in which the second space 212 is invisible from the first space 211 and the first space 211 is invisible from the second space 212.

When the display device 100 of the present embodiment is in the transmissive mode, in the display device 100 of the present embodiment, all of the plurality of pixels 1P are the transmissive display, that is, the entire surface of the display panel 11 is the transmissive display. With such an aspect, almost all of the light incident on the display device 100 from the first space 211 is transmitted through the display device 100, and the transmitted light is incident on the second space 212. Almost all of the light incident on the display device 100 from the second space 212 is transmitted through the display device 100, and the transmitted light is incident on the first space 211. As a result, the transmissive mode is realized in which the second space 212 is visible from the first space 211 and the first space 211 is visible from the second space 212.

When the display device 100 of the present embodiment is in the half light blocking mode, in the display device 100 of the present embodiment, a part of the plurality of pixels 1P is the light blocking display and the other pixels 1P are the transmissive display, that is, a part of the display panel is the light blocking display and the other part is the transmissive display. With such an aspect, a part of the light incident on the display device 100 from the first space 211 is blocked in the display device 100, and the other part is transmitted through the display device 100 and incident on the second space 212. A part of the light incident on the display device 100 from the second space 212 is blocked at the display device 100, and the other part is transmitted through the display device 100 and incident on the first space 211. Here, when the first space 211 is brighter than the second space 212, for example, when the first space 211 is the bright room and the second space 212 is the dark room darker than the first space 211, the light from the first space 211 is easily visible in the second space 212 and the light from the second space 212 is hardly visible in the first space 211. As a result, the half light blocking mode is realized in which the second space 212 is invisible from the first space 211 and the first space 211 is visible from the second space 212.

It is preferable that the display device 100 includes the plurality of pixels 1P, and the control unit causes a number of pixels 1P corresponding to the half light blocking degree among the plurality of pixels 1P to be subjected to the light blocking display. With such an aspect, the half light blocking mode can be effectively realized, and thus the state can be more effectively realized in which one space of the first space and the second space is visible from the other space and the other space is invisible from the one space. A method in which a part of the pixels 1P among the plurality of pixels 1P is subjected to the light blocking display and the other part of the pixels 1P is subjected to the transmissive display is also referred to as the pixel division method. The pixel division method will be described below.

The half light blocking degree in the pixel division method is, specifically, a ratio of a light blocking display area to the entire display area of the display panel 11. More specifically, in the case where the display panel 11 includes the plurality of pixels 1P, the half light blocking degree in the pixel division method is a ratio of a total area of the pixels 1P subjected to the light blocking display to a total area of the plurality of pixels 1P.

The half light blocking degree 0% means that all of the plurality of pixels 1P (that is, the entire surface of the display panel 11) are the transmissive display. The half light blocking degree 100% means that all of the plurality of pixels 1P (that is, the entire surface of the display panel 11) are the light blocking display. In the half light blocking mode, the half light blocking degree is adjusted in a range of more than 0% and less than 100%.

The display device 100 according to the present embodiment has a configuration similar to those in FIGS. 19 and 29 illustrated in the first embodiment.

The control unit 510 has a function of calculating the brightness ratio based on the luminance, setting the half light blocking degree based on the brightness ratio, and switching the display of the light modulation layer 120 based on the half light blocking degree.

More specifically, the determination unit 511 may have a function of calculating the brightness ratio of the first space and the second space based on the luminance and setting the half light blocking degree of the display panel 11 based on the brightness ratio, and the display control unit 512 may have a function of switching the display of the light modulation layer 120 based on the half light blocking degree.

It is preferable that the luminance includes the first luminance and the second luminance, the first luminance is a luminance detected in a state in which the entire surface of the display panel 11 is subjected to the light blocking display, and the second luminance is a luminance detected in a state in which the entire surface of the display panel 11 is subjected to the transmissive display. With such an aspect, the brightness ratio can be effectively calculated.

Hereinafter, a specific method will be described in which the brightness ratio of the first space 211 and the second space 212 is obtained based on the luminance in the case where the display device 100 is in the light blocking mode and the luminance in the case where the display device 100 is in the transmissive mode, and the half light blocking degree is set based on the brightness ratio.

It is assumed that brightness of the dark room (second space 212) is A and brightness of the bright room (first space 211) is B. When the display device 100 of the present embodiment is in the transmissive mode, the luminance of light obtained from the second space 212 and the luminance of light obtained from the first space 211 are uniquely determined by A and B, respectively, and are denoted by atA and btB, respectively. A luminance obtained by the optical sensor 2 of the display device 100 at this time is denoted by Lt.

Furthermore, when the display device 100 of the present embodiment is in the light blocking mode, the luminance of light obtained from the dark room (second space 212) and the luminance of light obtained from the bright room (first space 211) are uniquely determined by A and B, respectively, and are denoted by arA and brB, respectively. A luminance obtained by the optical sensor 2 of the display device 100 at this time is denoted by Lr.

That is, the above (equation T1) and (equation R1) are satisfied, where the brightness of the dark room (second space 212) is A, the brightness of the bright room (first space 211) is B, and when the display device 100 is in the transmissive mode, the luminance obtained by the optical sensor 2 is Lt, the luminance of light obtained from the dark room (second space 211) is atA, and the luminance of light obtained from the bright room (first space 212) is btB, and when the display device 100 is in the light blocking mode, the luminance obtained by the optical sensor 2 is Lr, the luminance of light obtained from the dark room (second space 211) is arA, and the luminance of light obtained from the bright room (first space 212) is brB.

By solving the above (equation T1) and (equation R1) for A and B, the above (equation A1) and (equation B1) are obtained.

Since at, bt, ar, and br are known, A and B can be calculated from the measured values of Lt and Lr, and the relationship between the dark room (second space 212) brightness and the bright room (first space 211) brightness can be estimated. In a case where a plurality of the optical sensors 2 are incorporated, accuracy of estimation can be improved by obtaining an average value after removing noise data or the like.

A brightness ratio R of the first space 211 and the second space 212 is obtained by, for example, the above (equation X1).

The control unit 510 calculates the brightness ratio R from the (equation X1) and sets the half light blocking degree based on the brightness ratio R. In the (equation X1), when n=m=1, the half light blocking degree is set, for example, as follows. When (brightness ratio R)>100, the half light blocking degree is set equal to 0% or more and 10% or less. When 20<(brightness ratio R)≤100, the half light blocking degree is set equal to more than 65% and 90% or less. When 5<(brightness ratio R)≤20, the half light blocking degree is set equal to more than 90% and 98% or less. When 1 (brightness ratio R)≤5, the half light blocking degree is set equal to more than 98% and 100% or less.

Every time a certain period of time elapses, the display device 100 repeats the detection of the luminance, the calculation of the brightness ratio based on the luminance, the setting of the half light blocking degree based on the brightness ratio, and the switching of the display of the light modulation layer 120 based on the half light blocking degree. With such an aspect, display in the half light blocking degree appropriate in accordance with the space can be repeated.

As described above, the display device 100 according to the present embodiment is a display device that includes the optical sensor 2, wherein modulatable light blocking display can be performed, and an appropriate half light blocking mode can be realized automatically in accordance with the surrounding space.

Similarly to the first embodiment, the display device 100 according to the present embodiment is equipped with the optical sensor 2 that detects illuminance environments in the bright room and the dark room. The first substrate 110 included in the display device 100 according to the present embodiment is a TFT substrate and includes the optical sensor 2. The first substrate 110 also includes sensor readout lines and sensor reset lines.

The display panel 11 of the present embodiment includes the modulation region 100X in which the light blocking display and the transmissive display can be switched, and the non-modulation region 100Y in which the light blocking display and the transmissive display cannot be switched. The optical sensor 2 is disposed in the modulation region 100X. The optical sensor 2 impairs transparency in the transmissive display, and thus the optical sensor 2 is preferably disposed avoiding the center of the display panel 11. For example, one optical sensor 2 can be disposed at each of four corners of the modulation region 100X.

The display panel 11 includes the plurality of pixels 1P disposed two dimensionally and a plurality of the optical sensors 2. The display panel 11 outputs an output signal of the optical sensor 2 as a sensor output signal SS. The A/D converter 15 converts the sensor output signal SS in analog into a digital signal. The control unit 510 calculates the brightness ratio based on the digital signal output from the A/D converter 15, and sets the half light blocking degree based on the brightness ratio. Further, the control unit 510 generates display data Din for causing each pixel 1P to be subjected to the light blocking display or the transmissive display based on the half light blocking degree, and outputs the display data Din to the panel drive circuit 12 to cause each pixel 1P to be subjected to the light blocking display or the transmissive display.

Similar to the first embodiment, as illustrated in FIG. 29, the backlight 14 of the present embodiment includes a plurality of white LEDs 16 and irradiates the back face of the display panel 11 with light (backlight light).

Similar to the first embodiment, as illustrated in FIG. 29, the display panel 11 of the present embodiment includes m gate lines G1 to Gm, 3n source lines SR1 to SRn, SG1 to SGn, SB1 to SBn, and (m×3n) pixels 1P. In addition, the display panel 11 includes (m×n) optical sensors 2, m sensor readout lines RW1 to RWm, and m sensor reset lines RS1 to RSm.

Similar to the first embodiment, as illustrated in FIG. 30, the optical sensor 2 of the present embodiment includes the capacitor 5, the photodiode 6, and the sensor preamplifier 7, and is provided for each pixel 1P.

The gate line drive circuit 41, the source line drive circuit 42, the sensor row drive circuit 43, p (p is an integer of 1 or more and n or less) sensor output amplifiers 44, and the plurality of switches 45 to 48 are provided around the display panel 11 according to the present embodiment.

Figure 65:
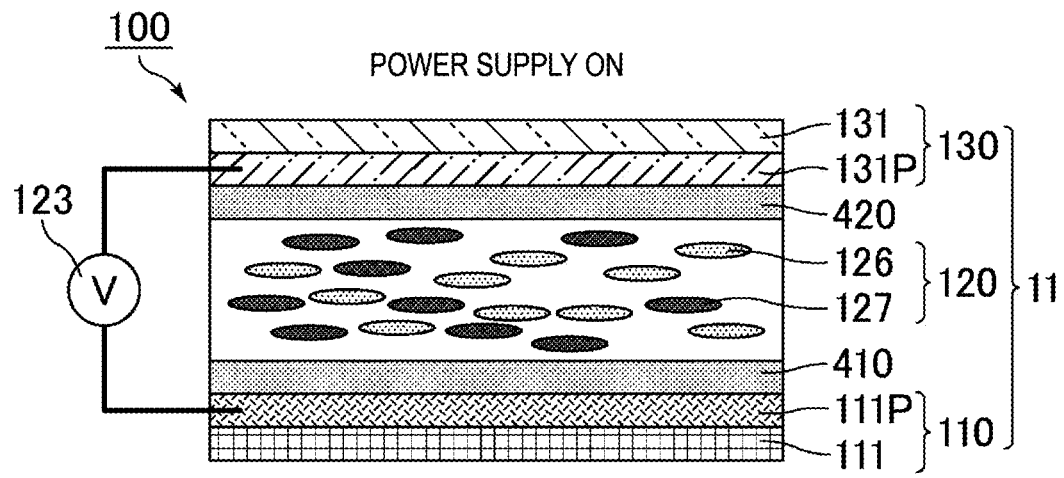
FIG. 65 is a schematic cross-sectional view for describing a case where the display device according to a third embodiment is in a light blocking mode.
Figure 66:
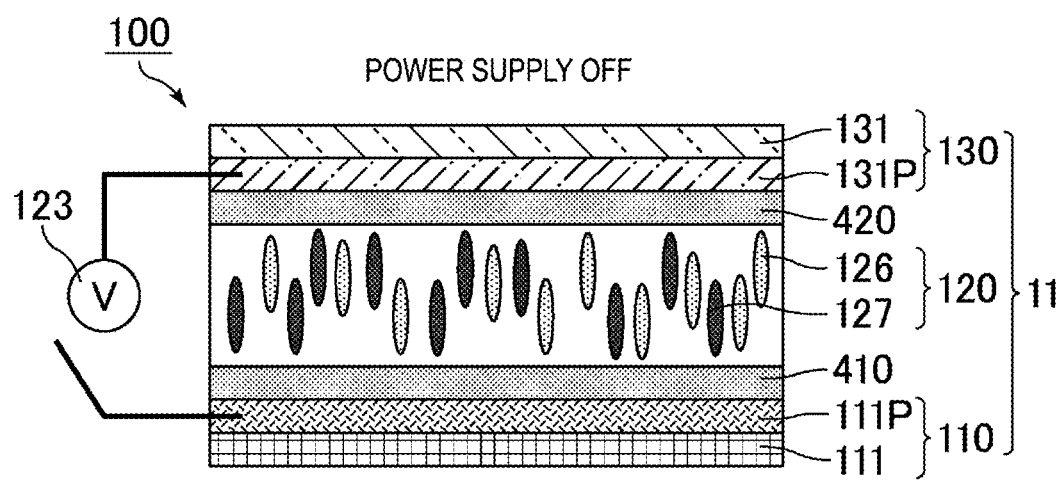
FIG. 66 is a schematic cross-sectional view for describing a case where the display device according to the third embodiment is in the transmissive mode.

FIG. 65 is a schematic cross-sectional view for describing a case where the display device according to a third embodiment is in the light blocking mode. FIG. 66 is a schematic cross-sectional view for describing a case where the display device according to the third embodiment is in the transmissive mode. In the present embodiment, the first substrate 110 of the display device 100 is disposed on the first space 211 side, and the second substrate 130 of the display device 100 is disposed on the second space 212 side.

As illustrated in FIGS. 65 and 66, the display device 100 of the present embodiment includes the first substrate 110, the light modulation layer 120, and the second substrate 130. The display device 100 may include the first alignment film 410 between the first substrate 110 and the light modulation layer 120 and may include the second alignment film 420 between the second substrate 130 and the light modulation layer 120.

The first substrate 110 constitutes an active matrix substrate. Specifically, the first substrate 110 includes various signal lines (gate lines, source lines, and the like), a TFT, and an insulating layer, which are not illustrated, on the first support substrate 111, and includes the first electrode 111P (pixel electrode) thereon. The second substrate 130 includes the second electrode 131P (common electrode) on the second support substrate 131. Further, the display device 100 includes a power supply 123 that applies a voltage between the first electrodes 111P and the second electrode 131P.

The first support substrate 111 and the second support substrate 131 are, for example, liquid crystal glass of 0.5 mm. The first electrode 111P and the second electrode 131P are made of, for example, ITO.

In the present embodiment, the non-transmissive display is the light blocking display, and the light modulation layer 120 includes liquid crystal molecules 126 and dye molecules 127. With such an aspect, the alignment of the liquid crystal molecules 126 and the dye molecules 127 can be controlled in accordance with the voltage applied to the light modulation layer 120 and the transmittance of the light modulation layer 120 can be changed. The film thickness of the light modulation layer 120 is, for example, 5 μm or more and 20 μm or less.

As illustrated in FIG. 65, by turning on the voltage of the power supply 123, the liquid crystal molecules 126 and the dye molecules 127 in the light modulation layer 120 can be aligned in parallel to the first substrate 110 and the second substrate 130, and the light blocking display can be realized.

As illustrated in FIG. 66, by turning off the voltage of the power supply 123, the liquid crystal molecules 126 and the dye molecules 127 in the light modulation layer 120 can be aligned perpendicular to the first substrate 110 and the second substrate 130, and the transmissive display can be realized.

The light modulation layer 120 of the present embodiment includes a liquid crystal medium containing the liquid crystal molecules 126 and the dye molecules 127. The liquid crystal medium has excellent solubility for the dye molecules 127, so that the dye molecules 127 remain in a solution for a long time. Furthermore, the liquid crystal medium is highly photostable and stable to an electrical field. The liquid crystal medium has a property that the dye molecules 127 therein have a high degree of anisotropy. The liquid crystal medium also has a high clearing point of preferably more than 80° C., particularly preferably more than 90° C., and very particularly preferably more than 100° C. The liquid crystal medium has high low-temperature stability. The high low-temperature stability means, in particular, that a mixture can be stored both as such and also in an LC device for several months at less than 0° C., preferably less than −20° C., without crystallization or phase conversion, for example phase conversion into a smectic phase, taking place.

The liquid crystal molecules 126 preferably include, for example, at least one of a compound represented by the following general formula (LA1), a compound represented by the following general formula (LA2), and a compound represented by the following general formula (LA3). Here, in a case where the liquid crystal molecules 126 include the compound represented by the following general formula (LA1), the liquid crystal molecules 126 include one or more compounds represented by the following general formula (LA1). In a case where the liquid crystal molecules 126 include the compound represented by the following general formula (LA2), the liquid crystal molecules 126 include one or more compounds represented by the following general formula (LA2). In a case where the liquid crystal molecules 126 include the compound represented by the following general formula (LA3), the liquid crystal molecules 126 include one or more compounds represented by the general formula (LA3).

[Chemical Formula 7]

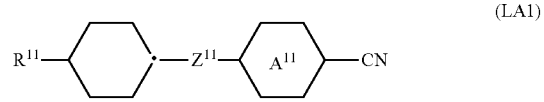

(LA1)

[Chemical Formula 8]

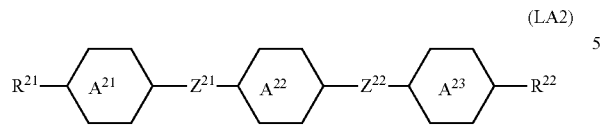
(LA2)

[Chemical Formula 9]

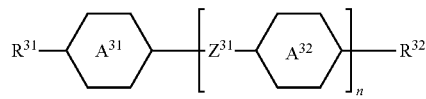
(LA3)

In the above general formulas (LA1) to (LA3), $R^{11}$, $R^{21}$, $R^{22}$, $R^{31}$, and $R^{32}$ are, identically or differently on each occurrence, alkyl, alkoxy or thioalkoxy group including H, F, Cl, CN, NCS, $R^1$—O—CO—, $R^1$—CO—O—, and 1 to 10 C atoms, or alkenyl, alkenyloxy or thioalkenyloxy group including 2 to 10 C atoms, wherein one or more H atoms in the groups may be replaced by F, Cl or N, and one or more $CH_2$ groups in the groups may be replaced by O, S, —O—CO— or —CO—O—. $R^1$ is, identically or differently on each occurrence, an alkyl group including 1 to 10 C atoms, wherein one or more H atoms may be replaced by F or Cl, and one or more $CH_2$ groups may be replaced by O or S.

In the above general formulas (LA1) to (LA3), $Z^{11}$, $Z^{21}$, $Z^{22}$, and $Z^{31}$ are, identically or differently on each occurrence, selected from —CO—O—, —O—CO—, —CF$_2$—CF$_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$—, —CH$_2$O—, and a single bond.

In the above general formulas (LA1) to (LA3), $A^{11}$ is selected from the following general formulas (A1-1) to (A1-6), and $A^{21}$, $A^{22}$, $A^{23}$, $A^{31}$, and $A^{32}$ are, identically or differently on each occurrence, selected from the following general formulas (A2-1) to (A2-29).

(A1-1)

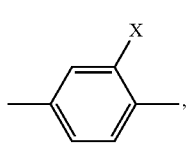
(A1-2)

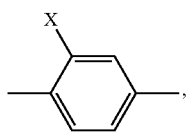
(A1-3)

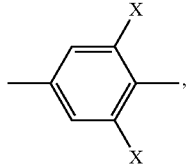
(A1-4)

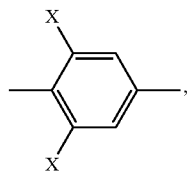
(A1-5)

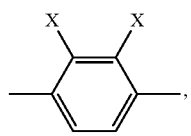
(A1-6)

[Chemical Formula 11]

(A2-1)

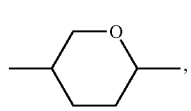
(A2-2)

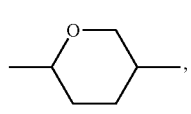
(A2-3)

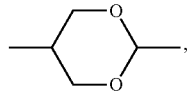
(A2-4)

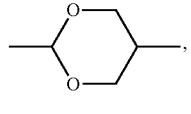
(A2-5)

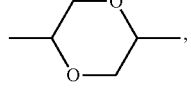
(A2-6)

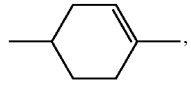
(A2-7)

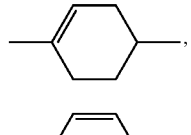
(A2-8)

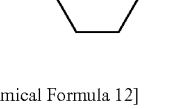
(A2-9)

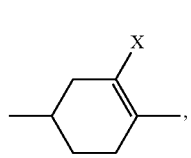
(A2-10)

[Chemical Formula 12]

(A2-11)

-continued (A2-12) 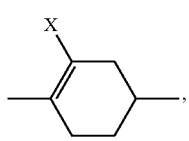

(A2-13) 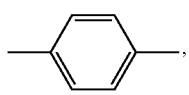

(A2-14) 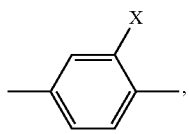

(A2-15) 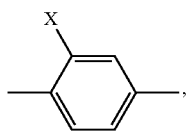

(A2-16) 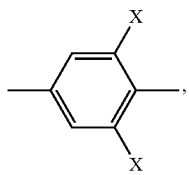

(A2-17) 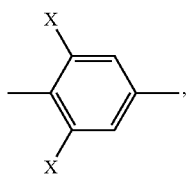

(A2-18) 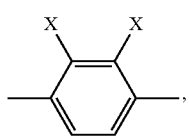

(A2-19) 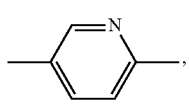

(A2-20)

[Chemical Formula 13]

(A2-21) 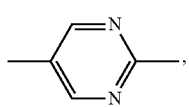

(A2-22) 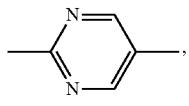

(A2-23) 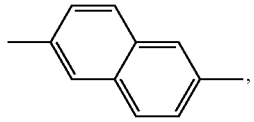

-continued (A2-24) 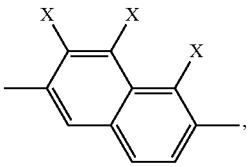

(A2-25) 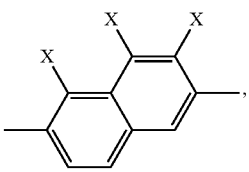

(A2-26) 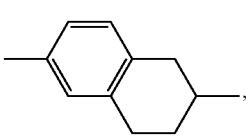

(A2-27) 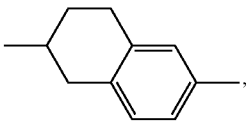

(A2-28) 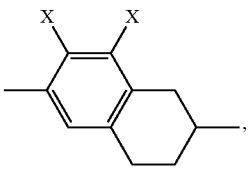

(A2-29) 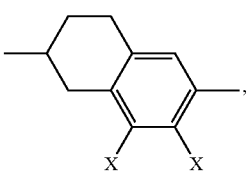

In the above general formulas (A1-1) to (A1-6) and (A2-1) to (A2-29), X is, identically or differently on each occurrence, selected from an alkyl, alkoxy or alkylthio group including F, Cl, CN or 1 to 10 C atoms, wherein one or more H atoms in the groups may be replaced by F or Cl, one or more $CH_2$ groups in the groups may be replaced by O or S, and n is 3, 4 or 5.

The compound represented by the above general formula (LA2) includes at least two fluorine substituent groups.

In the present specification, a unit represented by the following general formula (LA3-1) may be identical or different on each occurrence.

[Chemical Formula 14]

(LA3-1)

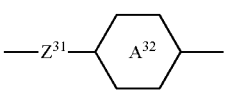

In the present specification, a ring shown in the following formula (A) is abbreviated as "$A^{xx}$", for example, "$A^{11}$" in order to improve readability of continuous text.

[Chemical Formula 14]

(A)

The liquid crystal medium of the present embodiment includes preferably from 10 wt. % to 70 wt. %, particularly preferably from 20 wt. % to 60 wt. %, and very particularly preferably from 25 wt. % to 55 wt. % of the compound represented by the formula (LA1). The liquid crystal medium of the present embodiment includes from 5 wt. % to 60 wt. %, preferably from 8 wt. % to 50 wt. %, and particularly preferably from 20 wt. % to 50 wt. %, of the compound represented by the formula (LA2), preferably in combination with a preferred proportion of the compound represented by the formula (LA1).

The liquid crystal medium of the present embodiment includes from 15 wt. % to 45 wt. % and preferably from 25 wt. % to 35 wt. % of the compound represented by the formula (LA3), further preferably in combination with a preferred proportion of the compound represented by the formula (LA1) and/or the formula (LA2). The compound represented by the formula (LA3) is present in the medium in a proportion of preferably at least 6 wt. %, preferably at least 9 wt. %, and particularly preferably at least 12 wt. %.

The dye molecules 127 of the present embodiment preferably include one or more dichroic pigments. A proportion of the dichroic pigment or dichroic pigments in the liquid crystal medium of the present embodiment is preferably from 0.01 wt. % to 10 wt. % in total, particularly preferably from 0.1 wt. % to 7 wt. % in total, and very particularly preferably from 0.2 wt. % to 7 wt. % in total. A proportion of each dichroic pigment is preferably from 0.01 wt. % to 10 wt. %, particularly preferably from 0.05 wt. % to 7 wt. %, and very particularly preferably from 0.1 wt. % to 7 wt. %.

The dichroic pigment mainly absorbs light preferably in a UV-VIS-NIR region, that is, in a range of wavelengths from 320 nm to 2000 nm. In the present specification, UV light means light having wavelengths from 320 nm to 380 nm, VIS light means light having wavelengths from 380 nm to 780 nm, and NIR light means light having wavelengths from 780 nm to 2000 nm. The dichroic pigment contained in the liquid crystal medium of the present embodiment is more preferably a fluorescent pigment.

The dichroic pigment is more preferably an organic compound, and particularly preferably an organic compound containing at least one condensed aryl group or heteroaryl group.

The dichroic pigment is preferably selected from azo compounds, anthraquinones, methine compounds, azomethine compounds, merocyanine compounds, naphthoquinones, tetrazines, perylenes, terrylenes, quaterrylenes, higher rylenes, and pyrromethenes. Of these, perylenes, terrylenes and quaterrylenes are particularly preferred.

Examples of the preferred dichroic pigments are illustrated below.

[Chemical Formula 16]

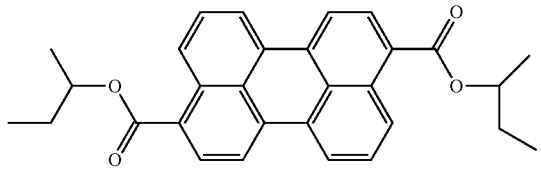

(D1)

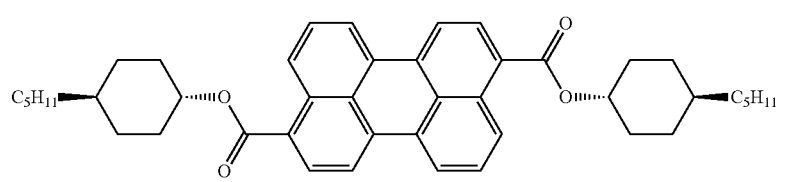

(D2)

[Chemical Formula 17]
(D3)
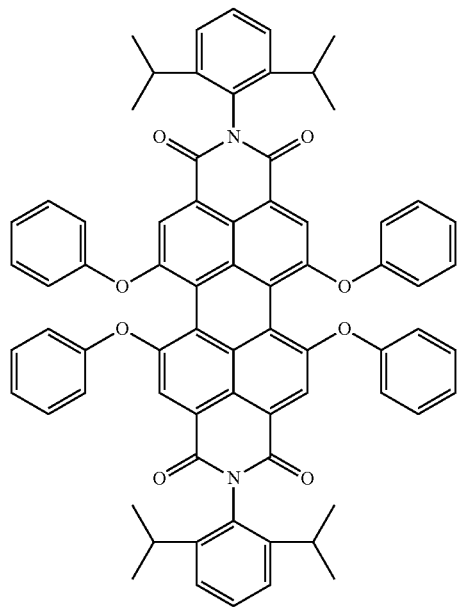
(D4)
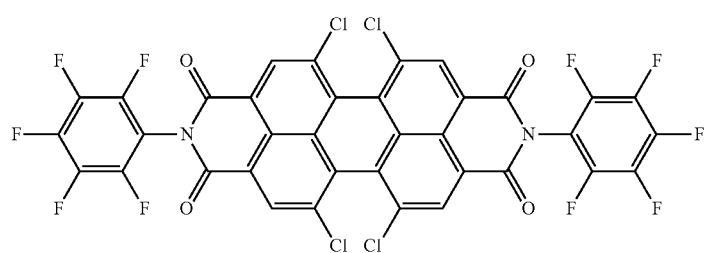
[Chemical Formula 18]
(D5)
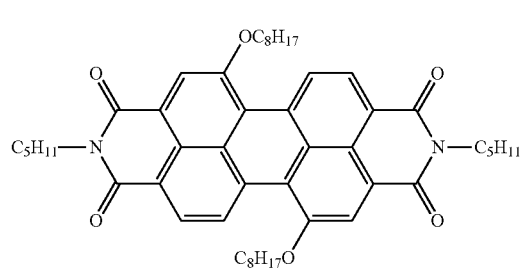
(D6)
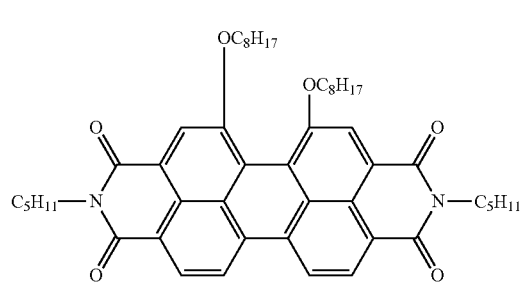

[Chemical Formula]
(D7)
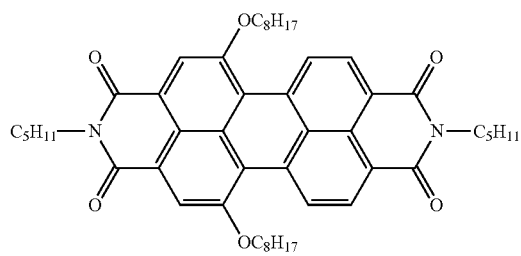
(D8)
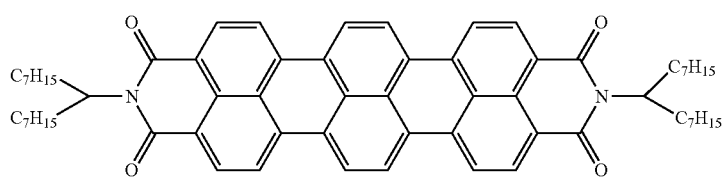
[Chemical Formula 20]
(D9)
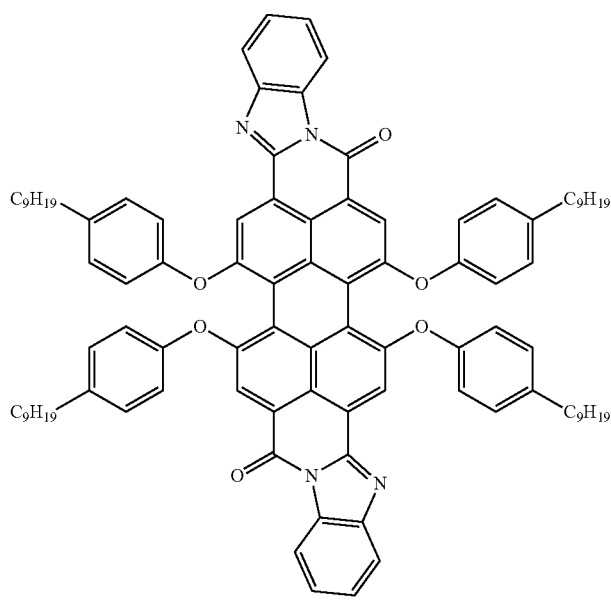
(D10)
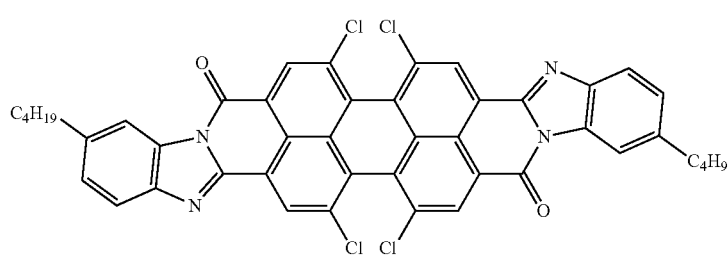
[Chemical Formula 21]
(D11)
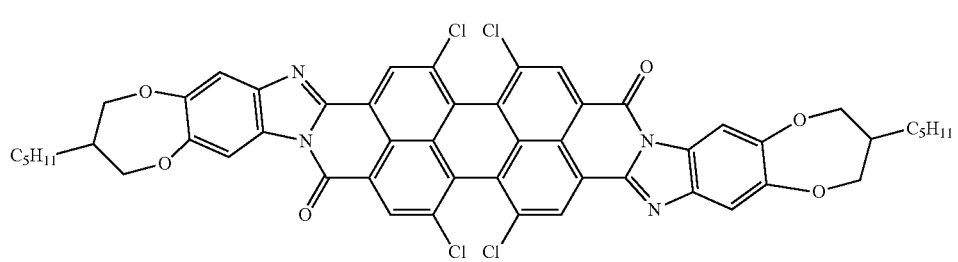

-continued
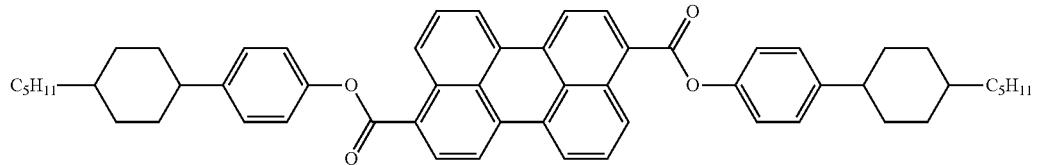
(D12)
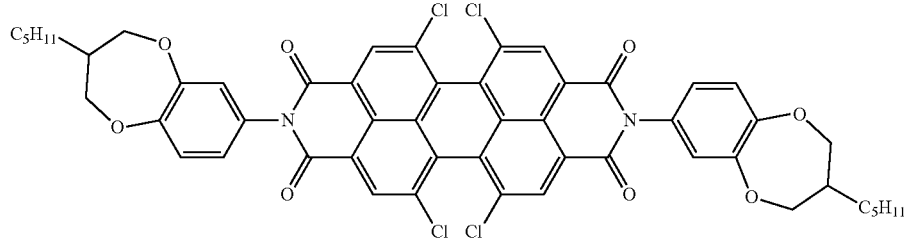
(D13)
[Chemical Formula 22]
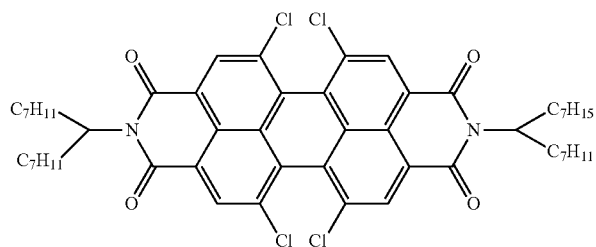
(D14)
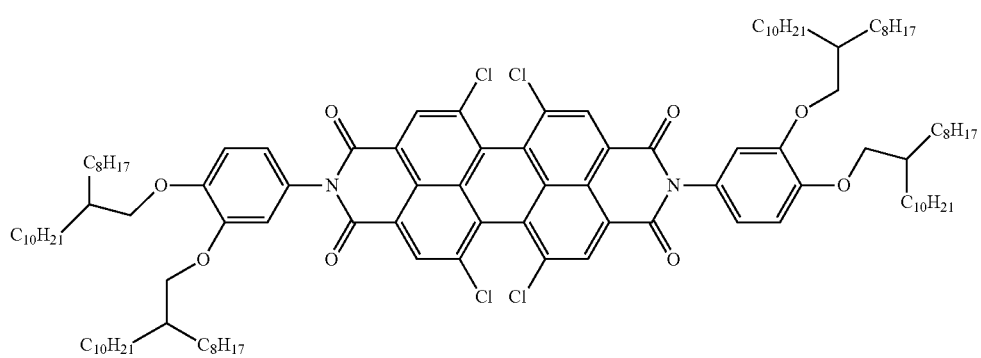
(D15)
[Chemical Formula 23]
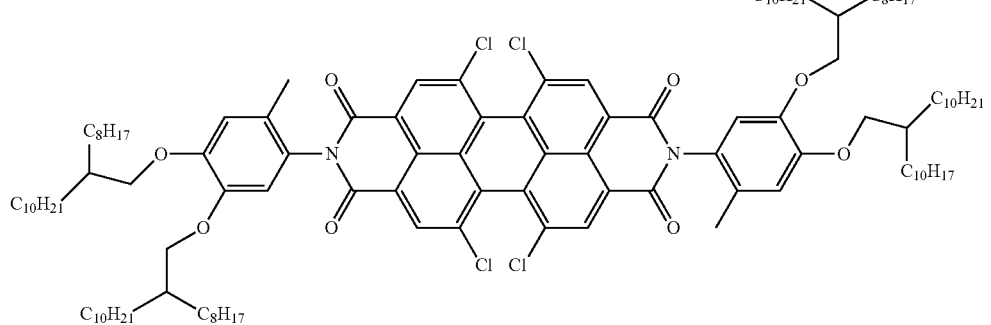
(D16)

-continued
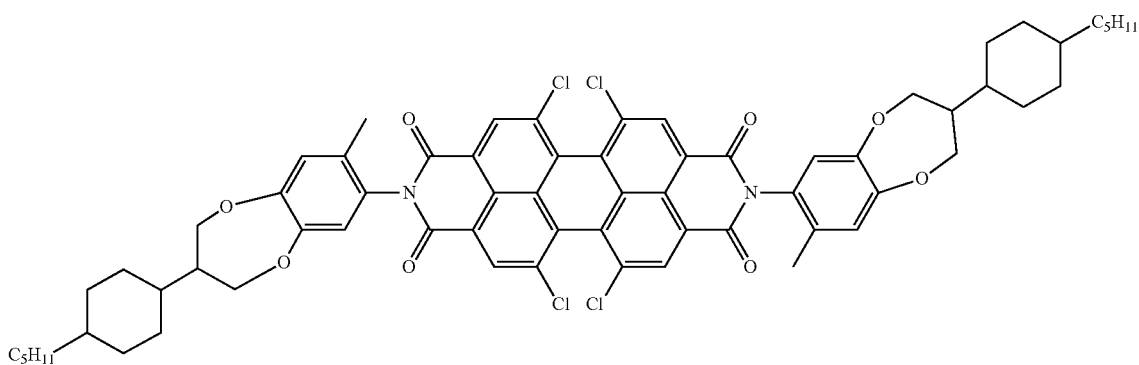
(D17)
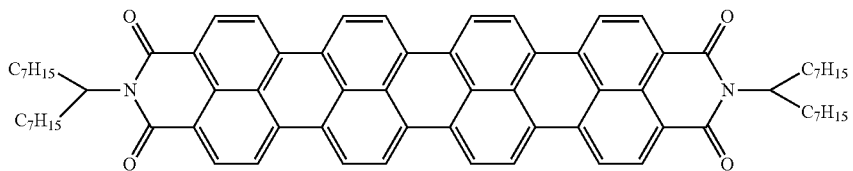
(D18)
[Chemical Formula 24]
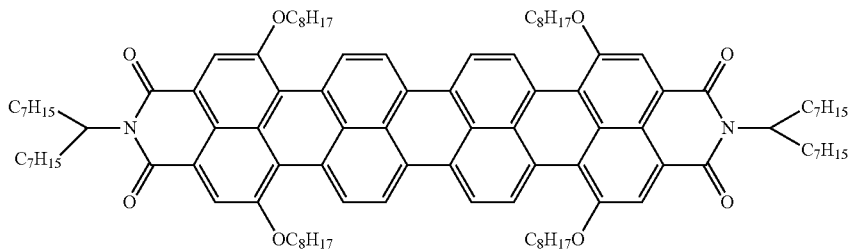
(D19)
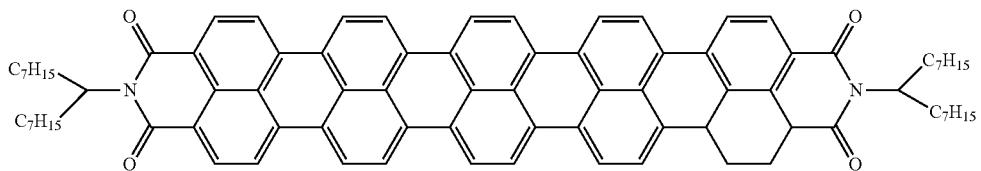
(D20)
[Chemical Formula 25]
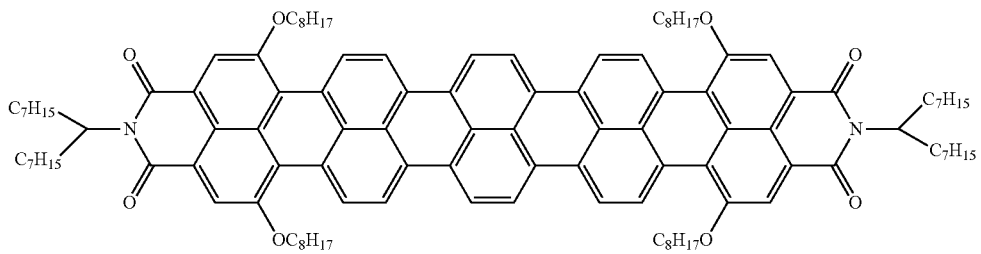
(D21)
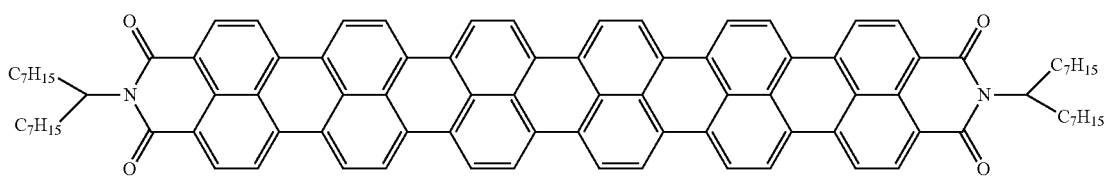
(D22)

[Chemical Formula 26]
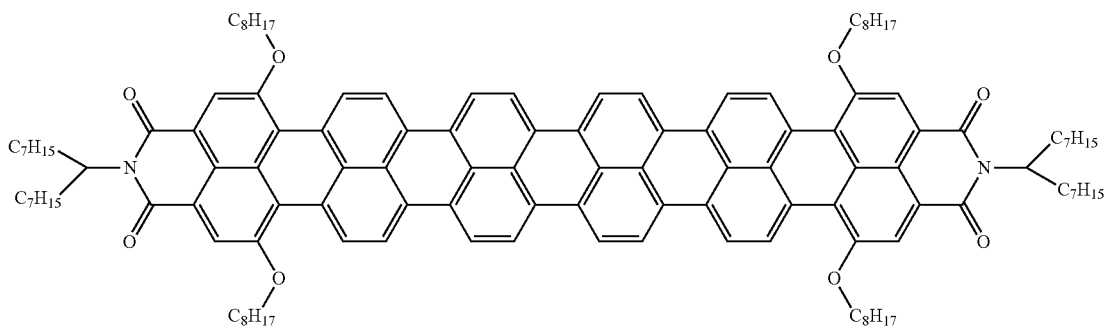
(D23)
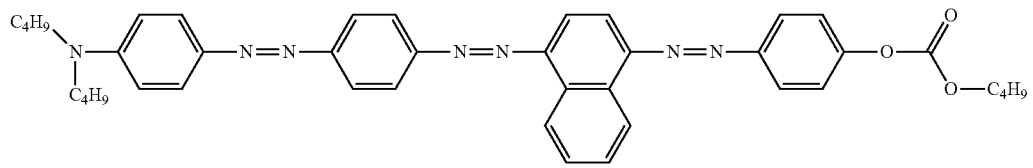
(D24)
[Chemical Formula 27]
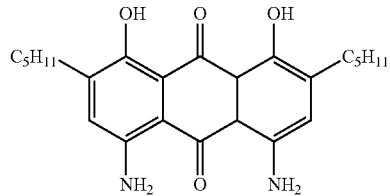
(D25)
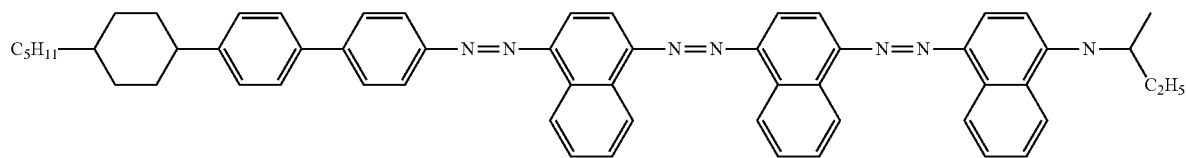
(D26)
[Chemical Formula 28]
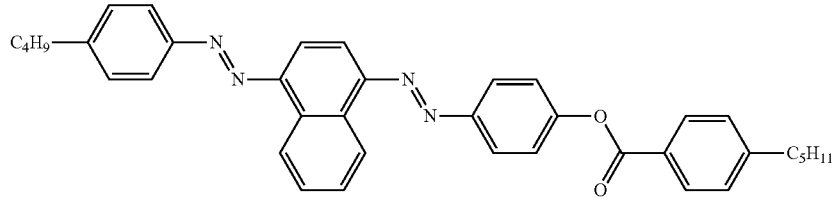
(D27)
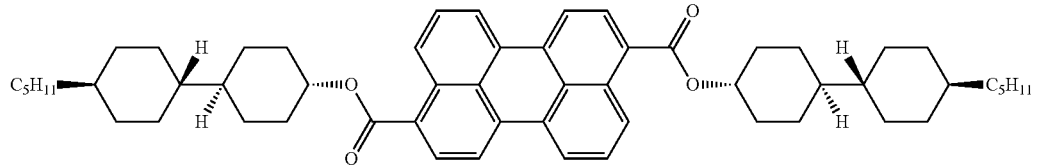
(D28)

(D29)
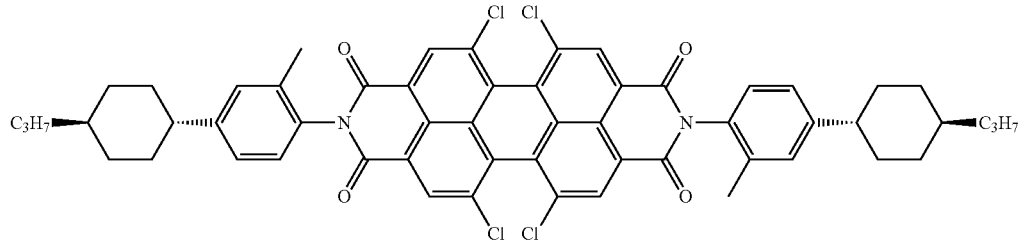
[Chemical Formula 29]
(D30)
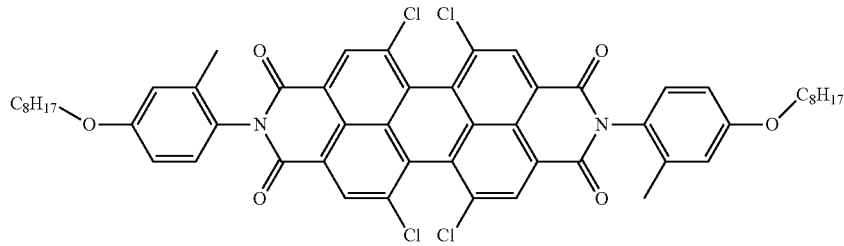
(D31)
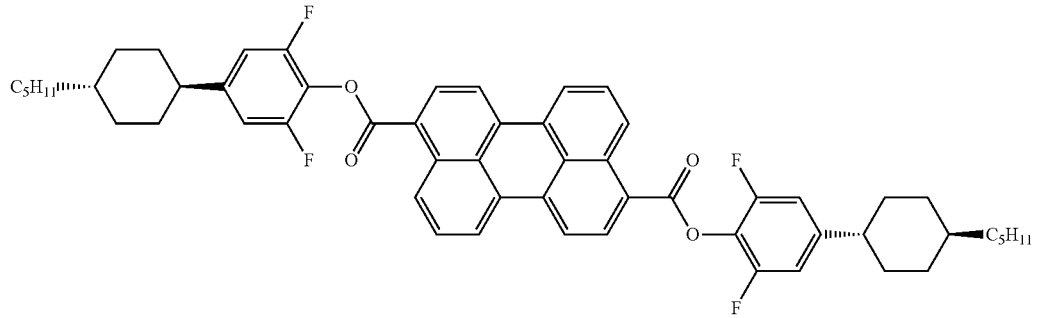
[Chemical Formula 30]
(D32)
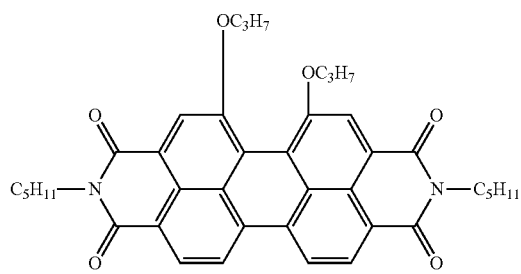
(D33)
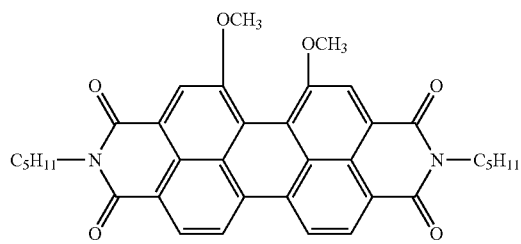

-continued

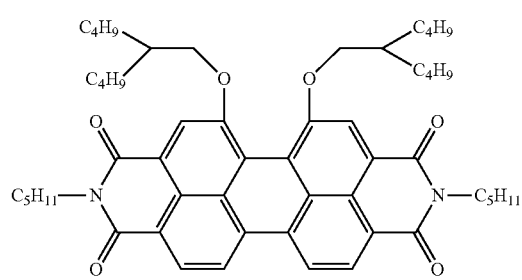

(D34)

[Chemical Formula 31]

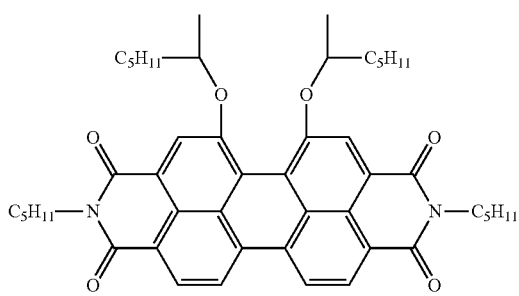

(D35)

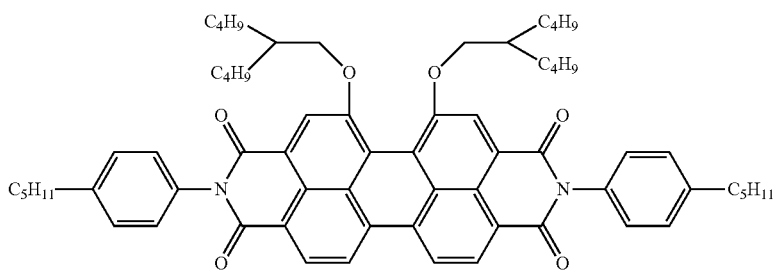

(D36)

The transmittance of the display panel 11 can be controlled within a range of, for example, 0.5% or more and 70% or less by adjusting the ratio of the pixels 1P to be subjected to the transmissive display to the plurality of pixels 1P. For example, the display device 100 that can control the transmittance within a range of 0.5% or more and 10% or less can be obtained by using two display panels 11 focusing on the light blocking being stacked. The display device 100 that can control the transmittance within a range of 35% or more and 70% or less can be obtained by using two display panels 11 focusing on the transmittance being stacked.

Here, in the present embodiment, particularly when the light blocking mode is used, since the reflectivity in the light modulation layer 120 is low and the value of br is small, an error of the amount of light obtained from the first space 211 (outdoors) having the brightness B is large as compared with the first embodiment and the second embodiment.

Also in the present embodiment, since the difference in brightness between the second space 212 having the brightness A and the first space 211 having the brightness B has an important meaning, it is preferable to suppress the overall error by making the errors of the luminances of the light obtained from both spaces approximately the same in the space measurement to optimize the error of the luminance of the light obtained from the first space 211 having the brightness B.

Figure 67:
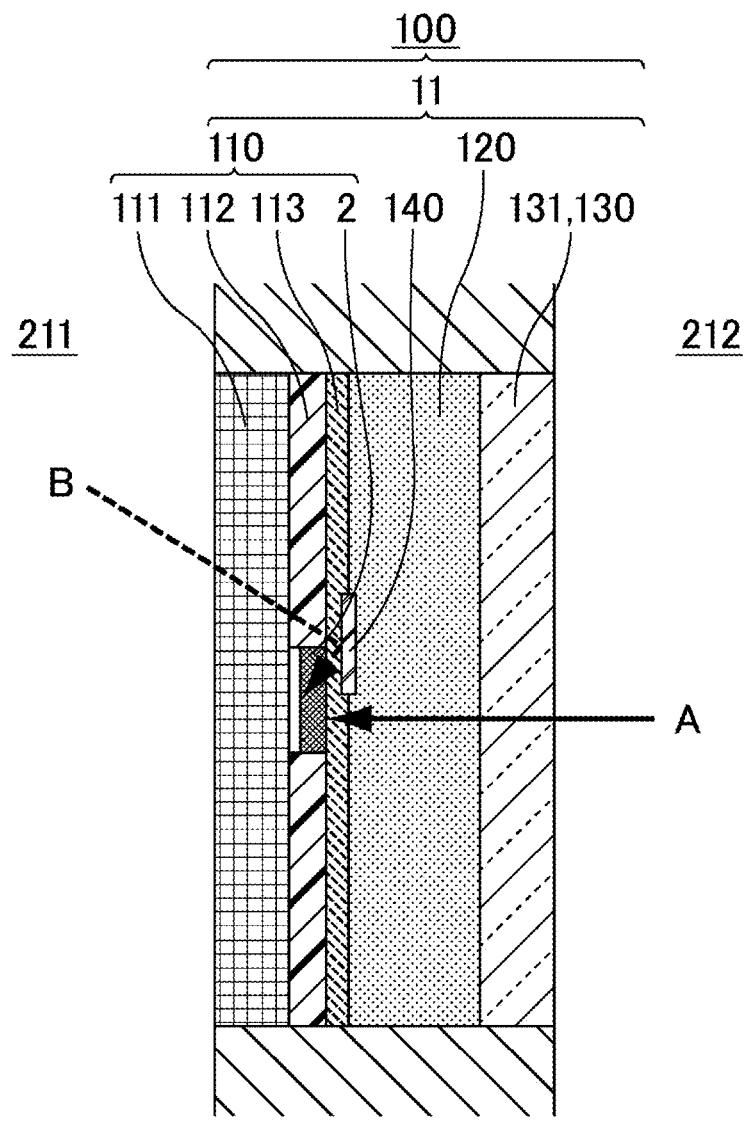
FIG. 67 is a schematic cross-sectional view of the display device according to the third embodiment including a reflective layer.
Figure 68:
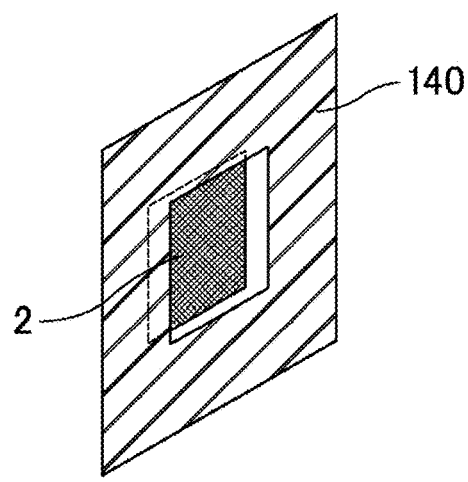
FIG. 68 is a perspective schematic view illustrating the display device according to the third embodiment including the reflective layer.

Thus, as illustrated in FIGS. 67 and 68, the display device 100 of the present embodiment preferably includes a reflective layer 140 between the light modulation layer 120 and the optical sensor 2. With such an aspect, the light from the first space 211 having the brightness B can be effectively taken into the optical sensor 2, and the value of br can be increased. As a result, the error in the spatial measurement can be suppressed. FIG. 67 is a schematic cross-sectional view of the display device according to the third embodiment including the reflective layer. FIG. 68 is a perspective schematic view illustrating the display device according to the third embodiment including the reflective layer.

Note that, when the reflective layer 140 covers the entire region of the optical sensor 2, the light from the second space 212 having the brightness A may be difficult to be taken, that is, ar may become excessively small. Thus, as illustrated in FIGS. 67 and 68, the reflective layer 140 is preferably provided not in a region directly above the optical sensor 2 but around the optical sensor 2. That is, the reflective layer 140 is preferably provided around the optical sensor 2 in a plan view. With such an aspect, the light from the second space 212 having the brightness A can be effectively taken, and ar can be prevented from becoming excessively small. As a result, the error in the spatial measurement can be suppressed.

Modified Example of First to Third Embodiments

The pixel division method is described as the method of realizing the half scattering mode, the half mirror mode, and the half light blocking mode in the first to third embodiments, but the half scattering mode, the half mirror mode, and the half light blocking mode can also be realized by finely adjusting the voltage applied to the liquid crystal components 122L to cause the liquid crystal components 122L to be subjected to an intermediate alignment (inclined alignment) in the first embodiment, by finely adjusting the voltage applied to the shape anisotropic member 122 to cause the shape anisotropic member 122 to be subjected to the intermediate alignment (inclined alignment) in the second embodiment, and by finely adjusting the voltage applied to the liquid crystal molecules 126 and the dye molecules 127 to cause the liquid crystal molecules 126 and the dye molecules 127 to be subjected to the intermediate alignment (inclined alignment) in the third embodiment. Such a method is referred to as an intermediate alignment method.

Specifically, in the first embodiment, the control unit 510 adjusts the voltage applied to the light modulation layer 120 based on the numerical value (specifically, the brightness ratio), and thus the liquid crystal components 122L can be obliquely aligned with respect to the first substrate 110 and the second substrate 130. With such an aspect, the half scattering mode can also be realized.

Specifically, in the first embodiment, the control unit 510 adjusts the voltage applied to the light modulation layer 120 based on the half scattering degree as the non-transmittance, and thus the liquid crystal components 122L can be obliquely aligned with respect to the first substrate 110 and the second substrate 130. Note that, here, the case where the non-transmittance is set is taken as an example, but the same effect can be obtained when the transmittance is set.

As illustrated in the first embodiment, in order to improve the transmittance when viewing the outdoor side from the indoor side while ensuring the privacy on the indoor side by causing the scattering display from the outdoor side to the indoor side in the half scattering mode, it is preferable to adjust the drive voltage in each pixel 1P to cause the liquid crystal components 122L to be subjected to the intermediate alignment, thus modulating the half scattering degree.

In the second embodiment, the control unit 510 adjusts the voltage applied to the light modulation layer 120 based on the numerical value (specifically, the brightness ratio), and thus the plurality of shape anisotropic members 122 can be obliquely aligned with respect to the first substrate 110 and the second substrate 130. With such an aspect, the half mirror mode can also be realized.

Specifically, in the second embodiment, the control unit 510 adjusts the voltage applied to the light modulation layer 120 based on the half mirror degree as the non-transmittance, and thus the plurality of shape anisotropic members 122 can be obliquely aligned with respect to the first substrate 110 and the second substrate 130. Note that, here, the case where the non-transmittance is set is taken as an example, but the same effect can be obtained when the transmittance is set.

Here, in the second embodiment, as illustrated in FIG. 41, the shape anisotropic member 122 is in the first alignment state 122A in a part of the plurality of pixels 1P to realize the reflective display 1PA3, and the shape anisotropic member 122 is in the second alignment state 122B in the other pixels 1P to realize the transmissive display 1PA2. As a result, the half mirror mode is realized.

Figure 69:
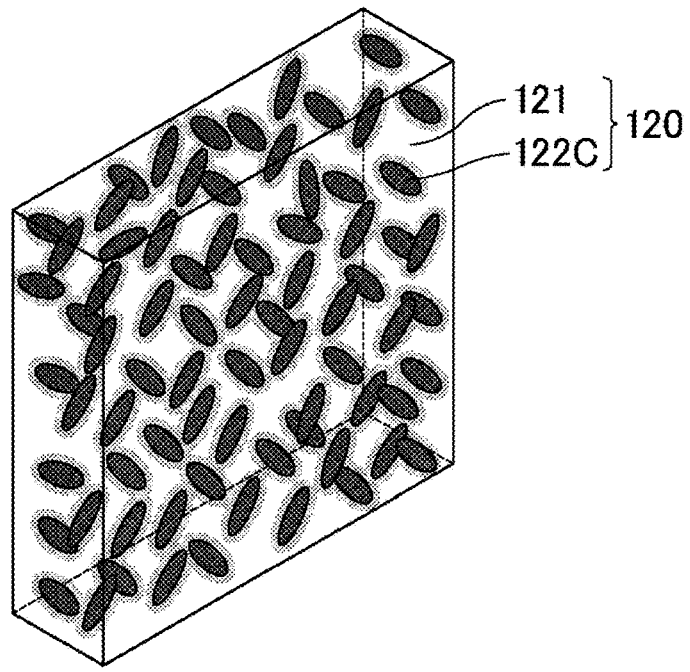
FIG. 69 is a schematic view illustrating the light modulation layer in a case where the display device according to a modified example of the embodiment is in the half mirror mode.
Figure 70:
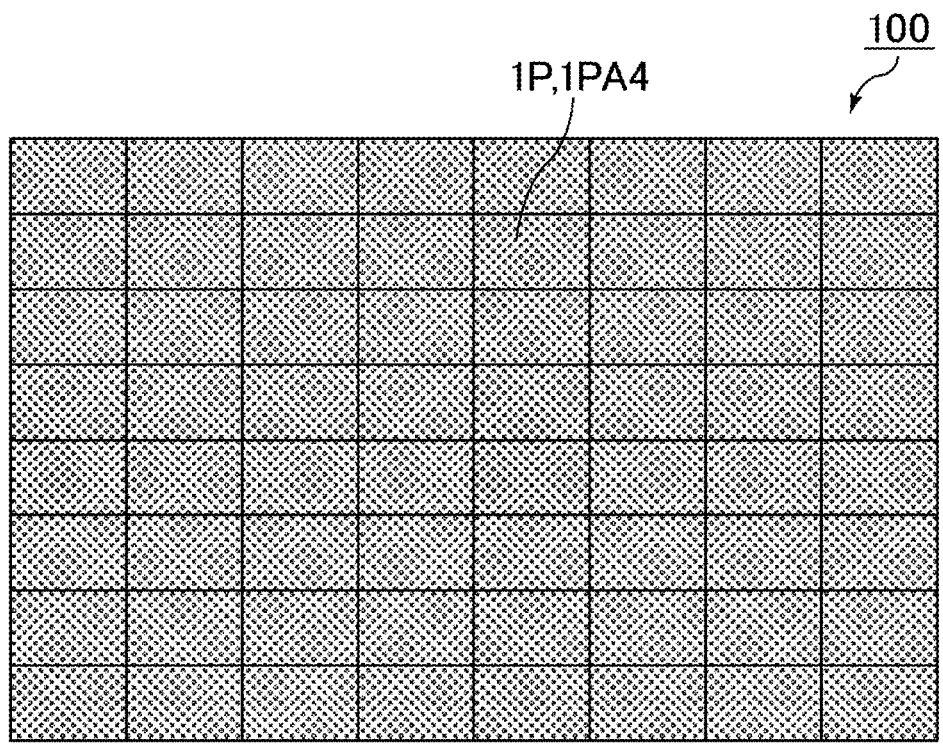
FIG. 70 is a schematic view illustrating the display device in the case where the display device according to the modified example of the embodiment is in the half mirror mode.

On the other hand, in the present modified example, as illustrated in FIGS. 69 and 70, the shape anisotropic member is in a third alignment state 122C in all of the plurality of pixels 1P in which the shape anisotropic member is obliquely aligned with respect to the first substrate 110 and the second substrate 130 to realize the half reflective display 1PA4 in each pixel 1P. As a result, the half mirror mode is realized. FIG. 69 is a schematic view illustrating the light modulation layer in a case where the display device according to the modified example of the embodiment is in the half mirror mode. FIG. 70 is a schematic view illustrating the display device in the case where the display device according to the modified example of the embodiment is in the half mirror mode.

As illustrated in the second embodiment, in order to improve the transmittance when viewing the bright room side from the dark room side while ensuring the privacy on the dark room side by causing the mirror display from the bright room to the dark room side in the half mirror mode, it is preferable to adjust the drive voltage in each pixel 1P to cause the shape anisotropic member 122 to be subjected to the intermediate alignment, thus modulating the half mirror degree.

In the third embodiment, the control unit 510 adjusts the voltage applied to the light modulation layer 120 based on the numerical value (specifically, the brightness ratio), and thus the liquid crystal molecules 126 and the dye molecules 127 can be obliquely aligned with respect to the first substrate 110 and the second substrate 130. With such an aspect, the half light blocking mode can also be realized.

Specifically, in the third embodiment, the control unit 510 adjusts the voltage applied to the light modulation layer 120 based on the half light blocking degree as the non-transmittance, and thus the liquid crystal molecules 126 and the dye molecules 127 can be obliquely aligned with respect to the first substrate 110 and the second substrate 130. Note that, here, the case where the non-transmittance is set is taken as an example, but the same effect can be obtained when the transmittance is set.

As illustrated in the third embodiment, in order to improve the transmittance when viewing the bright room side from the dark room side while ensuring the privacy on the dark room side by causing the light blocking display from the bright room to the dark room side in the half light blocking mode, it is preferable to adjust the drive voltage in each pixel 1P to cause the liquid crystal molecules 126 and the dye molecules 127 to be subjected to the intermediate alignment, thus modulating the half light blocking degree.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A display device comprising:
  a display panel; and
  a control unit,
  wherein the display panel includes a first substrate, a light modulation layer configured to switch between transmissive display and non-transmissive display, and a second substrate in this order, and further includes an optical sensor configured to detect a luminance of light incident from a first space located on one main surface side of the display panel and from a second space located on the other main surface side of the display panel, and
  the control unit calculates, based on the luminance, a relationship between brightness of the first space and brightness of the second space as a numerical value and switches display of the light modulation layer based on the numerical value.

2. The display device according to claim 1,
wherein the luminance includes a first luminance and a second luminance,
the first luminance is a luminance detected in a non-transmissive display state of the display panel, and
the second luminance is a luminance detected in a transmissive display state of the display panel.

3. The display device according to claim 1,
wherein the detection of the luminance, the calculation of the numerical value based on the luminance, and the switching of the display of the light modulation layer based on the numerical value are repeated every time a certain period of time elapses.

4. The display device according to claim 1,
wherein the non-transmissive display is scattering display, and
the light modulation layer includes a polymer network and a liquid crystal component.

5. The display device according to claim 4,
wherein the control unit adjusts a voltage applied to the light modulation layer based on the numerical value and obliquely aligns the liquid crystal component with respect to the first substrate and the second substrate.

6. The display device according to claim 1,
wherein the non-transmissive display is reflective display,
the light modulation layer includes a plurality of shape anisotropic members, and
each of the plurality of shape anisotropic members includes a core serving as a conductor and a covering layer serving as a dielectric covering a periphery of the core.

7. The display device according to claim 6,
wherein the control unit adjusts a voltage applied to the light modulation layer based on the numerical value and obliquely aligns the plurality of shape anisotropic members with respect to the first substrate and the second substrate.

8. The display device according to claim 1,
wherein the non-transmissive display is light blocking display, and
the light modulation layer includes liquid crystal molecules and dye molecules.

9. The display device according to claim 8, further comprising:
a reflective layer around the optical sensor in a plan view.

10. The display device according to claim 8,
wherein the control unit adjusts a voltage applied to the light modulation layer based on the numerical value, and obliquely aligns the liquid crystal molecules and the dye molecules with respect to the first substrate and the second substrate.

11. The display device according to claim 1,
wherein the display device includes a plurality of pixels, and
the control unit causes a number of pixels corresponding to the numerical value among the plurality of pixels to be subjected to the transmissive display or the non-transmissive display.

* * * * *